(12) United States Patent
Kumar

(10) Patent No.: US 7,430,967 B2
(45) Date of Patent: *Oct. 7, 2008

(54) MULTIMODE HYBRID ENERGY RAILWAY VEHICLE SYSTEM AND METHOD

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 11/180,251

(22) Filed: Jul. 13, 2005

(65) Prior Publication Data

US 2006/0012320 A1 Jan. 19, 2006

Related U.S. Application Data

(63) Continuation-in-part of application No. 10/435,261, filed on May 9, 2003, now Pat. No. 7,231,877, which is a continuation-in-part of application No. 10/032,714, filed on Dec. 26, 2001, now Pat. No. 6,612,245.

(60) Provisional application No. 60/278,975, filed on Mar. 27, 2001.

(51) Int. Cl.
*B61C 3/00* (2006.01)

(52) U.S. Cl. ........................................ 105/35

(58) Field of Classification Search ............ 105/26.05, 105/35, 49, 50, 53, 54, 59
See application file for complete search history.

(56) References Cited

U.S. PATENT DOCUMENTS 423,421 A 3/1890 Farrall

| 714,157 | A | 11/1902 | Davis |
| 714,196 | A | 11/1902 | Kubierschky |
| 723,727 | A | 3/1903 | Pfeil |
| 744,187 | A | 11/1903 | Gibbs |

(Continued)

FOREIGN PATENT DOCUMENTS

EP 0 640 507 3/1995

OTHER PUBLICATIONS

Railway Technical Web Pages, "Electric Traction Power Supply", copyright 1999, 2000, available at http://www.trainweb.org/railwaytechnical/etracp.html.

(Continued)

*Primary Examiner*—S. Joseph Morano
*Assistant Examiner*—Robert J McCarry, Jr.
(74) *Attorney, Agent, or Firm*—Senniger Powers LLP

(57) ABSTRACT

A hybrid energy railway vehicle system having a traction motor with a dynamic braking mode of operation for dynamically braking the traction motor and for generating dynamic braking electrical energy and an electrical energy storage system that is in electrical communication with the traction motor and that stores dynamic braking electrical energy generated by the traction motor. The system also has a hybrid energy railway vehicle with a plurality of wheels wherein the traction motor has a motoring mode of operation for driving one of the wheels in response to electrical input energy. A converter selectively provides stored electrical energy from the energy storage system to the traction motor as electrical input energy for driving one or more of wheels. The hybrid energy railway vehicle is optionally equipped computer readable medium having computer executable instructions for controlling the operation of the hybrid energy railway vehicle and a processor configured to control the operation of the railway vehicle as a function of at least one of a plurality of operating modes.

20 Claims, 27 Drawing Sheets

U.S. PATENT DOCUMENTS

| | | |
|---|---|---|
| 807,029 A | 12/1905 | Hoadley |
| 881,387 A | 3/1908 | Eastwood |
| 1,188,570 A | 6/1916 | Strobel et al. |
| 1,216,694 A | 2/1917 | Jenkins |
| 2,600,320 A | 6/1952 | Potter |
| 2,704,813 A | 3/1955 | Stamm |
| 3,238,896 A | 3/1966 | Minenko et al. |
| 3,455,107 A | 7/1969 | Dixon et al. |
| 3,743,901 A | 7/1973 | Johnson |
| 3,858,674 A | 1/1975 | Tabor |
| 3,886,810 A | 6/1975 | Sugiyama et al. |
| 3,972,380 A | 8/1976 | Hudson et al. |
| 4,108,077 A | 8/1978 | Laing |
| 4,165,795 A | 8/1979 | Lynch et al. |
| 4,342,921 A | 8/1982 | Williams |
| 4,382,189 A | 5/1983 | Wilson |
| 4,597,463 A | 7/1986 | Barnard |
| 4,900,944 A | 2/1990 | Donnelly |
| 5,215,156 A | 6/1993 | Stulbach et al. |
| 5,283,470 A | 2/1994 | Hadley et al. |
| 5,291,960 A | 3/1994 | Brandenburg et al. |
| 5,345,154 A | 9/1994 | King |
| 5,345,761 A | 9/1994 | King et al. |
| 5,373,195 A | 12/1994 | De Doncker et al. |
| 5,392,716 A | 2/1995 | Orschek et al. |
| 5,466,998 A | 11/1995 | Kinoshita et al. |
| 5,517,093 A | 5/1996 | Augustyniak et al. |
| 5,517,923 A | 5/1996 | Cathiard |
| 5,589,743 A | 12/1996 | King |
| 5,659,240 A | 8/1997 | King |
| 5,710,699 A | 1/1998 | King et al. |
| 5,713,425 A | 2/1998 | Buschhaus et al. |
| 5,723,956 A | 3/1998 | King et al. |
| 5,771,743 A | 6/1998 | Menzi |
| 5,839,533 A | 11/1998 | Mikami et al. |
| 5,898,282 A | 4/1999 | Drozdz et al. |
| 5,905,360 A | 5/1999 | Ukita et al. |
| 5,929,595 A | 7/1999 | Lyons et al. |
| 5,999,864 A | 12/1999 | Thiel et al. |
| 6,022,290 A | 2/2000 | Lyon |
| 6,026,921 A | 2/2000 | Aoyama et al. |
| 6,144,901 A | 11/2000 | Nickles et al. |
| 6,230,496 B1 | 5/2001 | Hofmann et al. |
| 6,294,843 B1 | 9/2001 | Kato et al. |
| 6,307,277 B1 | 10/2001 | Tamai et al. |
| 6,308,639 B1 | 10/2001 | Donnelly et al. |
| 6,314,346 B1 | 11/2001 | Kitajima et al. |
| 6,331,365 B1 | 12/2001 | King |
| 6,367,570 B1 | 4/2002 | Long, III et al. |
| 6,387,007 B1 | 5/2002 | Fini, Jr. |
| 6,408,766 B1 | 6/2002 | McLaughlin et al. |
| 6,434,452 B1 | 8/2002 | Gray |
| 6,441,581 B1 | 8/2002 | King et al. |
| 6,486,568 B1 | 11/2002 | King et al. |
| 6,497,182 B2 | 12/2002 | Melpolder et al. |
| 6,737,822 B2 | 5/2004 | King |
| 6,809,429 B1 | 10/2004 | Frank |
| 7,185,591 B2 | 3/2007 | Kumar |
| 7,231,877 B2 * | 6/2007 | Kumar ..................... 105/35 |
| 2002/0174798 A1 | 11/2002 | Kumar |
| 2004/0007404 A1 | 1/2004 | Schmitz et al. |

OTHER PUBLICATIONS

Railway Technical Web Pages, "Electrical Auxiliary Equipment Page", copyright Piers R. Conner 1998, 1999, 2000, available at http://www.trainweb.org/railwaytechnical/elec-aux.html.

Railway Technical Web Pages, "Diesel Locomotive Technology", copyright 2000, 2001, available at http://www.trainweb.org/railwaytechnical/diesel.html.

Railway Technical Web Pages, "Direct Current Traction Motor Systems", copyright Piers R. Connor 1999, 2000, available at http://www.trainweb.org/railwaytechnical/tract-01.html.

Presentation—Maxwell Technologies™—"Transportation Applications *PowerCashet™ Ultracapacitors*"—Dated Jan. 2001.

Presentation—Richard E. Smith, "The Joule of Power Electronics: Ultracapacitors in the Design of Power Systems"—Dated Jun. 29, 2000.

* cited by examiner

Energy Management System Prevents Complete Discharge In View Of Anticipated Demand

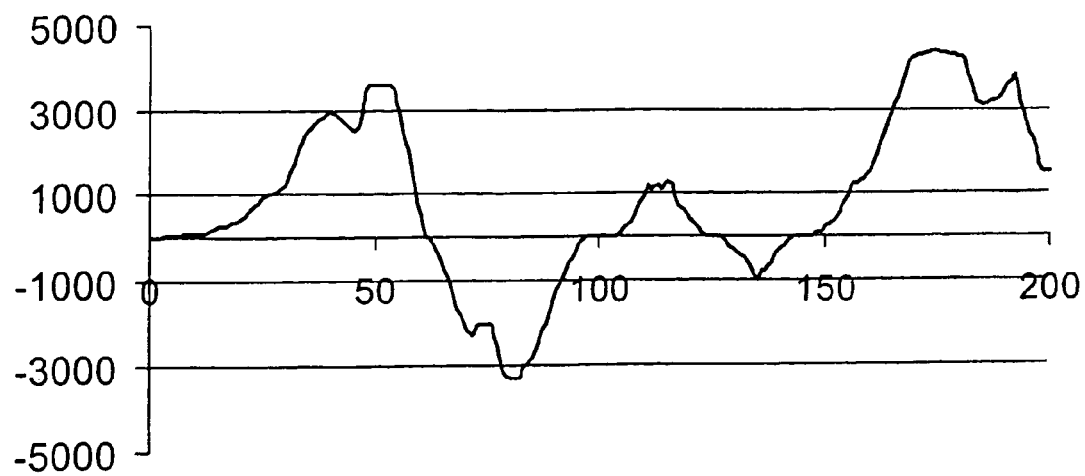
FIG. 8A  power
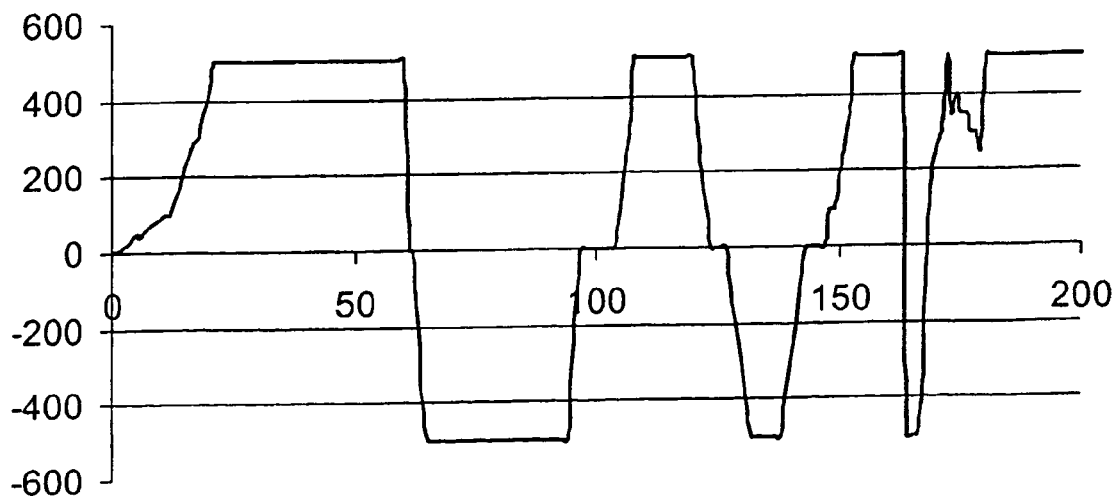
FIG. 8B  storage power possible

FIG. 8C    charge power
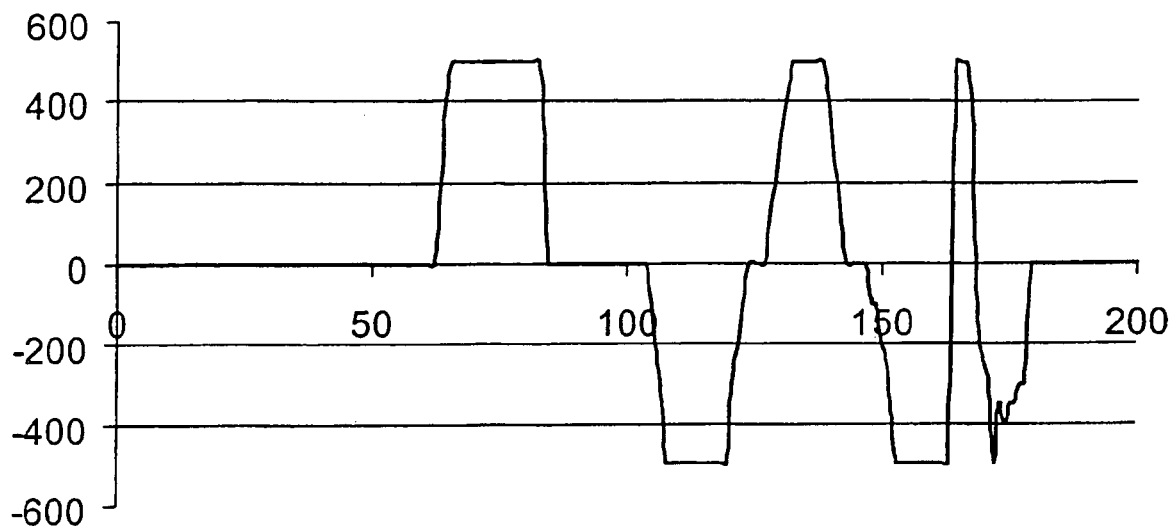
FIG. 8D    stored energy
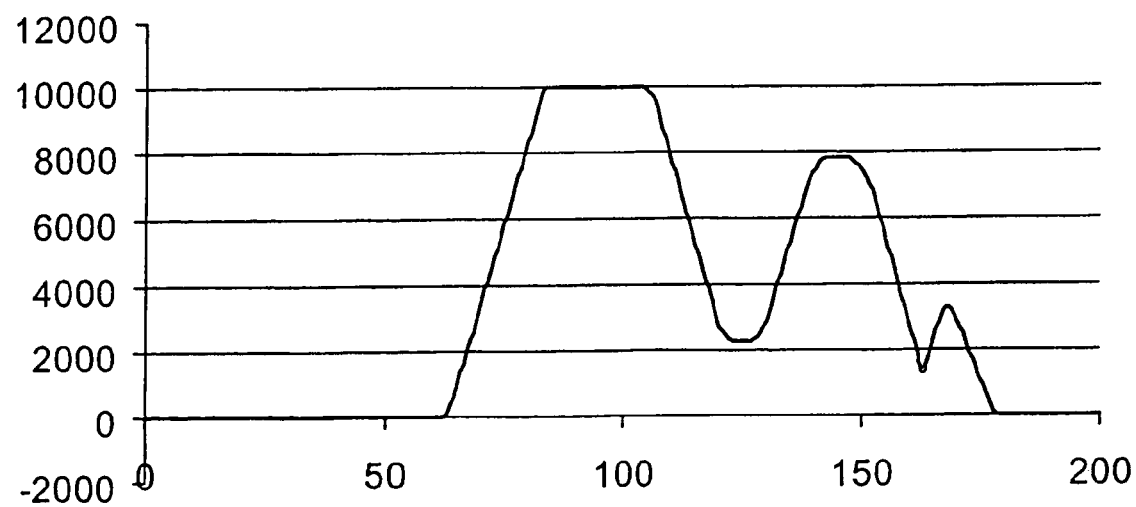

MULTIMODE HYBRID ENERGY RAILWAY VEHICLE SYSTEM AND METHOD

CROSS REFERENCE TO RELATED APPLICATIONS

The invention of the present application is a continuation-in-part of The invention of the present application is a continuation-in-part of U.S. patent application Ser. No. 10/435,261, filed on May 9, 2003, MULTIMODE HYBRID ENERGY RAILWAY VEHICLE SYSTEM AND METHOD, which claims priority from U.S. patent application Ser. No. 10/032,714, filed on Dec. 26, 2001, entitled LOCOMOTIVE ENERGY TENDER, and from U.S. Provisional Application Ser. No. 60/278,975, filed on Mar. 27, 2001, the entire disclosure of which are incorporated herein by reference.

FIELD OF THE INVENTION

The invention relates generally to vehicle systems and methods for use in connection with railways. In particular, the invention relates to a railway vehicle system operable from stored electrical energy, such as stored electrical energy being produced by a charging generator and by dynamic braking energy generated by electric traction motors during dynamic braking, the vehicle system being operable in a plurality of operating modes.

BACKGROUND OF THE INVENTION

FIG. 1A is a block diagram of an exemplary prior art locomotive 100. In particular, FIG. 1A generally reflects a typical prior art diesel-electric locomotive such as, for example, the AC6000 or the AC4400, both or which are available from General Electric Transportation Systems. As illustrated in FIG. 1A, the locomotive 100 includes a diesel engine 102 driving an alternator/rectifier 104. As is generally understood in the art, the alternator/rectifier 104 provides DC electric power to an inverter 106 that converts the AC electric power to a form suitable for use by a traction motor 108 mounted on a truck below the main engine housing. One common locomotive configuration includes one inverter/traction motor pair per axle. Such a Strictly speaking, an inverter converts DC power to AC power. A rectifier converts AC power to DC power. The term converter is also sometimes used to refer to inverters and rectifiers. The electrical power supplied in this manner may be referred to as prime mover power (or primary electric power) and the alternator/rectifier 104 may be referred to as a source of prime mover power. In a typical AC diesel-electric locomotive application, the AC electric power from the alternator is first rectified (converted to DC). The rectified AC is thereafter inverted (e.g., using power electronics such as IGBTs or thyristors operating as pulse width modulators) to provide a suitable form of AC power for the respective traction motor 108.

As is understood in the art, traction motors 108 provide the tractive power to move locomotive 100 and any other vehicles, such as load vehicles, attached to locomotive 100. Such traction motors 108 may be AC or DC electric motors. When using DC traction motors, the output of the alternator is typically rectified to provide appropriate DC power. When using AC traction motors, the alternator output is typically rectified to DC and thereafter inverted to three-phase AC before being supplied to traction motors 108.

The traction motors 108 also provide a braking force for controlling speed or for slowing locomotive 100. This is commonly referred to as dynamic braking, and is generally understood in the art. Simply stated, when a traction motor is not needed to provide motivating force, it can be reconfigured (via power switching devices) so that the motor operates as a generator. So configured, the traction motor generates electric energy which has the effect of slowing the locomotive. In prior art locomotives, such as the locomotive illustrated in FIG. 1A, the energy generated in the dynamic braking mode is typically transferred to resistance grids 110 mounted on the locomotive housing. Thus, the dynamic braking energy is converted to heat and dissipated from the system. In other words, electric energy generated in the dynamic braking mode is typically wasted.

It should be noted that, in a typical prior art DC locomotive, the dynamic braking grids are connected to the traction motors. In a typical prior art AC locomotive, however, the dynamic braking grids are connected to the DC traction bus because each traction motor is normally connected to the bus by way of an associated inverter (see FIG. 1B). FIG. 1A generally illustrates an AC locomotive with a plurality of traction motors; a single inverter is depicted for convenience.

FIG. 1B is an electrical schematic of a typical prior art AC locomotive. It is generally known in the art to employ at least two power supply systems in such locomotives. A first system comprises the prime mover power system that provides power to the traction motors. A second system provides power for so-called auxiliary electrical systems (or simply auxiliaries). In FIG. 1B, the diesel engine (see FIG. 1A) drives the prime mover power source 104 (e.g., an alternator and rectifier), as well as any auxiliary alternators (not illustrated) used to power various auxiliary electrical subsystems such as, for example, lighting, air conditioning/heating, blower drives, radiator fan drives, control battery chargers, field exciters, and the like. The auxiliary power system may also receive power from a separate axle driven generator. Auxiliary power may also be derived from the traction alternator of prime mover power source 104.

The output of prime mover power source 104 is connected to a DC bus 122 that supplies DC power to the traction motor subsystems 124A-124F. The DC bus 122 may also be referred to as a traction bus because it carries the power used by the traction motor subsystems. As explained above, a typical prior art diesel-electric locomotive includes four or six traction motors. In FIG. 1B, each traction motor subsystem comprises an inverter (e.g., inverter 106A) and a corresponding traction motor (e.g., traction motor 108A).

During braking, the power generated by the traction motors is dissipated through a dynamic braking grid subsystem 110. As illustrated in FIG. 1A, a typical prior art dynamic braking grid includes a plurality of contactors (e.g., DB1-DB5) for switching a plurality of power resistive elements between the positive and negative rails of the DC bus 122. Each vertical grouping of resistors may be referred to as a string. One or more power grid cooling blowers (e.g., BL1 and BL2) are normally used to remove heat generated in a string due to dynamic braking.

As indicated above, prior art locomotives typically waste the energy generated from dynamic braking. Attempts to make productive use of such energy have been unsatisfactory. For example, systems that attempt to recover the heat energy for later use to drive steam turbines require the ability to heat and store large amounts of water. Such systems are not suited for recovering energy to propel the locomotive itself. Another system attempted to use energy generated by a traction motor in connection with an electrolysis cell to generate hydrogen gas for use as a supplemental fuel source. Among the disadvantages of such a system are the safe storage of the hydrogen gas and the need to carry water for the electrolysis process. Still other prior art systems fail to recapture the dynamic braking energy at all, but rather selectively engage a special generator that operates when the associated vehicle travels downhill. One of the reasons such a system is unsatisfactory is because it fails to recapture existing braking energy.

Prior art hybrid energy railway vehicles typically operate from stored electric energy that is generated by a turbine engine and generator. Such hybrid energy railway vehicles rely on a turbine engine and generator as the sole source of stored electric energy on which to drive the traction motor of the hybrid energy railway vehicle. Such prior art hybrid energy railway vehicles fail to recapture dynamic braking energy generated by the traction motor of the hybrid energy railway vehicle and is required to turn on and off the turbine engine and generator as required by the level of charge of the hybrid energy railway vehicle storage system.

Therefore, there is a need for a multipurpose hybrid energy railway vehicle that can be used to capture and store the electrical energy, including electrical energy generated in the dynamic braking mode. There is further a need for such a hybrid energy railway vehicle that selectively regenerates the stored energy for later use. There is a need for a hybrid energy railway vehicle that is equipped with a resistive grid for dissipating energy. There is also a need for a hybrid energy railway vehicle configured to enable the on-board electric energy storage system to be charged from an external electric energy system 220. There is another need for a railway vehicle that can operate a plurality of modes of operation. For example, the hybrid energy railway vehicle could operate in a standalone operation or in a consist in combination with one or more locomotives. The hybrid vehicle could operate in anyone of several modes of operating modes including operating as a railway switcher, roadmate, pusher or electrical energy tender.

SUMMARY OF THE INVENTION

In one aspect, the invention relates to a hybrid energy railway vehicle system. The system includes a hybrid energy railway vehicle having a plurality of wheels. A traction motor has a motoring mode of operation for driving one of the wheels in response to electrical input energy. The traction motor also has a dynamic braking mode of operation for dynamically braking the traction motor and for generating dynamic braking electrical energy. The system also has an electrical energy storage system that is in electrical communication with the traction motor and that stores dynamic braking electrical energy generated by the traction motor. A converter selectively provides stored electrical energy from the energy storage system to the traction motor as electrical input energy for driving one or more of wheels.

In another aspect, the invention relates to a hybrid energy railway vehicle system. The system includes a hybrid energy railway vehicle having a plurality of wheels. A traction motor is coupled to at least one of the wheels and has a motoring mode of operation for driving the coupled wheel. The traction motor also has a dynamic braking mode of operation for braking the coupled wheel and for generating dynamic braking electrical energy. The system also has an electrical energy source for supplying charging electrical energy. An electrical energy storage system is in electrical communication with the energy source and the traction motor for storing electrical energy. The energy storage system stores the charging electrical energy supplied by the energy source and stores the dynamic braking electrical energy generated by the traction motor. The energy storage system selectively supplies stored electrical energy to the traction motor for driving the coupled wheel.

In another aspect, the invention relates to a hybrid energy railway vehicle system. The system includes a hybrid energy railway vehicle and an electrical energy source for supplying charging electrical energy. An electrical energy storage system stores the charging electrical energy supplied by the energy source. The system further includes a converter that is electrically coupled to the energy storage system such that the energy storage system selectively transfers stored electrical energy to the converter. The converter responds to the transferred stored electrical energy and provides hybrid energy railway vehicle drive energy. A traction motor is electrically coupled to the converter and is adapted to propel the hybrid energy railway vehicle in response to the railway vehicle drive energy. The system also includes a resistive grid electrically connected to the energy storage system. The resistive grid dissipates electrical energy selectively supplied thereto by the energy source.

In another aspect, the invention relates to a hybrid energy railway vehicle system. The system includes a hybrid energy railway vehicle and a computer readable medium having computer executable instructions for controlling an operation of the hybrid energy railway vehicle. The computer executable instructions define a plurality of hybrid energy railway vehicle operating modes. Each of the operating modes defines a set of operational parameters. A processor is configured to control an operation of the hybrid energy railway vehicle as a function of at least one of the operating modes as a function of a desired use of the hybrid energy railway vehicle.

In yet another aspect, the invention relates to a method of operating a hybrid energy railway vehicle system. The method includes supplying charging electrical energy with an electrical energy source and storing the charging electrical energy in an electrical energy storage system to produce stored electrical energy. The method also includes operating a traction motor in a dynamic braking mode to generate dynamic braking electrical energy and storing the dynamic braking electrical energy in the energy storage system to also produce stored electrical energy. The method further includes supplying stored electrical energy to the traction motor and operating the traction motor in a motoring mode in response to the supplied stored electrical energy for driving on or more wheels of the hybrid energy railway vehicle.

In still another aspect, the invention relates to a method of operating a hybrid energy railway vehicle system. The method includes operating a traction motor in a dynamic braking mode to generate dynamic braking electrical energy and storing the dynamic braking electrical energy in an energy storage system to produce stored electrical energy. The method also includes supplying stored electrical energy to the traction motor; and operating the traction motor in a motoring mode in response to the supplied stored electrical energy for driving one or more wheels of the hybrid energy railway vehicle.

In another aspect, the invention relates to a method of operating a hybrid energy railway vehicle system. The method includes receiving external electrical energy from an external electrical energy system and storing the received external electrical energy in an electrical energy storage system to produce stored electrical energy. The method also includes supplying stored electrical energy to the external electrical energy system.

In still another aspect, the invention relates to a method of operating a hybrid energy railway vehicle system. The method includes receiving external electrical energy from an external electrical energy system and storing the received external electrical energy in an electrical energy storage system to produce stored electrical energy. The method also includes supplying stored electrical energy to a traction motor and operating the traction motor in a motoring mode in response to the supplied stored electrical energy for driving on or more wheels of the hybrid energy railway vehicle.

In another aspect, the invention relates to a method of operating a hybrid energy railway vehicle system. The method includes operating a traction motor in a dynamic braking mode to generate dynamic braking electrical energy and storing dynamic braking electrical energy in an energy storage system to produce stored electrical energy. The method also includes supplying stored electrical energy to an external electrical energy system.

In still another aspect, the invention relates to a method of operating a hybrid energy railway vehicle system. The method includes defining a plurality of operating modes, each of the plurality of operating modes defining a set of operational parameters and specifying a value for each of the operational parameters in the set of operational parameters as a function of an optimization characteristic. The method further includes controlling an operation of the hybrid energy railway vehicle as a function of a particular set of operational parameters defined by a particular operating mode in response to a desired use of the hybrid energy railway vehicle.

BRIEF DESCRIPTION OF THE DRAWINGS

FIGS. 8A-8E are timing diagrams that illustrate another embodiment energy management system for controlling the storage and regeneration of energy, including dynamic braking energy.

Corresponding reference characters and designations generally indicate corresponding parts throughout the drawings.

DETAILED DESCRIPTION OF THE INVENTION

Figure 2:
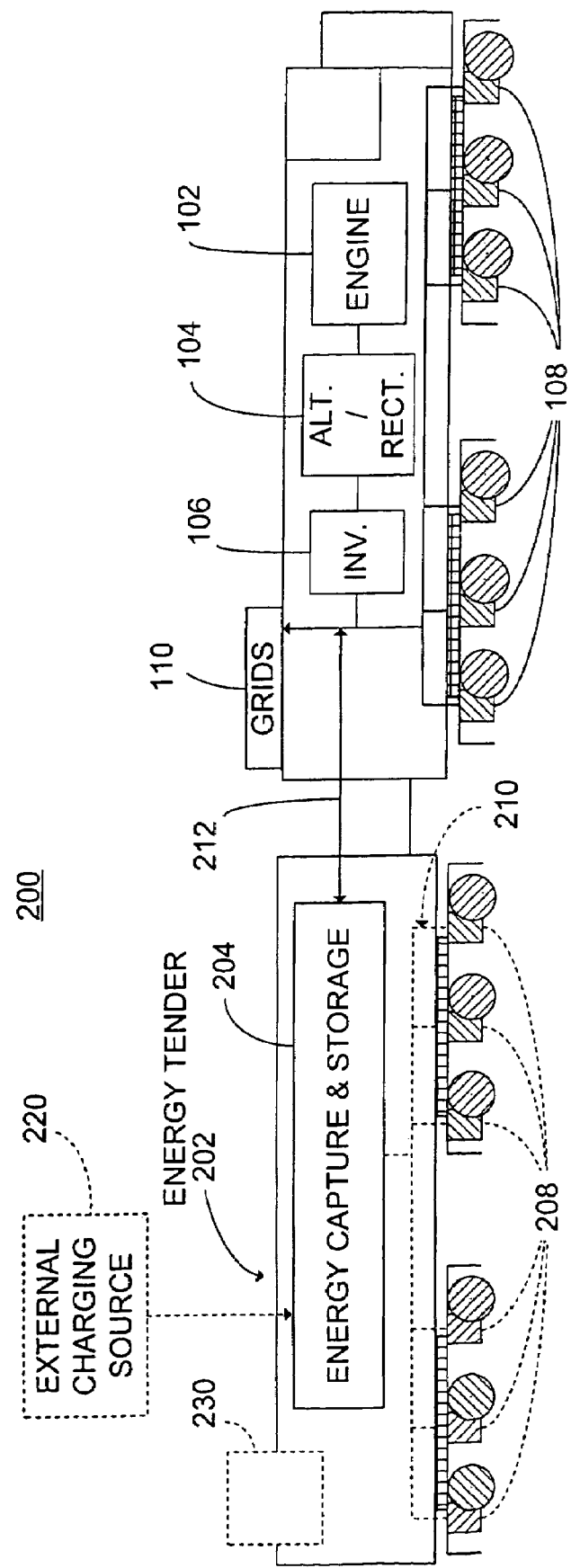
FIG. 2 is a block diagram of one embodiment of a hybrid energy locomotive system having a separate energy tender vehicle.

FIG. 2 is a block diagram of one embodiment of a hybrid energy locomotive system 200. In this embodiment, the hybrid energy locomotive system 200 preferably includes an energy tender vehicle 202 for capturing and regenerating at least a portion of the dynamic braking electric energy generated when the locomotive traction motors operate in a dynamic braking mode. The energy tender vehicle 202 is constructed and arranged to be coupled to the locomotive in a consist configuration, and includes an energy capture and storage system 204 (sometimes referred to as an energy storage medium or an energy storage). It should be understood that it is common to use two or more locomotives in a consist configuration and that FIG. 2 illustrates a single locomotive for convenience.

In one embodiment, the energy capture and storage system 204 selectively receives electrical power generated during the dynamic braking mode of operation and stores it for later regeneration and use. In the alternative or in addition to receiving and storing dynamic braking power, energy capture and storage system 204 can also be constructed and arranged to receive and store power from other sources. For example, excess prime mover power from engine 102 can be transferred and stored. Similarly, when two or more locomotives are operating in a consist, excess power from one of the locomotives can be transferred and stored in energy capture and storage system 204. Also, a separate power generator (e.g., diesel generator) can be used to supply a charging voltage (e.g., a constant charging voltage) to energy capture and storage system 204. Still another source of charging is an optional off-train charging source 220. For example, energy capture and storage system 204 can be charged by external sources such as a battery charger in a train yard or at a wayside station. Additional examples of external energy system 220 include a locomotive, a second hybrid energy railway vehicle, an electric grid or distribution line, a third rail, or an electrical overhead line.

The energy capture and storage system 204 preferably includes at least one of the following storage subsystems for storing the electrical energy generated during the dynamic braking mode: a battery subsystem, a flywheel subsystem, or an ultracapacitor subsystem. Other storage subsystems are possible. These storage subsystems may be used separately or in combination. When used in combination, these storage subsystems can provide synergistic benefits not realized with the use of a single energy storage subsystem. A flywheel subsystem, for example, typically stores energy relatively fast but may be relatively limited in its total energy storage capacity. A battery subsystem, on the other hand, often stores energy relatively slowly but can be constructed to provide a relatively large total storage capacity. Hence, a flywheel subsystem may be combined with a battery subsystem wherein the flywheel subsystem captures the dynamic braking energy that cannot be timely captured by the battery subsystem. The energy thus stored in the flywheel subsystem may be thereafter used to charge the battery. Accordingly, the overall capture and storage capabilities are preferably extended beyond the limits of either a flywheel subsystem or a battery subsystem operating alone. Such synergies can be extended to combinations of other storage subsystems, such as a battery and ultracapacitor in combination where the ultracapacitor supplies the peak demand needs.

It should be noted at this point that, when a flywheel subsystem is used, a plurality of flywheels is preferably arranged to limit or eliminate the gyroscopic effect each flywheel might otherwise have on the locomotive and load vehicles. For example, the plurality of flywheels may be arranged on a six-axis basis to greatly reduce or eliminate gyroscopic effects. It should be understood, however, that reference herein to a flywheel embraces a single flywheel or a plurality of flywheels.

Referring still to FIG. 2, energy capture and storage system 204 not only captures and stores electric energy generated in the dynamic braking mode of the locomotive, it also supplies the stored energy to assist the locomotive effort (i.e., to supplement and/or replace prime mover power). For example, energy tender vehicle 202 optionally includes a plurality of energy tender traction motors 208 mounted on the trucks supporting energy tender vehicle 202. The electrical power stored in energy capture and storage system 204 may be selectively supplied (i.e., via lines 210) to the energy tender traction motors 208. Thus, during times of increased demand, energy tender traction motors 208 augment the tractive power provided by locomotive traction motors 108. As another example, during times when it is not possible to store more energy from dynamic braking (e.g., energy capture and storage system 204 is charged to capacity), efficiency considerations may suggest that energy tender traction motors 208 also augment locomotive traction motors 108.

It should be appreciated that when energy capture and storage system 204 drives energy tender traction motors 208, additional circuitry will likely be required. For example, if energy capture and storage system 204 comprises a battery storing and providing a DC voltage, one or more inverter drives may be used to convert the DC voltage to a form suitable for use by the energy tender traction motors 208. Such drives are preferably operationally similar to those associated with the main locomotive.

Rather than (or in addition to) using the electrical power stored in energy capture and storage system 204 for powering separate energy tender traction motors 208, such stored energy may also be used to augment the electrical power supplied to locomotive traction motors 108 (e.g., via line 212).

Other configurations are also possible. For example, the locomotive itself may be constructed and arranged (e.g., either during manufacturing or as part of a retrofit program) to capture, store, and regenerate excess electrical energy, such as dynamic braking energy or excess motor power. In another embodiment, a locomotive may be replaced with an autonomous tender vehicle. In still another embodiment, similar to the embodiment illustrated in FIG. 2, the separate energy tender vehicle is used solely for energy capture, storage, and regeneration—the tender does not include the optional traction motors 208. In yet another embodiment, a separate tender vehicle is replaced with energy capture and storage subsystems located on some or all of the load units attached to the locomotive. Such load units may optionally include separate traction motors. In each of the foregoing embodiments, the energy capture and storage subsystem can include one or more of the subsystems previously described.

When a separate energy tender vehicle (e.g., energy tender vehicle 202) is used, the tender vehicle 202 and the locomotive are preferably coupled electrically (e.g., via line 212) such that dynamic braking energy from the locomotive traction motors and/or from optional energy tender traction motors 208 is stored in energy storage means on board the tender. During motoring operations, the stored energy is selectively used to propel locomotive traction motors 108 and/or optional traction motors 208 of tender vehicle 202. Similarly, when the locomotive engine produces more power than required for motoring, the excess prime mover power can be stored in energy capture and storage 202 for later use.

Figure 13:
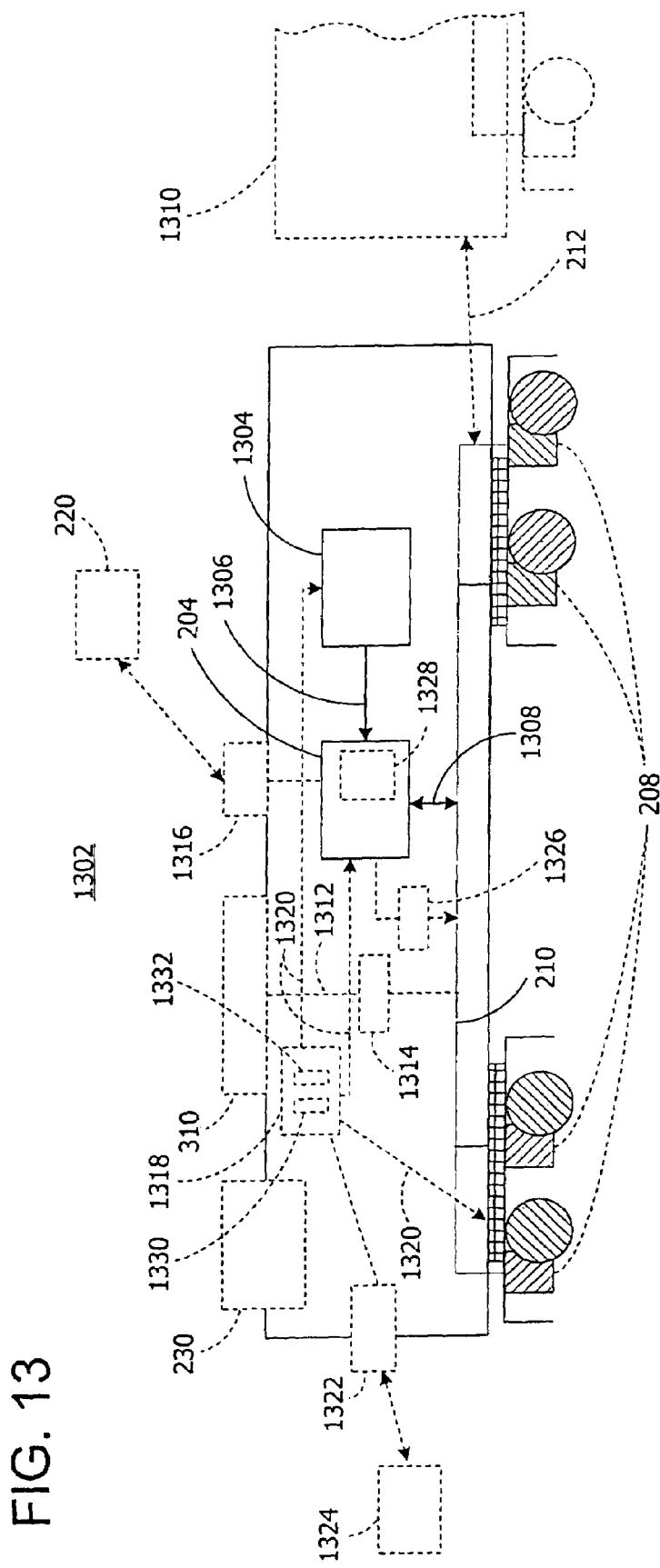
FIG. 13 is a block diagram of one embodiment of a multi-purpose hybrid energy railway vehicle.
Figure 14:
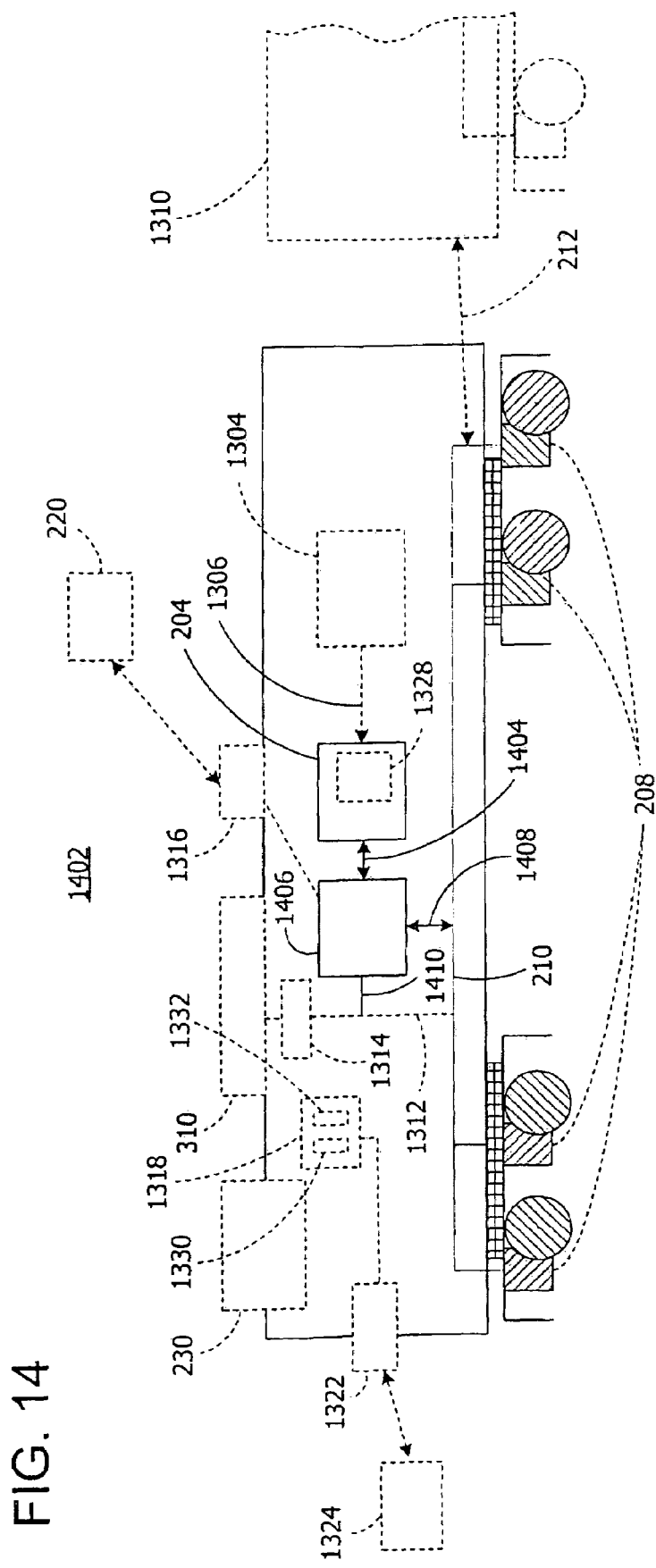
FIG. 14 is a block diagram of another embodiment of a multipurpose hybrid energy railway vehicle.

If energy tender vehicle 202 is not electrically coupled to the locomotive (other than for standard control signals), traction motors 208 on the tender vehicle can also be used in an autonomous fashion to provide dynamic braking energy to be stored in energy capture and storage system 204 for later use. One advantage of such a configuration is that tender vehicle 202 can be coupled to a wide variety of locomotives in almost any consist. Examples of embodiments of an autonomous tender vehicle such as a multipurpose hybrid energy railway vehicle are illustrated in FIGS. 13 and 14 and are described below. When the tender vehicle 202 is positioned apart from the locomotive (i.e., not in electrical connection), control of the operation of the tender for regenerating and storing power or for using stored power to generate tractive effort to propel the train may be effected from a lead locomotive via a wireless connection such as the commercially available Locotrol distributed power system offered by the assignee, General Electric Company, or from wayside via wireless remote control locomotive devices or radio control towers such as those used at rail yards.

It should be appreciated that when energy tender traction motors 208 operate in a dynamic braking mode, various reasons may counsel against storing the dynamic braking energy in energy capture and storage system 204 (e.g., the storage may be full). Thus, it is preferable that dynamic braking energy is selectively dissipated by grids (not shown) associated with energy tender vehicle 202, or transferred to locomotive grids 110 (e.g., via line 212).

Figure 1A:
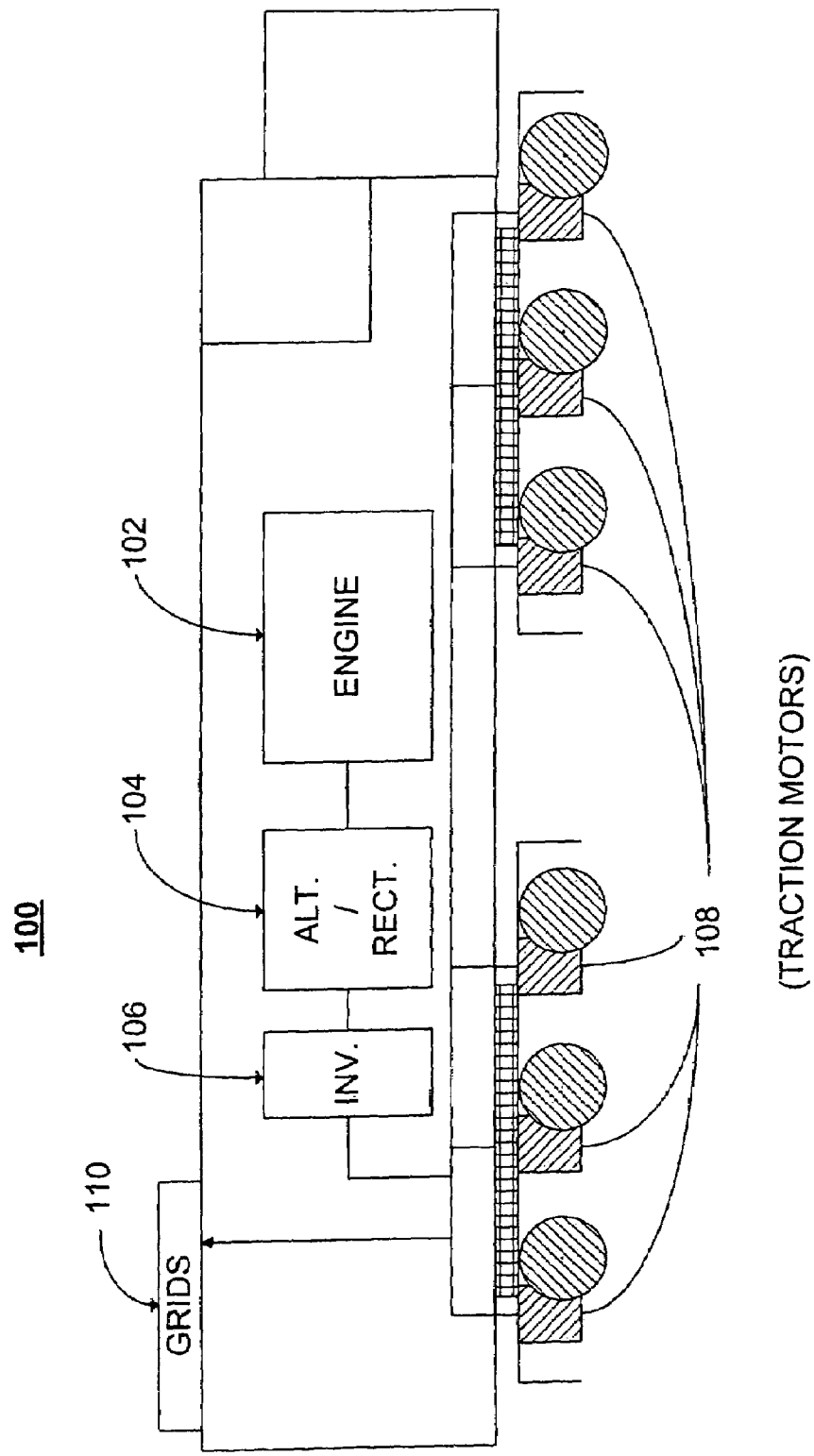
FIG. 1A is a block diagram of a prior art diesel-electric locomotive.
Figure 1B:
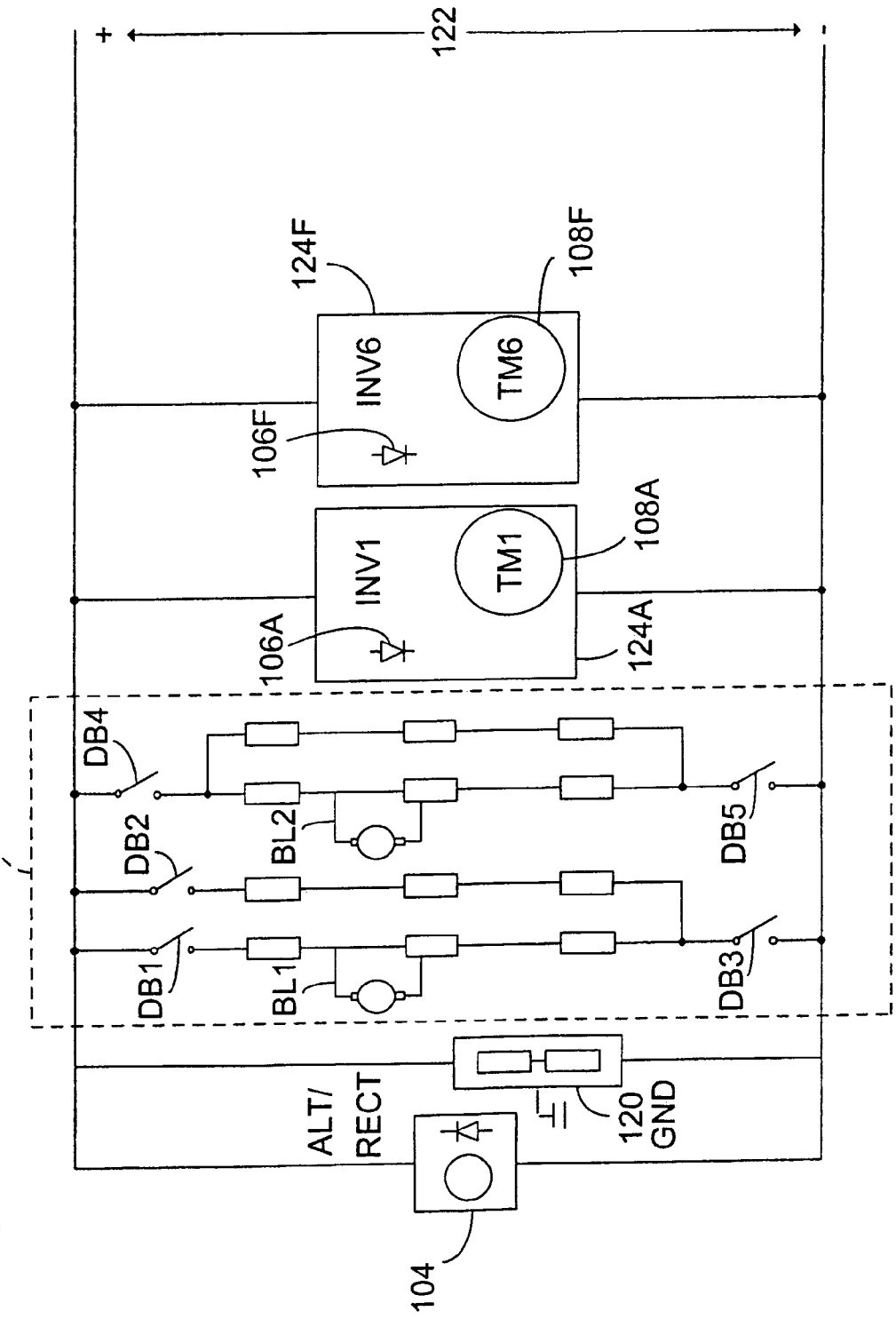
FIG. 1B is an electrical schematic of a prior art AC diesel-electric locomotive.

The embodiment of FIG. 2 will be further described in terms of one possible operational example. It is to be understood that this operational example does not limit the invention. The locomotive system 200 is configured in a consist including a locomotive (e.g., locomotive 100 of FIG. 1), an energy tender vehicle 202, and at least one load vehicle. The locomotive may be, for example, an AC diesel-electric locomotive. Tractive power for the locomotive is supplied by a plurality of locomotive traction motors 108. In one preferred embodiment, the locomotive has six axles, each axle includes a separate locomotive traction motor 108, and each traction motor 108 is an AC traction motor 108. The locomotive includes a diesel engine 102 that drives an electrical power system. More particularly, the diesel engine 102 drives an alternator/rectifier 104 that comprises a source of prime mover electrical power. (sometimes referred to as traction power or primary power). In this particular embodiment, the prime mover electrical power is DC power that is converted to AC power for use by the traction motors 108. More specifically, one or more inverters (e.g., inverter 106) receive the prime mover electrical power and selectively supply AC power to the plurality of locomotive traction motors 108 to propel the locomotive. Thus, locomotive traction motors 108 propel the locomotive in response to the prime mover electrical power.

Each of the plurality of locomotive traction motors 108 is preferably operable in at least two operating modes, a motoring mode and a dynamic braking mode. In the motoring mode, the locomotive traction motors 108 receive electrical power (e.g., prime mover electrical power via inverters) to propel the locomotive. As described elsewhere herein, when operating in the dynamic braking mode, the traction motors 108 generate electricity. In the embodiment of FIG. 2, energy tender vehicle 202 is constructed and arranged to selectively capture and store a portion of the electricity generated by the traction motors 108 during dynamic braking operations. This is accomplished by energy capture and storage system 204. The captured and stored electricity is selectively used to provide a secondary source of electric power. This secondary source of electric power may be used to selectively supplement or replace the prime mover electrical power (e.g., to help drive one or more locomotive traction motors 108) and/or to drive one or more energy tender traction motors 208. In the latter case, energy tender traction motors 208 and locomotive traction motors 108 cooperate to propel the consist.

Advantageously, energy capture and storage system 204 can store dynamic braking energy without any electrical power transfer connection with the primary locomotive. In other words, energy capture and storage system 204 can be charged without a connection such as line 212. This is accomplished by operating the locomotive engine 102 to provide motoring power to locomotive traction motors 108 while operating tender vehicle 202 in a dynamic braking mode. For example, the locomotive engine 102 may be operated at a relatively high notch setting while tender vehicle traction motors 208 are configured for dynamic braking. Energy from the dynamic braking process can be used to charge energy capture and storage system 204. Thereafter, the stored energy can be used to power energy tender traction motors 208 to provide additional motoring power to the train. As further discussed below, in other embodiments, a second engine 302 may be one embodiment of a charging source that is located on a second vehicle 301 (See FIG. 3 and discussion below) or on a hybrid energy railway vehicle 1302 as a hybrid energy railway vehicle charging. electric energy source 1304. In such arrangements, energy capture and storage system 204 can be charged by means of the second charging engine 302 or hybrid energy railway vehicle charging source 1304. In yet another embodiment, energy capture and storage system 204, whether located on the locomotive and/or the tender 202, may be charged from an external electric energy system 220. One of the advantages of such a configurations are that tender vehicle 202 can be placed anyway in the train. For example, in one wireless embodiment, tender vehicle 202 provides its own local power (e.g., for controls or lighting) and communicates via a radio link with other vehicles in the train, as necessary. An air brake connection would likely also be connected to tender vehicle 202. Of course, minimal wiring such as standard lighting wiring and control wiring could be optionally routed to tender vehicle 202, if so desired.

It is known in the art that diesel-electric locomotives are often loud and the vibrations associated with the engine make the environment uncomfortable for train operators. Accordingly, in one embodiment, a tender vehicle 202 is modified to include an operator compartment such that the train engineer can operate the train from the relative comfort of the tender, rather than from the locomotive. FIG. 2 reflects this schematically at the aft end of tender 202 with reference character 230. Additionally, in the embodiment where the tender vehicle 202 operates in an autonomous mode, a train operator can operate the tender vehicle 202 as an autonomous hybrid energy railway vehicle 1302 or switcher and can control the operation of other railway vehicles. The tender 202 may also be configured to operate without primary power generation equipment, dynamic braking grids 110 and/or traction motors 208 onboard the tender vehicle 200, and thus function essentially be a carrier platform for the electrical energy capture system. In that regard, energy storage devices (i.e., batteries, ultracapacitors, fuel cells or even flywheels) are generally quieter and produce less vibration and heat than power generation equipment (particularly diesel engines). The operator compartment can be more comfortable if positioned on a tender 202 without such power generation equipment.

As indicated above the dynamic braking grids 110 may be located away from the operator compartment to afford greater operator comfort. But even if the dynamic braking grids 110 are located on the same vehicle as the operator compartment, a significant portion of the dynamic braking energy is stored in the electrical energy capture system 204 on the hybrid vehicles of the instant inventions, and thus one of the biggest noise sources is significantly reduced.

Figure 3:
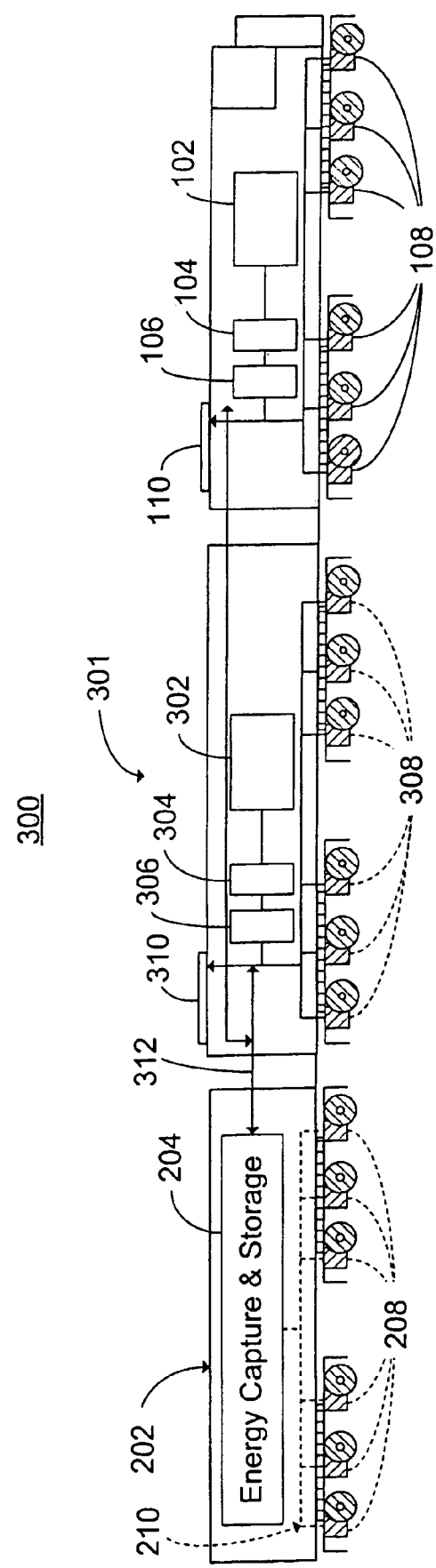
FIG. 3 is a block diagram of one embodiment of a hybrid energy locomotive system having a second engine for charging an energy storage system, including an energy storage system associated with an energy tender vehicle.

FIG. 3 is a block diagram of another embodiment of a hybrid energy locomotive system 300. This embodiment includes a second engine vehicle 301 for charging the energy tender vehicle 202. The second engine vehicle 301 comprises a diesel engine 302 that is preferably smaller than the main locomotive engine 102, but which otherwise operates according to similar principles. For example, second engine vehicle 301 comprises an alternator/rectifier 304 (driven by the second engine 302), one or more inverters 306, and a plurality of braking grids 310. In one embodiment, second engine 302 runs at a constant speed to provide a constant charging source (e.g., 200-400 hp) for energy tender vehicle 202. Thus, when a hybrid energy locomotive system is configured as shown in FIG. 3, energy capture and storage system 204 preferably receives charging energy from one or both of the primary locomotive (e.g., dynamic braking energy), and second engine vehicle 301 (e.g., direct charging) via line 312. It should be understood that, although second engine vehicle 301 is shown as a separate vehicle, it could also be included, for example, as an integral part of energy tender vehicle 202 or a load vehicle. As discussed above and further discussed below in regard to FIGS. 13 and 14, the hybrid energy tender vehicle may operate in an autonomous operating mode as a hybrid energy railway vehicle 1302 where the hybrid energy railway vehicle 1302 is equipped with a charging electric energy source 1304 or a second engine 302 for charging energy capture and storage system 204. Also, dynamic braking generators (e.g., via traction motors 308) could be optionally included with second engine 301 thereby providing an additional source of power for storage in energy capture and storage system 204.

FIG. 13 is an embodiment of a multipurpose hybrid energy railway vehicle 1302 configured to operate in an autonomous operating mode, e.g., autonomous from a locomotive. The embodiment of FIG. 13 includes a charging electric energy source 1304 that provides charging electric energy 1306 to energy capture and storage system 204. Such charging electric energy source 1304 may be comprised of a diesel engine, a gasoline engine, a natural gas engine, a fuel cell, a gas turbine, an electric generator, an alternator and/or an inverter. Charging electric energy source 1304 may provide a steady charging source to energy capture and storage system 204 independent of the charge level energy capture and storage system 204 or may cycle on or off or at various operating levels based on the charge level or charging requirements of the energy capture and storage system 204.

In the embodiment where the charging electric energy source 1304 operates independent of the charge level of the energy capture and storage system 204, all or a portion of the charging electric energy 1306 not required by energy capture and storage system 204 may be transferred to another vehicle via the external energy transfer interface 1316 including a locomotive or to another hybrid energy railway vehicle 1302. Such external energy transfer interface 1316 may be adapted to be detachably connected to any external energy system 220 including a locomotive, a second hybrid energy railway vehicle 1302, an electric grid, an electric third rail, an electrical overhead line, or an external energy storage system. The hybrid locomotive and/or tender 202 may thus be operated so that at the completion of a leg of the travel path, energy will have been stored in the energy storage system and thus will be available for transfer to other vehicles, such as pushers to help propel another train, or connected to a suitable external energy system (e.g., 220).

The hybrid energy railway vehicle 1302 supplies the stored electric energy 1308 as stored in energy capture and storage system 204 to the hybrid energy railway vehicle traction motors 208 Via traction bus 210. The hybrid energy railway vehicle traction motors 208 operate in response to the provided stored electric energy (shown by line 1308) to propel the hybrid energy railway vehicle 1302 on the plurality of hybrid energy railway vehicle wheels (as shown).

As discussed above, the hybrid energy railway vehicle traction motor 208 also operates in a dynamic braking mode of operation to generate dynamic braking electric energy. The dynamic braking electric energy is provide to energy capture and storage system 204 where it is stored (shown as line 1308) as stored electric energy. Such stored dynamic braking electric energy is provided to the hybrid energy railway vehicle traction motor 208 as stored electric energy during the motoring mode of the traction motor 208.

The hybrid energy railway vehicle 1302 may also be configured with a resistive grid 310 that is electrically coupled by any electrical coupling including the traction system bus 210 as shown in FIG. 13 as electrical connection line 1312. A circuit may be electrically connected between the resistive grid 310 and the traction system bus 210 and may be controlled by a control system 1318, the energy capture and storage system 204 or other means including energy management system 502. The circuit 1314 selectively supplies dynamic braking electric energy to the resistive grid 310 where the resistive grid 310 dissipates the supplied dynamic braking electric energy. In another embodiment, the circuit 1314 may selectively supply charging energy to the resistive grid. As discussed above, the charging electric energy source 1304 may operate to provide more charging electric energy 1306 than required by energy capture and storage system 204. In such a case, the charging electric energy source 1304 may continue to operate with the circuit 1314 supplying any excess charging electric energy to the resistive grid 310. In yet another embodiment, the electric energy capture and storage system 204 may be electrically connected to the resistive grid 310. In such an embodiment, the circuit 1314 may selectively supply stored electric power to the resistive grid 310. The supplying of stored electric power to the resistive grid 310 may be desired when an anticipated requirement for storage capacity for storing dynamic braking energy may exceed the current charging capacity of the energy capture and storage system 204.

In another embodiment similar to that discussed above with regard to FIGS. 2 and 3, the hybrid energy railway vehicle 1302 is electrically coupled to a locomotive 1310 via electrical coupling 212 or external energy transfer interface 1316. In such an embodiment, the locomotive 1310 has a prime mover electrical generation system (such as shown in FIG. 2 as 102, 104, and 106) and a traction motor (not shown) having a dynamic braking mode of operation. The locomotive 1310 provides energy capture and storage system 204 of the hybrid energy railway vehicle 1302 with locomotive prime mover electrical energy and/or locomotive dynamic braking electric energy. Such provided locomotive prime mover or dynamic braking electric energy is stored by energy capture and storage system 204 and provided as stored electric energy. In the alternative, energy capture and storage system 204 of the hybrid energy railway vehicle 1302 provides the stored electric energy to the locomotive 1310 via the electrical coupling 212. In such an arrangement, a traction motor of the locomotive 1310 is operable in response to the supplied stored electric energy to propel the locomotive 1310.

The hybrid energy railway vehicle 1302 may also be configured with a control system 1318. The control system 1318 controls one of more operations of the hybrid energy railway vehicle 1302 or components of the hybrid energy railway vehicle 1302. Such controlled operations may be distributed to the various components or operations of the hybrid energy railway vehicle 1302 via control lines 1320. As shown in FIG. 13, control system 1318 may control the traction motor 208, energy capture and storage system 204, the charging electric energy source 1304, the resistive grids 310, and the external energy transfer interface 1316.

In one embodiment, the control system 1318 comprises a computer readable medium 1332 having computer executable instructions for controlling the operation of the hybrid energy railway vehicle 1302. As discussed in greater detail below, the computer executable instructions may define a plurality of hybrid energy railway vehicle 1302 operating modes. Each of the operating modes defines a profile or set of operational parameters. The control system 1318 may be configured with one or more processors 1330 and the computer readable medium 1332. The processor 1330 of the control system 1318 controls an operation of the hybrid energy railway vehicle 1302 by controlling one or more operational characteristics of the hybrid energy railway vehicle. 1302 consistent with or as a function of the set of operational parameters associated with a selected or defined operating mode. For example, the processor 1330 executes computer executable instructions to control the operation of the hybrid energy railway vehicle as a function of at least one of the operating modes. The control system 1318 or components thereof may be located on the hybrid energy railway vehicle 1302 or may in whole or part be located remote from the hybrid energy railway vehicle 1302. For example, the computer readable medium 1332 containing the computer executable instructions may be located at a remote data center or railway operations center (see 1324). A processor 1330 located on the hybrid energy railway vehicle 1302 queries the remote data center and the computer executable instructions are communicated to the processor 1330 from the remote computer readable medium 1332 as required to operate the hybrid energy railway vehicle 1302 in a desired mode of operation.

As discussed above, hybrid energy railway vehicle 1302 may be operable in a plurality of operating modes. In one embodiment, each operating mode is customized to optimize the operation of the hybrid energy railway vehicle 1302 for a particular type of operation. The modes of operation may be defined and controlled by the control system 1318 as described above. For example, in one embodiment the hybrid energy railway vehicle 1302 may have a plurality of discreet operating modes including a railway switcher mode, a railway roadmate mode, a railway pusher mode, or a railway energy tender mode.

Each mode of operation defines one or more operating profiles. Each operating profile defines one or more operating characteristics, parameters or configurations of the hybrid energy railway vehicle 1302. Operating parameters vary by operating profile or operating mode and include one or more of the following: storing in the energy capture and storage system 204; energy capture and storage system 204 configuration; generating and capturing of dynamic braking energy; dissipating of dynamic braking energy, charging energy, or stored energy by the resistive grid 310; operating the charging electric energy source 1304; operating a generator to generate charging electric energy in response to the operation of the charging source 1304; transferring of stored, charging, or dynamic braking electric energy to an external electric energy system 220; receiving external electric energy from an external electric energy system 220 or another vehicle such as a locomotive 1310, another hybrid energy railway vehicle 1302 or an energy tender 202; supplying of stored energy to another vehicle; operating the tender motor 208 in the motoring mode or dynamic braking mode; receiving a control command from an external control system 1324; and transmitting control commands to remote vehicles.

A hybrid energy railway vehicle 1302 operating in a switcher mode is used in a railway operation for moving railway vehicles such as rolling stock or idle locomotives around a railway yard or terminal in order to configure a train comprised of one or more locomotives and one or more rolling stock railway vehicles. A switcher is often used for moving and collecting railway vehicles over a relatively short distance and is not required for long-haul trips.

When operating in the switcher mode, the hybrid energy railway vehicle 1302 is required to stand idle for long periods of time or long periods of idling while rolling stock and locomotives are coupled to other railway vehicles. In such as mode, the hybrid energy railway vehicle 1302 is required to provide immediate high tractive power and to maintain full power during its short interval of operation. Such a configuration requires that the switcher mode operate the hybrid energy railway vehicle 1302 by providing stored electric energy at a relatively low energy, but a high power level. During idle periods, the switcher mode operates at a low operating power level but a high energy storage level to sustain the low power demand and the low power charging levels. When operating in the switcher mode, the hybrid energy railway vehicle 1302 charges the energy capture and storage system 204 from an onboard charging energy source 1304 or from an external energy system 220. Excess charging energy may be dissipated in the resistive grid 310 or may be discharged to an external energy system 220. The resistive grid 310, however, are not be configured to dissipate high energy levels which are often associated with a locomotive resistive grid as only small amounts of dynamic braking energy will be required to be dissipated by the resistive grid 310.

In one embodiment of the operating the hybrid energy railway vehicle 1302 in the switcher mode, the switch mode defines a particular set of the operational parameters as described above. As an example, the energy capture and storage system 204 may be configured to provide the high power electrical energy level to the traction motor 208 for short periods of time to motor the hybrid energy railway vehicle 1302 around the rail yard. The energy capture and storage system 204 is configured to receive charging electrical energy at a low level and steady basis from the energy charging source 1304. Additionally, the energy capture and storage system 204 may be configured to receive charging electrical energy from an external energy system 220. In contrast to other operating modes, the switcher mode is not configured to receive or supply high energy levels to an external electrical energy system 220. Additionally, as the switcher mode is used around the railway yard, the system is not configured to receive a high levels of dynamic braking energy from the traction motor 208.

A hybrid energy railway vehicle 1302 operating in a pusher mode provides additional tractive effort and power to the consist in a train. The pusher mode may be used to assist a consist propelling a train traveling uphill where the additional tractive effort is only required for a small segment of the total track traversed by the train. The pusher mode may also operate as a braker, whereby the pusher assists a train traveling downhill by providing additional braking effort. A hybrid energy railway vehicle 1302 operating in the pusher mode typically involves attaching the hybrid energy railway vehicle 1302 to the train at the bottom of a hill. The pusher provides tractive effort during the climb up the hill discharging the stored electric energy from the energy capture and storage system 204 to propel the traction motor 208. At the top of the hill, the pusher is disconnected from the train that continues motoring on the track. The pusher mode hybrid energy railway vehicle 1302 is attached to a different train traveling in the opposite direction to provide additional dynamic braking going down the hill. During the dynamic braking, dynamic braking energy is generated by the traction motor 208 and is stored in the energy capture and storage system 204. The dynamic braking energy replenishes some of all of the stored energy utilized during the earlier climb up the hill. This cycle of discharging and charging the energy capture and storage system 204 is repeated in each operation of the hybrid energy railway vehicle 1302 operating in the pusher mode of operation.

In one embodiment of operating the hybrid energy railway vehicle 1302 in the pusher mode, the energy capture and storage system 204 is configured to deliver high energy levels to the traction motor 208 over an extended period of time traveling up the hill. The energy capture and storage system 204 is also configured to store high levels of dynamic braking energy generated by the traction motor 208 during extended periods of dynamic braking during decent down the hill. Furthermore, resistive grids and the cooling system (not shown) for the resistive grids is configured to dissipate excess dynamic braking energy not required for storage by the energy capture and storage system 204. In the pusher operating mode, the energy capture and storage system 204 is configured to cycle continuous between delivering high amounts of stored energy to the traction motor 208 and receiving high amounts of dynamic braking energy from the traction motor 208 or from another vehicle such as an electrically coupled locomotive. Additionally, resistive grid 310 dissipates high levels of dynamic braking energy. In this mode of operation, charging the energy capture and storage system 204 from a electrical energy source 1304 or from an external electric energy system 220 may be provided but may not be necessary.

A hybrid energy railway vehicle 1302 operating in a energy tender mode operates as an electric energy storage vehicle and does not provide additional tractive effort or dynamic braking effort to a consist or train. In such a configuration, the hybrid energy railway vehicle 1302 is mechanically and electrically coupled to a locomotive 1310 or to another hybrid energy railway vehicle 1302 that supplies external electric energy to the energy tender. The hybrid energy railway vehicle 1302 receives and stores the external electric energy provided by the locomotive 1310. The locomotive 1310 provides external electric energy generated by its prime mover power source, typically a diesel engine and generator, or dynamic braking energy generated by a traction motor of the other vehicle during dynamic braking.

When the hybrid energy railway vehicle 1302 is operating in the energy tender mode, the electrical energy configuration of the hybrid energy railway vehicle 1302 is a function of the electric energy and operating characteristics of the supplying vehicle, the locomotive 1310 or another hybrid energy railway vehicle 1302. For example, in one embodiment of a locomotive 1310, the locomotive prime mover produces 4,400 HP of electric energy and the locomotive traction system is capable of utilizing up to 6,000 HP of electric energy. As such, 1,600 HP of electric energy may be provided from stored electric energy of the hybrid energy railway vehicle 1302 to the locomotive traction system to provide supplemental electrical energy to derive additional locomotive tractive effort. The high horsepower requirement of the locomotive traction system and therefore the high level of supplied stored electric energy may be required for only a few minutes or may be required for a few hours. However, for the majority of operating time of the locomotive 1310 and the hybrid energy railway vehicle 1302 operating in the energy tender mode, the power production and usage levels are considerably less these high levels. As such, the energy tender mode configures the hybrid energy railway vehicle 1302 to provide high levels of electric energy to the locomotive for short periods of time.

During dynamic braking, the traction motors of a locomotive can produce 5,200 to 7,800 HP of electric energy during dynamic braking. Some or all of the locomotive dynamic braking electric energy may be provided to the energy capture and storage system 204 of the hybrid energy railway vehicle 1302 for storage. As the production of dynamic braking energy at these levels may also only be available for short periods of time, the energy capture and storage system 204 and the hybrid energy railway vehicle 1302 is configured to receive and store these high levels of electric energy and provide high power output at the same time.

In one embodiment of the energy tender mode, the energy capture and storage system 204 is configured to receive large amounts of electrical energy from an electrically connected locomotive 1310 during periods of locomotive dynamic braking. The energy capture and storage system 204 is configured to provide an optimal level of stored electric energy to supplement the primary electric energy driving the traction motor of the locomotive 1310. In the energy tender mode, the hybrid energy railway vehicle 1302 is not configured to generate its own charging electric energy or its own dynamic braking electrical energy. Additionally, all stored electric energy would be provided to the locomotive 1310 and none of the stored electric energy is supplied to the traction motor 208 of the hybrid energy railway vehicle 1302. As an option, a portion of the electrical energy received by the hybrid energy railway vehicle 1302 from the locomotive 1310 is dissipated by the resistive grid 310 of the hybrid energy railway vehicle 1302 thereby supplementing the dissipating capacity of the resistive grid of the locomotive 1310. This provides increased braking capacity to the locomotive 1310.

A hybrid energy railway vehicle 1302 operating in a roadmate mode operates in an autonomous manner from other railway vehicles and locomotive 1310 to provide additional tractive effort and dynamic braking to control the movement of the train. The hybrid energy railway vehicle 1302 operating in the roadmate mode is mated with or controlled by a "lead" locomotive 1310 in a consist configuration and may optionally be electrically coupled to a locomotive 1310.

In the roadmate mode, the hybrid energy railway vehicle 1302 works in conjunction with a locomotive 1310 to provide a high power demand often for a sustained period of operation. In this configuration, the hybrid energy railway vehicle 1302 generates and stores charging electric power from the charging source 1304 and stores dynamic braking electric energy during dynamic braking of traction motors 208 of the hybrid energy railway vehicle 1302. As an option, external electric energy from an electrically coupled locomotive 1310 generated by the locomotive prime mover energy power source or from the locomotive traction motors during dynamic braking may be provided to the hybrid energy railway vehicle 1302 operating in the roadmate mode. As such, in the roadmate configuration, the energy capture and storage system 204 of the hybrid energy railway vehicle 1302 could be 10,000 HP or higher since the typical locomotive alone produces 5,200 to 7,800 HP during dynamic braking. The hybrid energy railway vehicle 1302 operating in the roadmate mode is required to provide high horsepower production or storage of electric energy that may last for several minutes or as long as a few hours.

In one embodiment of the hybrid energy railway vehicle 1302 operating in the roadmate mode, the energy storage and capture system 204 may be configured to supply stored energy to operate the traction motor 208 at high energy levels for short periods of time and to operate the traction motor 208 at a lower sustained energy level for long periods. In such an embodiment, the energy capture and storage system 204 would receive a continuous low level of charging electric energy from the electric energy source 1304 and higher levels of dynamic braking energy from the traction motor 208. In contrast to the hybrid energy railway vehicle 1302 operating in a pusher mode as addressed above, the roadmate mode does not require an energy capture and storage system 204 configuration that is regularly cycled between receiving high levels of electric energy and supplying high levels of stored energy since in the roadmate mode anticipates regular long periods of supplying low energy levels due to extended periods of speed maintaining and idling.

Other modes of operation, operating mode profiles and operational parameters are anticipated by this invention.

In operation, a multipurpose hybrid energy railway vehicle 1302 may be configured with the control system 1318 with computer readable medium 1332 containing the computer executable instructions. The computer executable instructions define a plurality of operating modes, each operating mode defining one or more operating characteristics as described above. In practice, the operating characteristics for each operating mode is defined based on defined operating criteria and/or as a function of an optimization characteristic. An operator, the control system, or a remote control command specifies or selects a particular one of the plurality of operating modes. The control system 1318 executes the instructions for the particular operating mode and thereby configures the hybrid energy railway vehicle 1302. A particular operating mode is chosen or selected each time the configuration or operation of the hybrid energy railway vehicle 1302 needs to be changed to meet the requirements and/or to optimize the operation for the intended use of the vehicle. By providing for the optimization of a plurality of operating modes of a single hybrid energy railway vehicle 1302, railroad operators can decrease costs by reducing capital investment in multiple vehicles, each of which in the prior art are designed for only a single use. Additionally, the utilization of the multipurpose vehicle will be substantially greater than a prior art single use vehicle since the multipurpose vehicle will have fewer long periods of non-operation.

The hybrid energy railway vehicle 1302 may be equipped with an operator compartment for use by an operator of the hybrid energy railway vehicle 1302. In such as case, the control system 1318 is operable from within the operator compartment such that an operator of the hybrid energy railway vehicle 1302 located in the operator compartment controls an operation of the hybrid energy railway vehicle 1302. For example, when the hybrid energy railway vehicle 1302 operates in a railway operation as a switcher, the control system 1318 is used to control the movement of the hybrid energy railway vehicle 1302 to move one or more railway cars in and around a railway yard or terminal.

The hybrid energy railway vehicle 1302 may also be configured with a communication link 1322 that is in communication with the control system 1318. The communication link 1322 may be any communication facility including a wired link to another railway vehicle such as a locomotive, a wireless communication facility, or a remote control link. The communication link 1322 receives an external control command from an external control system 1324 and provides the received external control command to the control system 1318. The control system 1318 operates in response to the external control command and controls an operation of the hybrid energy railway vehicle 1302 responsive to the external control command. As one example of such an arrangement, a railway operator with a remote control device or remote railway control system operated by an operator located in a remote location may operate an external control device or system 1324. The external control system 1324 would provide external control commands to the communication link 1322 and the connected control system 1318 to control the movement of the hybrid energy railway vehicle 1302 in a railway yard or terminal.

In another aspect, the control system 1318 of the hybrid energy railway vehicle 1302 may be configured to control one or more operations of one or move other railway vehicles. For instance, an operator riding in an operator compartment 230 of the hybrid energy railway vehicle 1302 may control an operation of one or two locomotives or another hybrid energy railway vehicle 1302 which is coupled to the hybrid energy railway vehicle 1302 such as in a consist configuration. In such case, the control system 1318 originates one or more control commands or signals that would be communicated over communication link 1322 to the other railway vehicle. By utilizing either a wired trainline communication facility or a wireless or radio communication facility, the control system 1318 of the hybrid energy railway vehicle 1302 can control a locomotive or another hybrid energy railway vehicle 1302 that is operating in consist or train configuration in conjunction with the hybrid energy railway vehicle 1302.

As noted above and as depicted in FIG. 13, an external energy transfer interface 1316 may be electrically connected to the energy capture and storage system 204. An external electrical energy system 220 provides external electrical energy to the external energy transfer interface 1316, which is stored in the energy capture and storage system 204. Such received external electric energy may also be used to power the hybrid energy railway vehicle traction motors 208. Alternatively, stored electric energy may be provided by the energy capture and storage system 204 via the external energy transfer interface 1316 to provide the stored electric energy to the external electrical energy system 220. The external electrical energy system 220 may be any electrical system external to the hybrid energy railway vehicle 1302 including an electric grid, electric distribution lines, an electrified third rail, an electrical overhead line, or another vehicle configured to receive stored electric energy. Alternatively, the external energy transfer interface 1316 may be electrically coupled to the traction motor 208 or to traction bus 210 such that dynamic braking energy generated by the hybrid energy railway vehicle traction motor 208 is transferred to an external electric energy system 220. In another embodiment, as discussed above, the external energy transfer interface 1316 provides some or all of the charging electric energy 1306 to the external electric energy system 220.

The hybrid energy railway vehicle 1302 may also be equipped with a converter 1326 that is electrically coupled to energy capture and storage system 204. The converter 1326 selectively transfers stored electric energy from energy capture and storage system 204 and supplies the transferred stored electric energy to the traction motors 208.

Energy capture and storage system 204 may be configured with a removable energy storage unit 1328. Such storage unit 1328 may be removed from hybrid energy railway vehicle 1302 and replaced by a replacement storage unit 1328. In one embodiment, storage unit 1328 is configured to be electrically charged by an external charging system (not shown). In one embodiment and method of operation, the storage units 1328 are removed from the hybrid energy railway vehicle 1302 when their charge is depleted. The storage unit 1328 is transferred to a site remote from the hybrid energy railway vehicle 1302. An external charging system recharges the energy storage unit 1328. One such external charging system could be another hybrid energy railway vehicle 1302 which had previously charged the energy storage unit 1328. After being externally charged, the storage unit 1328 is re-installed on the hybrid energy railway vehicle 1302. The hybrid energy railway vehicle 1302, energy capture and storage system 204 and storage unit 1328 are configured to provide for an efficient removal and re-installation of the storage unit 1328 from the hybrid energy railway vehicle 1302.

In another embodiment and method of operation, hybrid energy railway vehicle 1302 is equipped with storage units 1328 which have been depleted, e.g., no stored energy. The hybrid energy railway vehicle 1302 operates in an operating mode, such as an energy tender mode, whereby the hybrid energy railway vehicle 1302 generates dynamic braking energy from hybrid energy railway vehicle traction motor 208 and stores the dynamic braking energy in the energy capture and storage system 204. After charging the energy storage unit 1328, the energy storage unit 1328 is removed from the hybrid energy railway vehicle 1302. The removed energy storage unit 1328 is installed on another hybrid energy railway vehicle 1302, a hybrid electric locomotive (not shown), or is discharged into an external energy storage system or external energy electric system 220.

In another embodiment of the invention, a hybrid energy railway vehicle 1302 is configured with a charging electric energy source 1304, an energy capture and storage system 204, a converter 1326, a traction system 208, a resistive grid 310, and a resistive grid circuit 1314. The energy capture and storage system 204 receives charging electric energy from the charging electric energy source 1304. The converter 1326 is electrically coupled to the energy capture and storage system 204 such that the energy capture and storage system 204 selectively transfers stored electric energy to converter 1326. The converter 1326 provides energy tender drive energy to the traction motor 208 to propel the hybrid energy railway vehicle 1302. The resistive grid circuit 1314 selectively supplies charging electric energy to the resistive grid 310 where it is dissipated as heat. For example, the charging electric energy source 1304 may be configured to operate on a continuous basis independent of the required level of charging energy required by the energy capture and storage system

204. In operation, the circuit 1314 may operate to selectively supply charging energy to the resistive grid 310 in response to an operating parameter, a result of a command from the control system 1330, input from the energy capture and storage system 204, or a control signal from the control system 1318. As such, the charging electric energy source 1304 continues to operate even though the energy capture and storage system 204 does not have an immediate need for the charging energy, as the excess charging energy is dissipated.

FIG. 14 is another embodiment of a multipurpose hybrid energy railway vehicle 1402 configured to operate in an autonomous mode. The embodiment of FIG. 14 is configured to store dynamic braking energy generated by the hybrid energy railway vehicle traction motor 208 and does not include a hybrid energy railway vehicle charging electric energy source 1304. In this embodiment, traction motor 208 provides dynamic braking electric energy during a dynamic braking mode of operation (shown as line 1408) to a converter 1406. The converter 1406 provides to the energy capture and storage system 204, dynamic braking electric energy to be stored (via line 1404). Energy capture and storage system 204 receives the dynamic braking energy and selectively stores the dynamic braking energy. Energy capture and storage system 204 provides stored electric energy via line 1404 to the converter 1406 as required by the converter 1406 to provide energy tender drive power to the traction motor 208. The converter 1406 provides stored electric energy (via line 1408) to the traction system bus 210 and thereby to the traction motor 208 to propel the hybrid energy railway vehicle 1402.

In one embodiment as shown in FIG. 14, the converter 1406 provides some or all of the stored energy received by the converter from the energy capture and storage system 204 and/or the dynamic braking energy received from the traction motor 208 to the resistive grid 310. The electrical energy supplied to the resistive grid 310 is dissipated as heat energy. As indicated, line 1410 electrically connects the converter 14067 to the electric circuit 1312 that is connected either directly to the resistive grid 310 or to resistive grid circuit 1314. In an alternative embodiment, energy to be dissipated by the resistive grid 310 is supplied to the traction bus via line 1408 and is provided to the resistive grid 310 via line 1312 or via resistive grid circuit 1314.

In operation, a hybrid energy railway vehicle 1302 consistent with the many aspects of the invention may be operated by a number of methods. One embodiment of a method of operating a hybrid energy railway vehicle system includes supplying charging electrical energy with an electrical energy source 1304. A traction motor 208 operates in a dynamic braking mode to generate dynamic braking electrical energy. The charging electrical energy and dynamic braking electrical energy is stored in an energy capture and storage system 204 to produce stored electrical energy. Stored electrical energy is supplied to the traction motor 208 that operates in a motoring mode in response to the supplied stored electrical energy for driving on or more wheels of the hybrid energy railway vehicle 1302.

In another embodiment of the method, the method includes operating a traction motor 208 in a dynamic braking mode to generate dynamic braking electrical energy. The generated dynamic braking electrical energy is stored in an energy capture and storage system 204 to produce stored electrical energy. Stored electrical energy is supplied to the traction motor that operates in a motoring mode in response to the supplied stored electrical energy for driving one or more wheels of the hybrid energy railway vehicle 1302.

In yet another embodiment of a method of operating a hybrid energy railway vehicle system 1302, the method includes receiving external electrical energy from an external electrical energy system 220. The received external electrical energy is stored in an energy capture and storage system 204 to produce stored electrical energy. Stored electrical energy is supplied to a traction motor 208 that operates in a motoring mode in response to the supplied stored electrical energy for driving on or more wheels of the hybrid energy railway vehicle 1302.

In another embodiment, a method of operating a hybrid energy railway vehicle system 1302 includes operating a traction motor 208 in a dynamic braking mode to generate dynamic braking electrical energy. The dynamic braking electrical energy is stored in an energy capture and storage system 204 to produce stored electrical energy. Stored electrical energy is supplied to an external electrical energy system 220.

In still another embodiment, a method of operating a hybrid energy railway vehicle system 1302 includes defining a plurality of operating modes, each of the plurality of operating modes defining a set of operational parameters. A value for each of the operational parameters in the set of operational parameters is specified as a function of an optimization characteristic. An operation of the hybrid energy railway vehicle 1302 is controlled as a function of a particular set of operational parameters defined by a particular operating mode responsive to a desired use of the hybrid energy railway vehicle 1302.

As optional variations on the above methods, charging electrical energy or dynamic braking electrical energy may be supplied to a resistive grid 310. Such an embodiment may be desirable when excess dynamic braking energy is generated or where it is desirable to discharge the energy capture and storage system 204 prior to a new use or in anticipation of a future need to store dynamic braking energy that may be in excess of that capable of being dissipated by the resistive grid 310 during dynamic braking. In another optional embodiment, stored electrical energy may be provided to an external electrical energy system 220 or external electrical energy may be provided by the external electrical energy system 220 that is then stored in the energy capture and storage system 204. As one example, where the external electrical energy system 220 is a locomotive 1310, the supplied stored electrical energy could be utilizes by the locomotive 1310 to drive a traction motor of the locomotive 1310.

Figure 4:
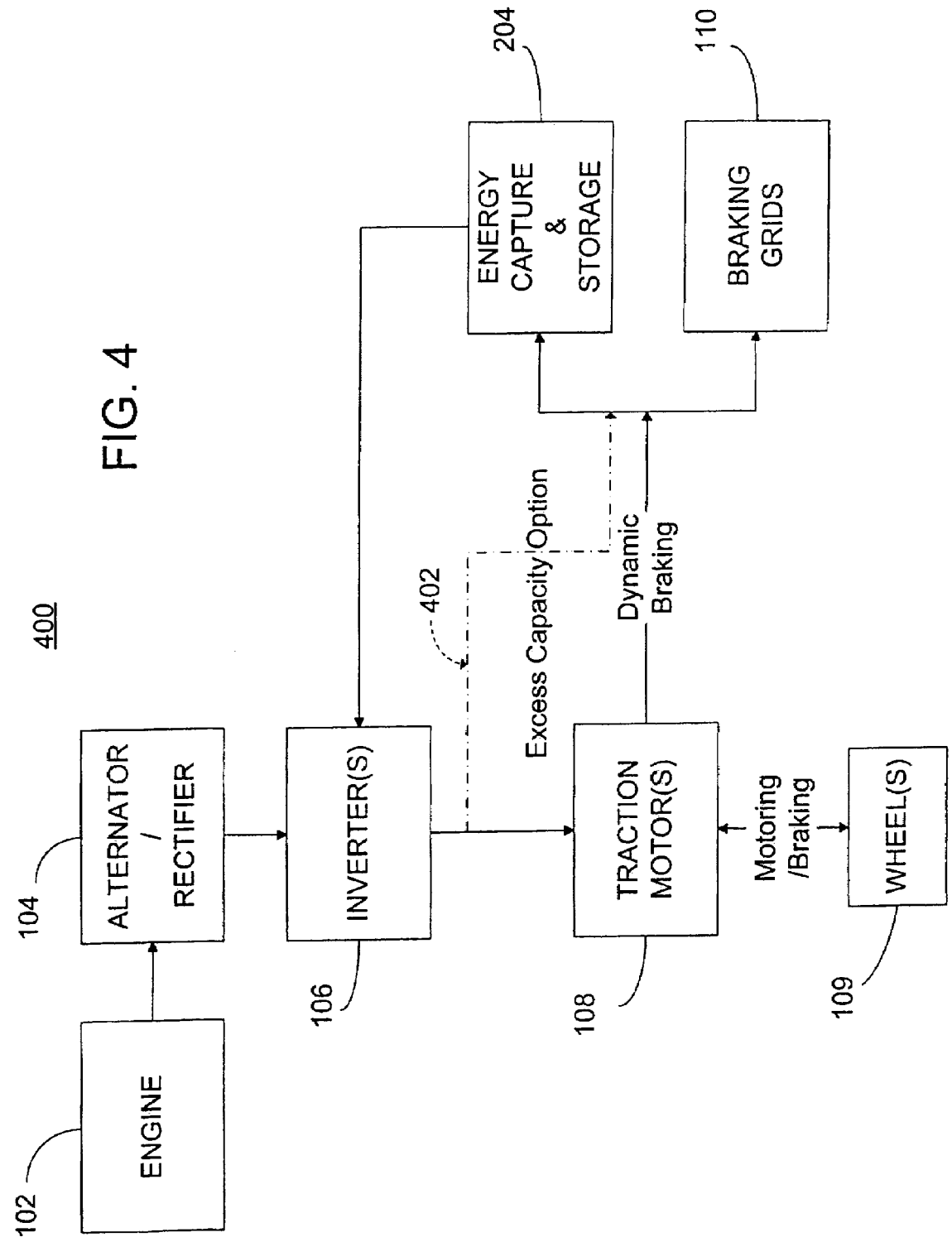
FIG. 4 is a block diagram illustrating one preferred embodiment of an energy storage and generation system suitable for use in connection with a hybrid energy locomotive system.

Referring now to FIG. 4, FIG. 4 is a system-level block diagram that illustrates aspects of one preferred energy storage and generation system. In particular, FIG. 4 illustrates an energy storage and generation system 400 suitable for use with a hybrid energy locomotive system, such as hybrid energy locomotive system 200 or system 300 (FIGS. 2 and 3). Such an energy storage and generation system 400 could be implemented, for example, as part of a separate energy tender vehicle (e.g., FIGS. 2 and 3) and/or incorporated into a locomotive.

As illustrated in FIG. 4, a diesel engine 102 drives a prime mover power source 104 (e.g., an alternator/rectifier converter). The prime mover power source 104 preferably supplies DC power to an inverter 106 that provides three-phase AC power to a locomotive traction motor 108. It should be understood, however, that the system 400 illustrated in FIG. 4 can be modified to operate with DC traction motors as well. Preferably, there is a plurality of traction motors (e.g., one per axle), and each axle is coupled to a plurality of locomotive wheels. In other words, each locomotive traction motor preferably includes a rotatable shaft coupled to the associated axle for providing tractive power to the wheels. Thus, each locomotive traction motor 108 provides the necessary motoring force to an associated plurality of locomotive wheels 109 to cause the locomotive to move.

When traction motors 108 are operated in a dynamic braking mode, at least a portion of the generated electrical power is routed to an energy storage medium such as energy capture and storage system 204. To the extent that energy capture and storage system 204 is unable to receive and/or store all of the dynamic braking energy, the excess energy is preferably routed to braking grids 110 for dissipation as heat energy. Also, during periods when engine 102 is being operated such that it provides more energy than needed to drive traction motors 108, the excess capacity (also referred to as excess prime mover electric power) may be optionally stored in energy capture and storage system 204. Accordingly, energy capture and storage system 204 can be charged at times other than when traction motors 108 are operating in the dynamic braking mode. This aspect of the system is illustrated in FIG. 4 by a dashed line 402.

The energy capture and storage system 204 of FIG. 4 is preferably constructed and arranged to selectively augment the power provided to traction motors 108 or, optionally, to power separate traction motors associated with a separate energy tender vehicle (see FIG. 2 above) or a load vehicle. Such power may be referred to as secondary electric power and is derived from the electrical energy stored in energy storage 204. Thus, the system 400 illustrated in FIG. 4 is suitable for use in connection with a locomotive having an on-board energy storage medium and/or with a separate energy tender vehicle.

Figure 5:
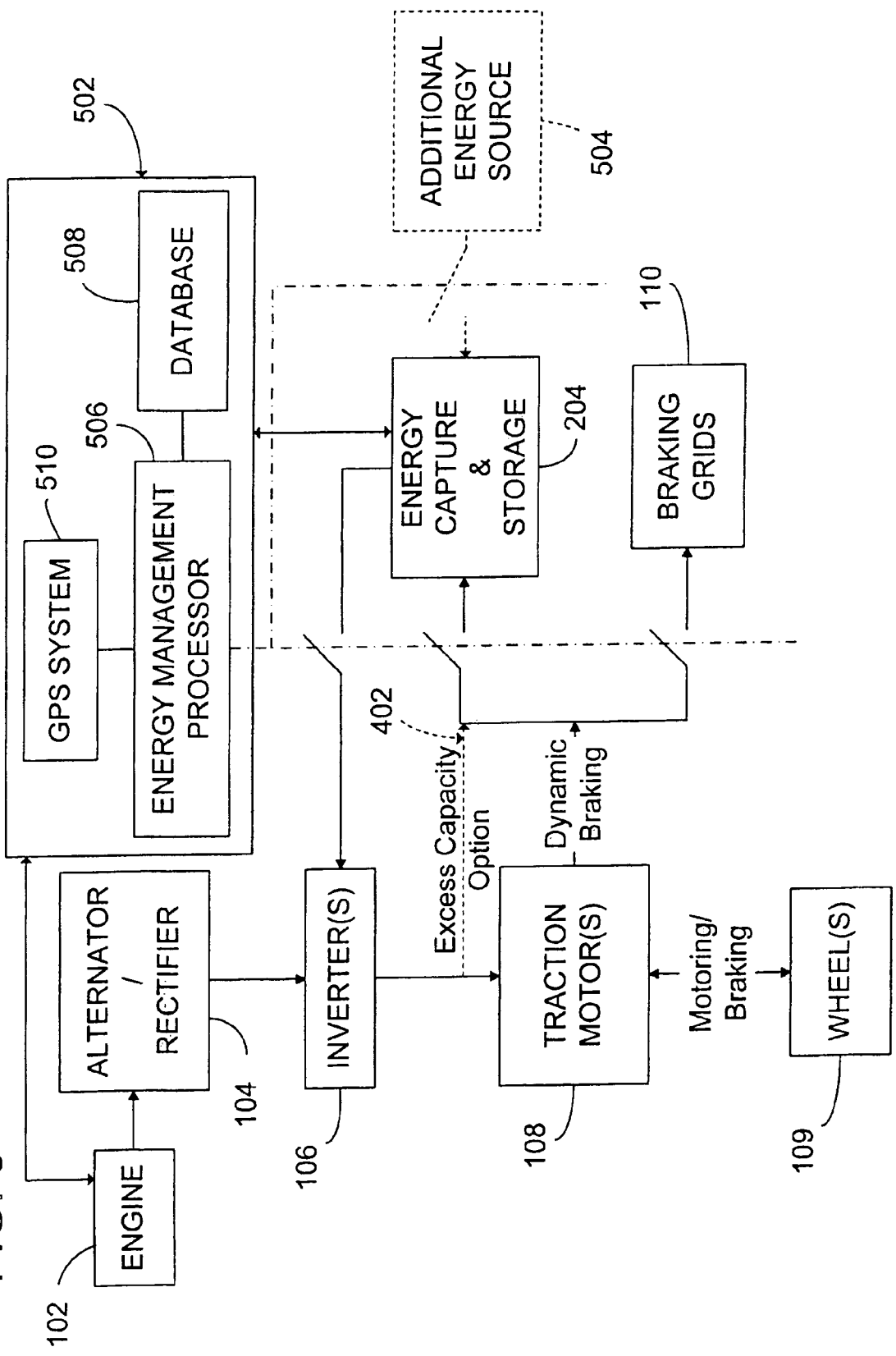
FIG. 5 is a block diagram illustrating an energy storage and generation system suitable for use in a hybrid energy locomotive system, including an energy management system for controlling the storage and regeneration of energy.

FIG. 5 is a block diagram that illustrates aspects of one preferred embodiment of an energy storage and generation system 500 suitable for use with a hybrid energy locomotive system. The system 500 includes an energy management system 502 for controlling the storage and regeneration of energy. It should be understood, however, that the energy management system 502 illustrated in FIG. 5 is also suitable for use with other large, off-highway vehicles that travel along a relatively well-defined course. Such vehicles include, for example, large excavators, excavation dump trucks, and the like. By way of further example, such large excavation dump trucks may employ motorized wheels such as the GEB23™ AC motorized wheel employing the GE150AC™ drive system (both of which are trademarked products available from the assignee of the present invention). Therefore, although FIG. 5 is generally described with respect to a locomotive system, the energy management system 500 illustrated therein is not to be considered as limited to locomotive applications.

Referring still to the exemplary embodiment illustrated in FIG. 5, system 500 preferably operates in the same general manner as system 400 of FIG. 4; the energy management system 502 provides additional intelligent control functions. FIG. 5 also illustrates an optional energy source 504 that is preferably controlled by the energy management system 502. The optional energy source 504 may be a second engine (e.g., the charging engine illustrated in FIG. 3, charging electric energy source 1304 as illustrated in FIGS. 13 and 14, another hybrid energy railway vehicle 1302, or another locomotive in the consist) or a completely separate power source (e.g., a wayside power source such as battery charger, a third rail, or an overhead line) for charging energy storage 204. In one embodiment, such a separate charger includes an electrical power station for charging an energy storage medium associated with a separate energy tender vehicle (e.g., vehicle 202 of FIG. 2) while stationary, or a system for charging the energy storage medium while the tender vehicle is in motion. In one preferred embodiment, optional energy source 504 is connected to a traction bus (not illustrated in FIG. 5) that also carries primary electric power from prime mover power source 104.

As illustrated, the energy management system 502 preferably includes an energy management processor 506, a database 508, and a position identification system 510, such as, for example, a global positioning satellite system receiver (GPS) 510. The energy management processor 506 determines present and anticipated train position information via the position identification system 510. In one embodiment, energy management processor 506 uses this position information to locate data in the database 508 regarding present and/or anticipated track topographic and profile conditions, sometimes referred to as track situation information. Such track situation information may include, for example, track grade, track elevation (e.g., height above mean sea level), track curve data, tunnel information, speed limit information, and the like. It is to be understood that such database information could be provided by a variety of sources including: an onboard database associated with processor 510, a communication system (e.g., a wireless communication system) providing the information from a central source, manual operator input(s), via one or more wayside signaling devices, a combination of such sources, and the like. Finally, other vehicle information such as, the size and weight of the vehicle, a power capacity associated with the prime mover, efficiency ratings, present and anticipated speed, present and anticipated electrical load, and so on may also be included in a database (or supplied in real or near real time) and used by energy management processor 506.

It should be appreciated that, in an alternative embodiment, energy management system 502 could be configured to determine power storage and transfer requirements associated with energy storage 204 in a static fashion. For example, energy management processor 506 could be preprogrammed with any of the above information, or could use look-up tables based on past operating experience (e.g., when the vehicle reaches a certain point, it is nearly always necessary to store additional energy to meet an upcoming demand).

The energy management processor 506 preferably uses the present and/or upcoming track situation information, along with vehicle status information, to determine power storage and power transfer requirements. Energy management processor 506 also determines possible energy storage opportunities based on the present and future track situation information. For example, based on the track profile information, energy management processor 506 may determine that it is more efficient to completely use all of the stored energy, even though present demand is low, because a dynamic braking region is coming up (or because the train is behind schedule and is attempting to make up time). In this way, the energy management system 502 improves efficiency by accounting for the stored energy before the next charging region is encountered. As another example, energy management processor 506 may determine not to use stored energy, despite present demand, if a heavier demand is expected in the future. Advantageously, energy management system 502 may also be configured to interface with engine controls. Also, as illustrated in FIG. 5, energy storage 204 may be configured to provide an intelligent control interface 512 with energy management system 502.

In operation, energy management processor 506 determines a power storage requirement and a power transfer requirement. Energy storage 204 stores electrical energy in response to the power storage requirement. Energy storage 204 provides secondary electric power (e.g., to a traction bus connected to inverters 106 to assist in motoring) in response to the power transfer requirement. The secondary electric power is derived from the electrical energy stored in energy storage 204.

As explained above, energy management processor 506 preferably determines the power storage requirement based, in part, on a situation parameter indicative of a present and/or anticipated track topographic characteristic. Energy management processor 506 may also determine the power storage requirement as a function of an amount of primary electric power available from the prime mover power source 104. Similarly, energy management processor 506 may determine the power storage requirement as a function of a present or anticipated amount of primary electric power required to propel the locomotive system.

Also, in determining the energy storage requirement, energy management processor 506 preferably considers various parameters related to energy storage 204. For example, energy storage 204 will have a storage capacity that is indicative of the amount of power that can be stored therein and/or the amount of power that can be transferred to energy storage 204 at any given time. Another similar parameter relates to the amount of secondary electric power that energy storage 204 has available for transfer at a particular time.

As explained above, system 500 preferably includes a plurality of sources for charging energy storage 204. These sources include dynamic braking power, excess prime mover electric power, and external charging electric power. Preferably, energy management processor 506 determines which of these sources should charge energy storage 204. In one embodiment, present or anticipated dynamic braking energy is used to charge energy storage 204, if such dynamic braking energy is available. If dynamic braking energy is not available, either excess prime mover electric power or external charging electric power is used to charge energy storage 204.

In the embodiment of FIG. 5, energy management processor 506 preferably determines the power transfer requirement as a function of a demand for power. In other words, energy storage 204 preferably does not supply secondary electric power unless traction motors 108 are operating in a power consumption mode (e.g., a motoring mode, as opposed to a dynamic braking mode). In one form, energy management processor 506 permits energy storage 204 to supply secondary electric power to inverters 106 until either (a) the demand for power terminates or (b) energy storage 204 is completely depleted. In another form, however, energy management processor 506 considers anticipated power demands and controls the supply of secondary electric power from energy storage 204 such that sufficient reserve power remains in energy storage 204 to augment prime mover power source during peak demand periods. This may be referred to as a "look-ahead" energy management scheme.

In the look-ahead energy management scheme, energy management processor 506 preferably considers various present and/or anticipated track situation parameters, such as those discussed above. In addition, energy management processor may also consider the amount of power stored in energy storage 204, anticipated charging opportunities, and any limitations on the ability to transfer secondary electric power from energy storage 204 to inverters 106.

FIGS. 6A-D, 7A-D, and 8A-E illustrate, in graphic form, aspects of three different embodiments of energy management systems, suitable for use with a hybrid energy vehicle, that could be implemented in a system such as system 500 of FIG. 5. It should be appreciated that these figures are provided for exemplary purposes and that, with the benefit of the present disclosure, other variations are possible. It should also be appreciated that the values illustrated in these figures are included to facilitate a detailed description and should not be considered in a limiting sense. It should be further understood that, although the examples illustrated in these figures relate to locomotives and trains, the energy management system and methods identified herein may be practiced with a variety of large, off-highway vehicles that traverse a known course and which are generally capable of storing the electric energy generated during the operation of such vehicles. Such off-highway vehicles include vehicles using DC and AC traction motor drives and having dynamic braking/retarding capabilities.

There are four similar charts in each group of figures (FIGS. 6A-D, FIGS. 7A-D, and FIGS. 8A-D). The first chart in each group (e.g., FIGS. 6A, 7A, and 8A) illustrates the required power for both motoring and braking. Thus, the first chart graphically depicts the amount of power required by the vehicle. Positive values on the vertical axis represent motoring power (horsepower); negative values represent dynamic braking power. It should be understood that motoring power could originate with the prime mover (e.g., diesel engine in a locomotive), or from stored energy (e.g., in an energy storage medium in a separate energy tender vehicle or in a locomotive), or from a combination of the prime mover and stored energy. Dynamic braking power could be dissipated or stored in the energy storage medium.

The horizontal axis in all charts reflects time in minutes. The time bases for each chart in a given figure group are intended to be the same. It should be understood, however, that other reference bases are possible.

The second chart in each group of figures (e.g., FIGS. 6B, 7B, and 8B) reflects theoretical power storage and consumption. Positive values reflect the amount of power that, if power were available in the energy storage medium, could be drawn to assist in motoring. Negative values reflect the amount of power that, if storage space remains in the energy storage medium, could be stored in the medium. The amount of power that could be stored or drawn is partially a function of the converter and storage capabilities of a given vehicle configuration. For example, the energy storage medium will have some maximum/finite capacity. Further, the speed at which the storage medium is able to accept or supply energy is also limited (e.g., batteries typically charge slower than flywheel devices). Other variables also affect energy storage. These variables include, for example, ambient temperature, the size and length of any interconnect cabling, current and voltage limits on DC-to-DC converters used for battery charging, power ratings for an inverter for a flywheel drive, the charging and discharging rates of a battery, or a motor/shaft limit for a flywheel drive. The second chart assumes that the maximum amount of power that could be transferred to or from the energy storage medium at a given time is, 500 h.p. Again, it should be understood that this 500 h.p. limit is included for exemplary purposes. Hence, the positive and negative limits in any given system could vary as a function of ambient conditions, the state and type of the energy storage medium, the type and limits of energy conversion equipment used, and the like.

The third chart in each figure group (e.g., FIGS. 6C, 7C, and 8C) depicts a power transfer associated with the energy storage medium. In particular, the third chart illustrates the actual power being transferred to and from the energy storage medium versus time. The third chart reflects limitations due to the power available for storage, and limitations due to the present state of charge/storage of the energy storage medium (e.g., the speed of the flywheel, the voltage in an ultracapacitor, the charge in the battery, and the like).

The fourth chart in each figure group (e.g., FIGS. 6D, 7D, and 8D) depicts actual energy stored. In particular, the fourth chart illustrates the energy stored in the energy storage medium at any particular instant in time.

Referring first to FIGS. 6A-D, these figures reflect an energy management system that stores energy at the maximum rate possible during dynamic braking until the energy storage medium is completely full. In this embodiment, all energy transfers to the storage medium occur during dynamic braking. In other words, in the embodiment reflected in FIGS. 6A-D, no energy is transferred to the energy storage medium from excess prime mover power available during motoring, or from other energy sources. Similarly, energy is discharged, up to the maximum rate, whenever there is a motor demand (limited to and not exceeding the actual demand) until the energy storage medium is completely discharged/empty. FIGS. 6A-D assume that the energy storage medium is completely discharged/empty at time 0.

Figure 6A:
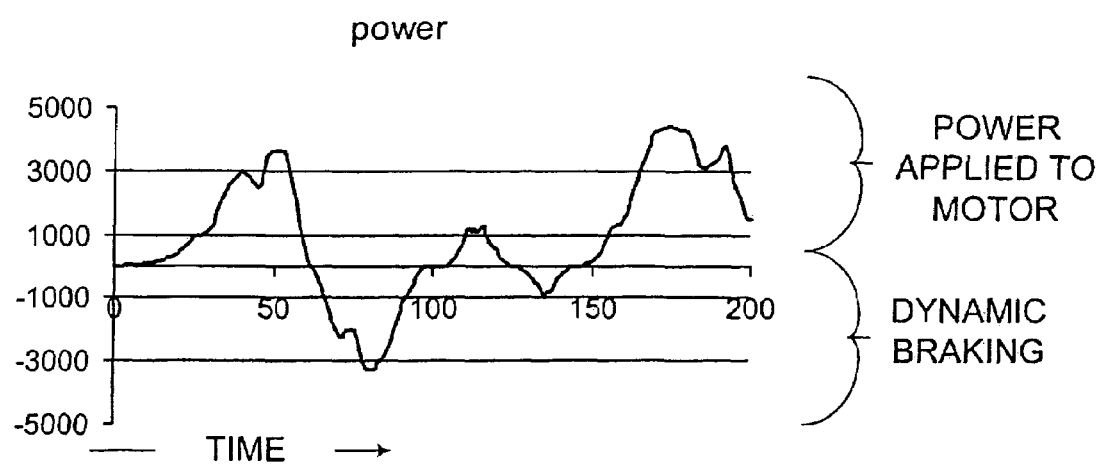
FIGS. 6A-6D are timing diagrams that illustrate one embodiment of an energy management system for controlling the storage and regeneration of energy, including dynamic braking energy.

Referring now specifically to FIG. 6A, as mentioned above, the exemplary curve identified therein illustrates the power required (utilized) for motoring and dynamic braking. Positive units of power reflect when motoring power is being applied to the wheels of the vehicle (e.g., one or more traction motors are driving locomotive wheels). Negative units of power reflect power generated by dynamic braking.

Figure 6B:
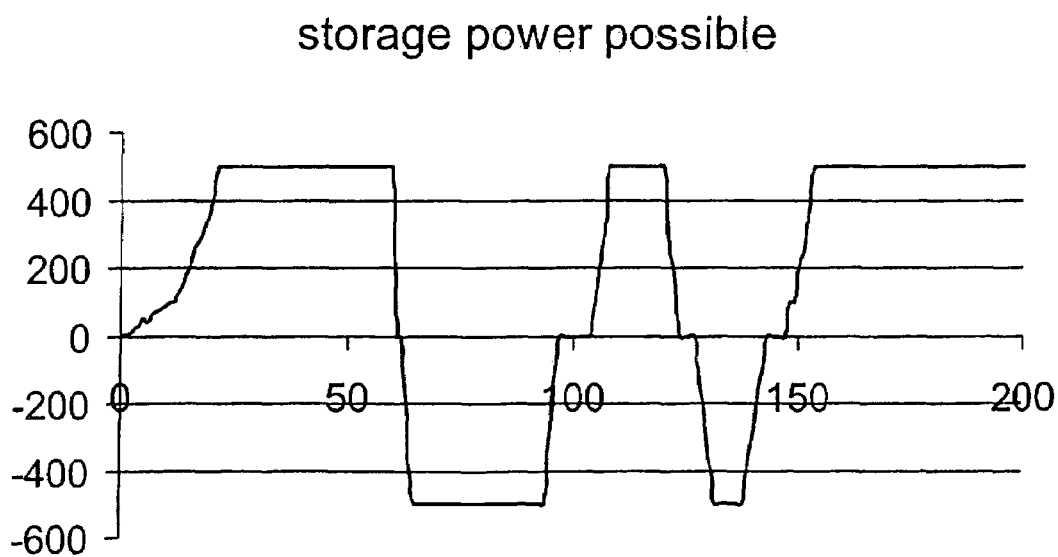

FIG. 6B is an exemplary curve that reflects power transfer limits. Positive values reflect the amount of stored energy that would be used to assist in the motoring effort, if such energy were available. Negative units reflect the amount of dynamic braking energy that could be stored in the energy storage medium if the medium were able to accept the full charge available. In the example of FIG. 6B, the energy available for storage at any given time is illustrated as being limited to 500 units (e.g., horsepower). As explained above, a variety of factors limit the amount of power that can be captured and transferred. Thus, from about 0 to 30 minutes, the locomotive requires less than 500 h.p. If stored energy were available, it could be used to provide all of the motoring power. From about 30 minutes to about 65 or 70 minutes, the locomotive requires more than 500 h.p. Thus, if stored energy were available, it could supply some (e.g., 500 h.p.) but not all of the motoring power. From about 70 minutes to about 75 minutes or so, the locomotive is in a dynamic braking mode and generates less than 500 h.p. of dynamic braking energy. Thus, up to 500 h.p. of energy could be transferred to the energy storage medium, if the medium retained sufficient capacity to store the energy. At about 75 minutes, the dynamic braking process generates in excess of 500 h.p. Because of power transfer limits, only up to 500 h.p. could be transferred to the energy storage medium (again, assuming that storage capacity remains); the excess power would be dissipated in the braking grids. It should be understood that FIG. 6B does not reflect the actual amount of energy transferred to or from the energy storage medium. That information is depicted in FIG. 6C.

Figure 6C:
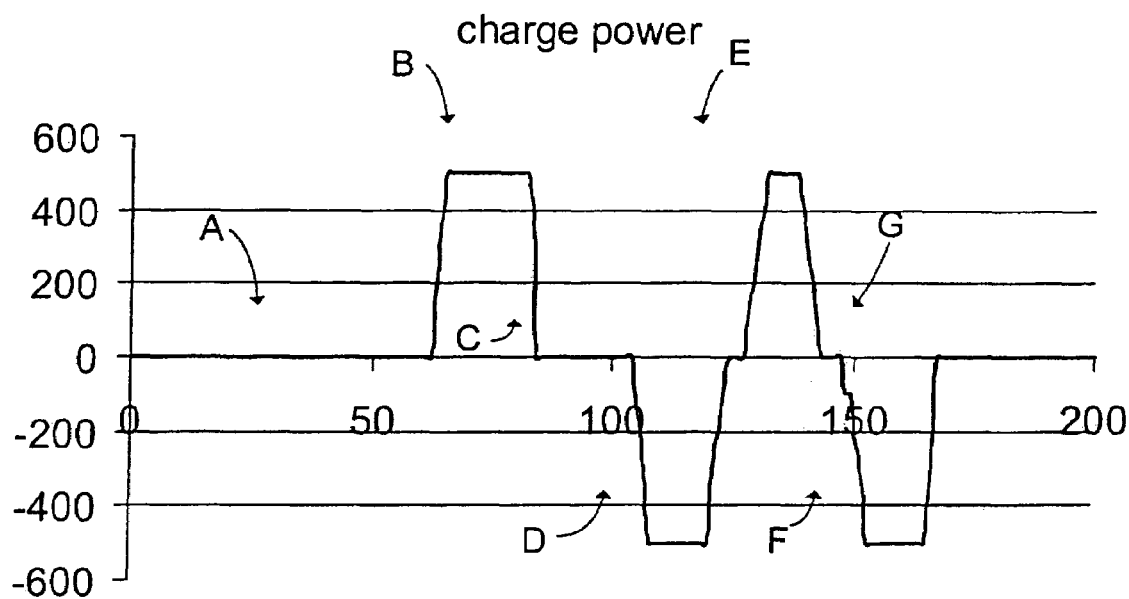

FIG. 6C reflects the power transfer to/from the energy storage medium at any given instant of time. The example shown therein assumes that the energy storage medium is completely empty at time 0. Therefore, the system cannot transfer any power from the storage at this time. During a first time period A (from approximately 0-70 minutes), the vehicle is motoring (see FIG. 6A) and no power is transferred to or from the energy storage. At the end of the first time period A, and for almost 30 minutes thereafter, the vehicle enters a dynamic braking phase (see FIG. 6A). During this time, power from the dynamic braking process is available for storage (see FIG. 6B).

During a second time period B (from approximately 70-80 minutes), dynamic braking energy is transferred to the energy storage medium at the maximum rate (e.g., 500 units) until the storage is full. During this time there is no motoring demand to deplete the stored energy. Thereafter, during a third time period C (from approximately 80-105 minutes) the storage is full. Consequently, even though the vehicle remains in the dynamic braking mode or is coasting (see FIG. 6A), no energy is transferred to or from the energy storage medium during time period C.

During a fourth time period D (from approximately 105-120 minutes), the vehicle resumes motoring. Because energy is available in the energy storage medium, energy is drawn from the storage and used to assist the motoring process. Hence, the curve illustrates that energy is being drawn from the energy storage medium during the fourth time period D.

At approximately 120 minutes, the motoring phase ceases and, shortly thereafter, another dynamic braking phase begins. This dynamic braking phase reflects the start of a fifth time period E that lasts from approximately 125-145 minutes. As can be appreciated by viewing the curve during the fifth time period E, when the dynamic braking phase ends, the energy storage medium is not completely charged.

Shortly before the 150-minute point, a sixth time period F begins which lasts from approximately 150-170 minutes. During this time period and thereafter (see FIG. 6A), the vehicle is motoring. From approximately 150-170 minutes, energy is transferred from the energy storage medium to assist in the motoring process. At approximately 170 minutes, however, the energy storage is completely depleted. Accordingly, from approximately 170-200 minutes (the end of the sample window), no energy is transferred to or from the energy storage medium.

Figure 6D:
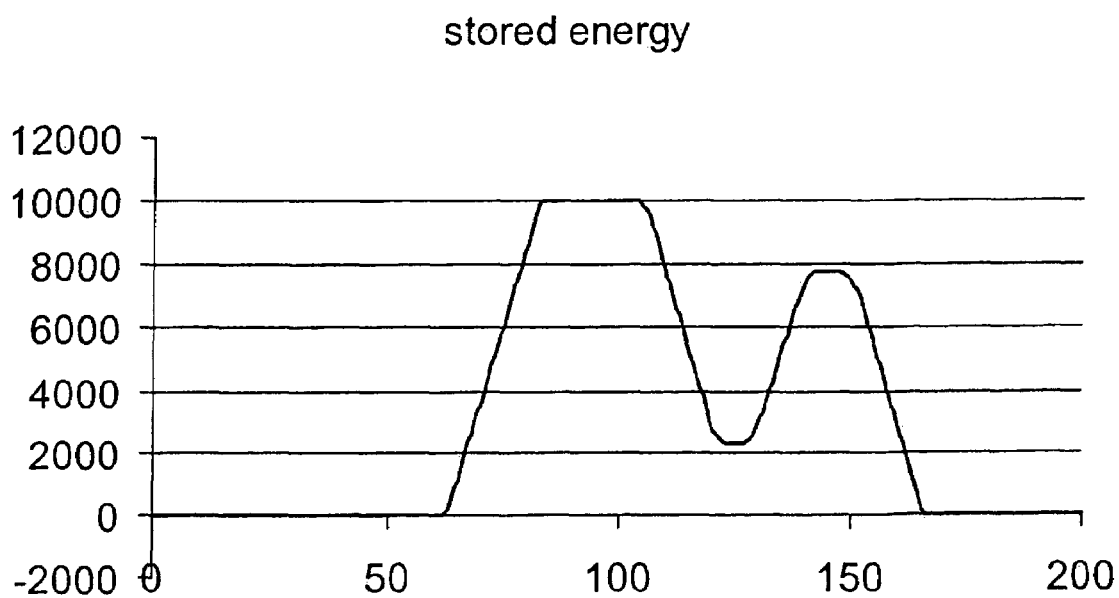

FIG. 6D illustrates the energy stored in the energy storage medium of the exemplary embodiment reflected in FIGS. 6A-D. Recall that in the present example, the energy storage medium is assumed to be completely empty/discharged at time 0. Recall also that the present example assumes an energy management system that only stores energy from dynamic braking. From approximately 0-70 minutes, the vehicle is motoring and no energy is transferred to or from the energy storage medium. From approximately 70-80 minutes or so, energy from dynamic braking is transferred to the energy storage medium until it is completely full. At approximately 105 minutes, the vehicle begins another motoring phase and energy is drawn from the energy storage medium until about 120 minutes. At about 125 minutes, energy from dynamic braking is again transferred to the energy storage medium during another dynamic braking phase. At about 145 minutes or so, the dynamic braking phase ends and storage ceases. At about 150 minutes, energy is drawn from the energy storage medium to assist in motoring until all of the energy has been depleted at approximately 170 minutes.

FIGS. 7A-D correspond to an energy management system that includes a "look ahead" or anticipated needs capability. Such a system is unlike the system reflected in FIGS. 6A-D, which simply stores dynamic braking energy when it can, and uses stored energy to assist motoring whenever such stored energy is available. The energy management system reflected by the exemplary curves of FIGS. 7A-D anticipates when the prime mover cannot produce the full required demand, or when it may be less efficient for the prime mover to produce the full required demand. As discussed elsewhere herein, the energy management system can make such determinations based on, for example, known present position, present energy needs, anticipated future track topography, anticipated future energy needs, present energy storage capacity, anticipated energy storage opportunities, and like considerations. The energy management system depicted in FIGS. 7A-D, therefore, preferably prevents the energy storage medium from becoming depleted below a determined minimum level required to meet future demands.

By way of further example, the system reflected in FIGS. 7A-D is premised on a locomotive having an engine that has a "prime mover limit" of 4000 h.p. Such a limit could exist for various factors. For example, the maximum rated output could be 4000 h.p. or operating efficiency considerations may counsel against operating the engine above 4000 h.p. It should be understood, however, that the system and figures are intended to reflect an exemplary embodiment only, and are presented herein to facilitate a detailed explanation of aspects of an energy management system suitable for use with off-highway hybrid energy vehicles such as, for example, the locomotive system illustrated in FIG. 2.

Figure 7A:
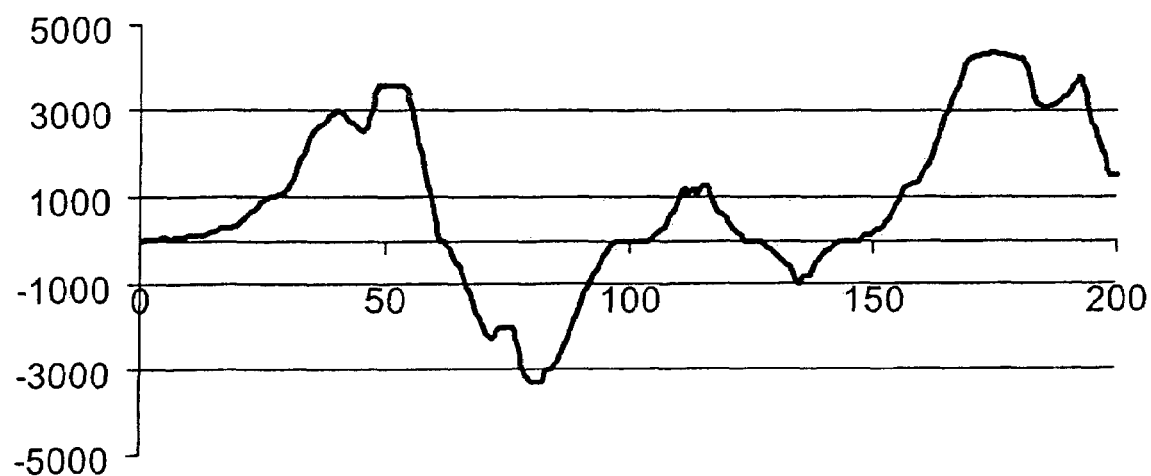
FIGS. 7A-7D are timing diagrams that illustrate another embodiment energy management system for controlling the storage and regeneration of energy, including dynamic braking energy.

Referring now to FIG. 7A, the exemplary curve illustrated therein depicts power required for motoring (positive) and braking (negative). At approximately 180 minutes, the motoring demand exceeds 4000 h.p. Thus, the total demand at that time exceeds the 4000 h.p. operating constraint for the engine. The "look ahead" energy management system reflected in FIGS. 7A-D, however, anticipates this upcoming need and ensures that sufficient secondary power is available from the energy storage medium to fulfill the energy needs.

One way for the energy management system to accomplish this is to look ahead (periodically or continuously) to the upcoming track/course profile (e.g., incline/decline, length of incline/decline, and the like) for a given time period (also referred to as a look ahead window). In the example illustrated in FIGS. 7A-D, the energy management system looks ahead 200 minutes and then computes energy needs/requirements backwards. The system determines that, for a brief period beginning at 180 minutes, the engine would require more energy than the preferred limit.

Figure 7B:
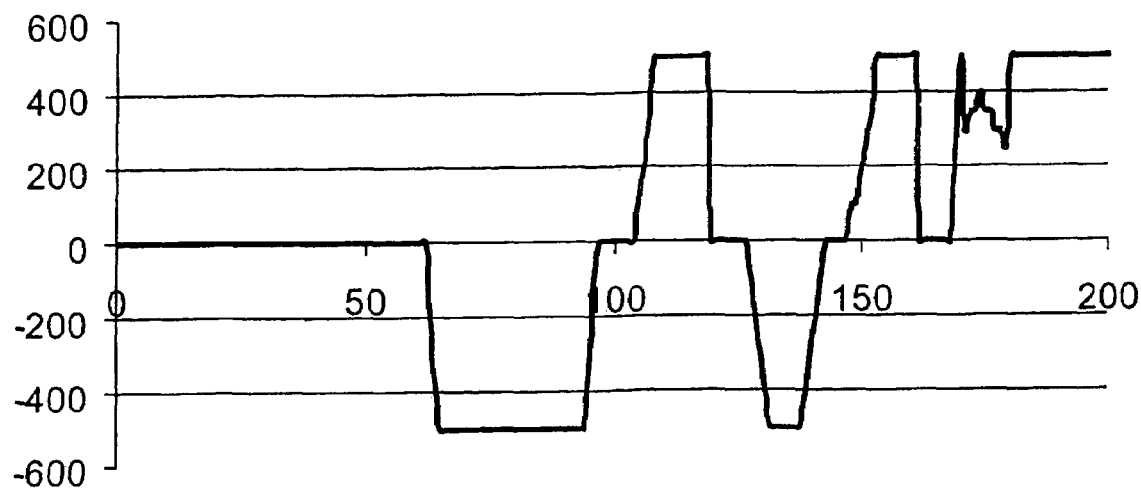

FIG. 7B is similar to FIG. 6B. FIG. 7B, however, also illustrates the fact that the energy storage medium is empty at time 0 and, therefore, there can be no power transfer from the energy storage medium unless and until it is charged. FIG. 7B also reflects a look ahead capability.

Figure 7C:
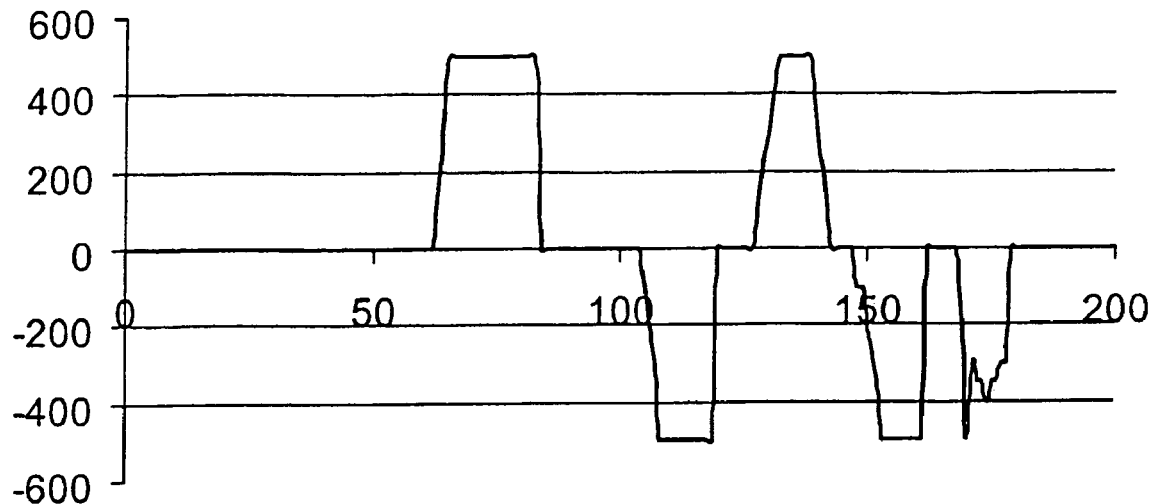
Figure 7D:
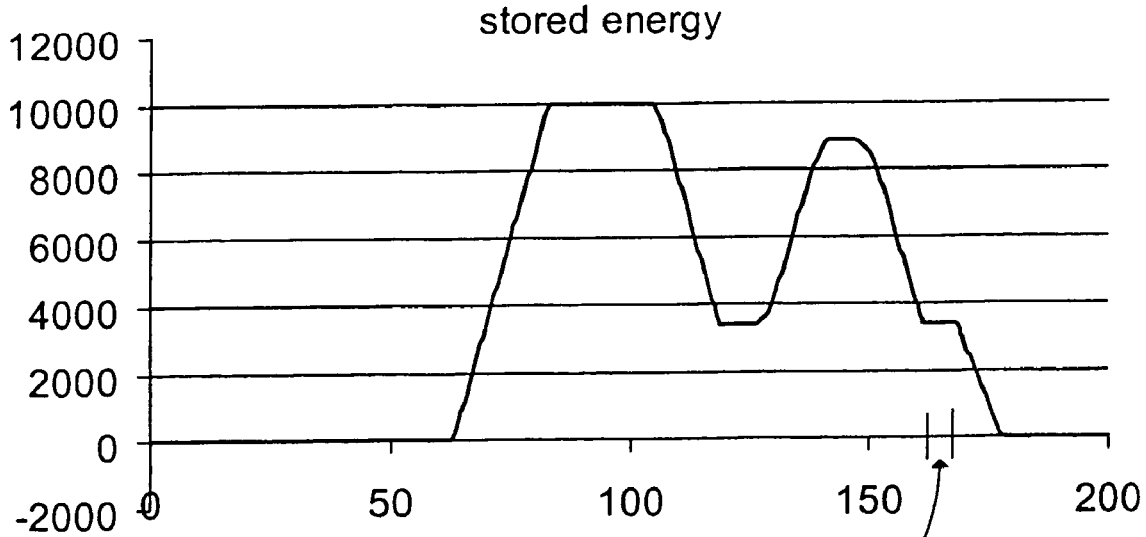

Comparing FIGS. 6A-D with FIGS. 7A-D, it is apparent how the systems respectively depicted therein differ. Although the required power is the same in both examples (see FIGS. 6A and 7A), the system reflected in FIGS. 7A-D prevents complete discharge of the energy storage medium prior to the anticipated need at 180 minutes. Thus, as can be seen in FIGS. 7C and 7D, prior to the 180 minute point, the system briefly stops transferring stored energy to assist in motoring, even though additional stored energy remains available. The additional energy is thereafter transferred, beginning at about 180 minutes, to assist the prime mover when the energy demand exceeds 4000 h.p. Hence, the system effectively reserves some of the stored energy to meet upcoming demands that exceed the desired limit of the prime mover.

It should be understood and appreciated that the energy available in the energy storage medium could be used to supplement driving traction motors associated with the prime mover, or could also be used to drive separate traction motors (e.g., on a tender or load vehicle). With the benefit of the present disclosure, an energy management system accommodating a variety of configurations is possible.

FIGS. 8A-E reflect pertinent aspects of another embodiment of an energy management system suitable for use in connection with off-highway hybrid energy vehicles. The system reflected in FIGS. 8A-E includes a capability to store energy from both dynamic braking and from the prime mover (or another charging engine such as that illustrated in FIG. 3). For example, a given engine may operate most efficiently at a given power setting (e.g., 4000 h.p.). Thus, it may be more efficient to operate the engine at 4000 h.p. at certain times, even when actual motoring demand falls below that level. In such cases, the excess energy can be transferred to an energy storage medium.

Thus, comparing FIGS. 8A-D with FIGS. 6A-D and 7A-D, the differences between the systems respectively depicted therein become apparent. Referring specifically to FIGS. 8A and 8D, from about 0-70 minutes, the motoring requirements (FIG. 8A) are less than the exemplary optimal 4000 h.p. setting. If desirable, the engine could be run at 4000 h.p. during this time and the energy storage medium could be charged. As illustrated, however, the energy management system determines that, based on the upcoming track profile and anticipated dynamic braking period(s); an upcoming dynamic braking process will be able to fully charge the energy storage medium. In other words, it is not necessary to operate the engine at 4000 h.p. and store the excess energy in the energy storage medium during this time because an upcoming dynamic braking phase will supply enough energy to fully charge the storage medium. It should be understood that the system could also be designed in other ways. For example, in another configuration the system always seeks to charge the storage medium whenever excess energy could be made available.

At approximately 180 minutes, power demands will exceed 4000 h.p. Thus, shortly before that time (while motoring demand is less than 4000 h.p.), the engine can be operated at 4000 h.p. with the excess energy used to charge the energy storage medium to ensure sufficient energy is available to meet the demand at 180 minutes. Thus, unlike the systems reflected in FIGS. 6D and 7D, the system reflected in FIG. 8D provides that, for a brief period prior to 180 minutes, energy is transferred to the energy storage medium from the prime mover, even though the vehicle is motoring (not braking).

Figure 8E:
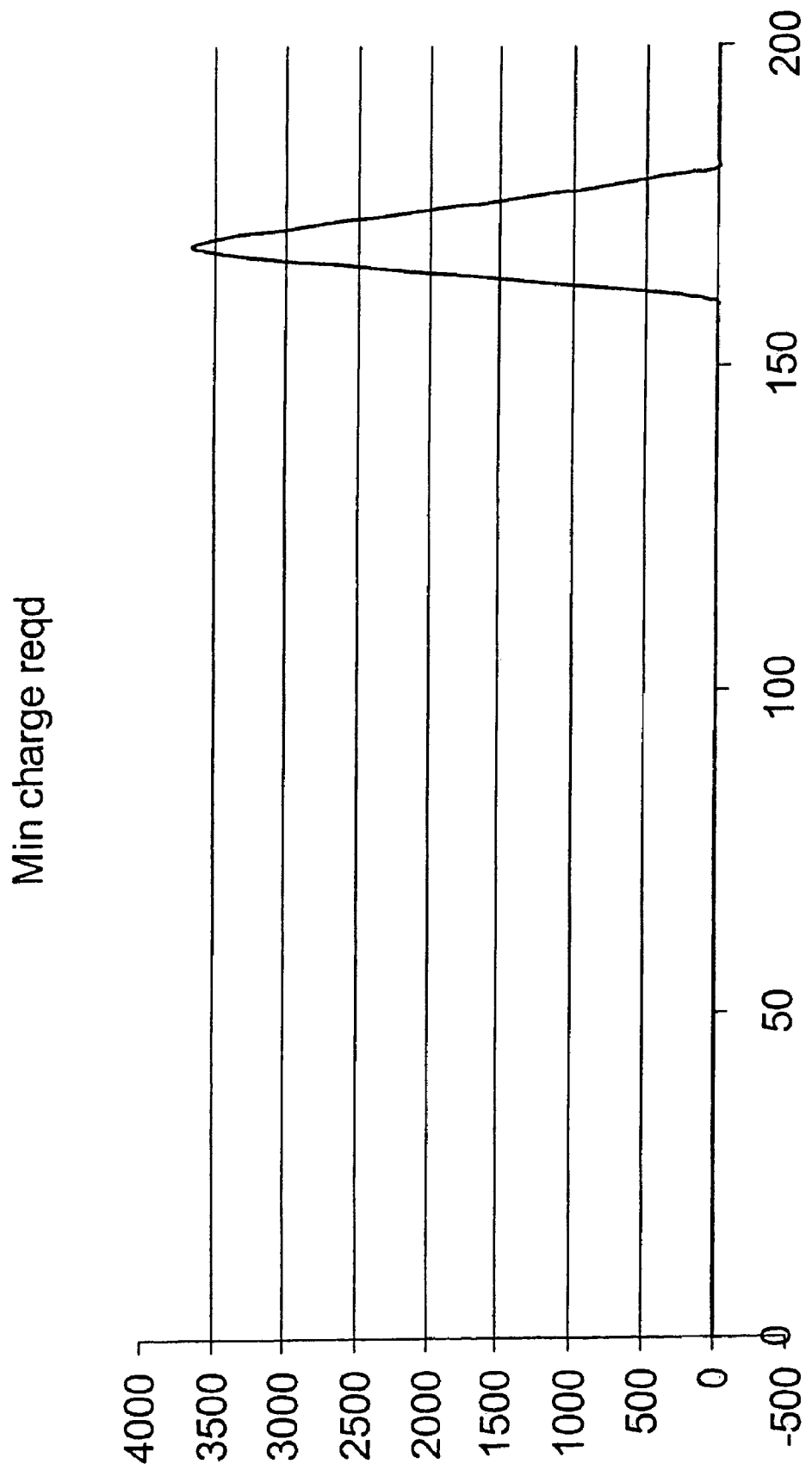

FIG. 8E illustrates one way that the energy management system can implement the look ahead capability to control energy storage and transfer in anticipation of future demands. FIG. 8E assumes a system having a 200 minute look ahead window. Such a look-ahead window is chosen to facilitate an explanation of the system and should not be viewed in a limiting sense. Beginning at the end of the window (200 minutes), the system determines the power/energy demands at any given point in time. If the determined demand exceeds the prime mover's capacity or limit, the system continues back and determines opportunities when energy can be stored, in advance of the determined excess demand period, and ensures that sufficient energy is stored during such opportunities.

Although FIGS. 6A-D, 7A-D, and 8A-E have been separately described, it should be understood that the systems reflected therein could be embodied in a single energy management system. Further, the look-ahead energy storage and transfer capability described above could be accomplished dynamically or in advance. For example, in one form, an energy management processor (see FIG. 5) is programmed to compare the vehicle's present position with upcoming track/course characteristics in real or near real time. Based on such dynamic determinations, the processor then determines how to best manage the energy capture and storage capabilities associated with the vehicle in a manner similar to that described above with respect to FIGS. 7A-D and 8A-E. In another form, such determinations are made in advance. For example, an off-vehicle planning computer may be used to plan a route and determine energy storage and transfer opportunities based on a database of known course information and projected conditions such as, for example, vehicle speed, weather conditions, and the like. Such pre-planned data would thereafter be used by the energy management system to manage the energy capture and storage process. Look ahead planning could also be done based on a route segment or an entire route.

It should further be understood that the energy management system and methods described herein may be put into practice with a variety of vehicle configurations. For example, such systems and methods could be practiced with a locomotive having a separate energy tender vehicle housing the energy capture and storage medium. As another example, the energy management systems and methods herein described could be employed with a locomotive having a separate energy tender vehicle that employs its own traction motors. In another example, the energy management systems and methods described herein may be employed as part of an off-highway vehicle, such as a locomotive, in which the energy storage medium is included as part of the vehicle itself. Other possible embodiments and combinations should be appreciated from the present disclosure and need not be recited in additional detail herein.

FIGS. 9A-9G are electrical schematics illustrating several different embodiments of an electrical system suitable for use in connection with a hybrid energy locomotive. In particular, the exemplary embodiments illustrated in these figures relate to a hybrid energy diesel-electric locomotive system. It should be understood that the embodiments illustrated in FIGS. 9A-9G could be incorporated in a plurality of configurations, including those already discussed herein (e.g., a locomotive with a separate energy tender vehicle, a locomotive with a self-contained hybrid energy system, an autonomous tender vehicle, and the like).

Figure 9A:
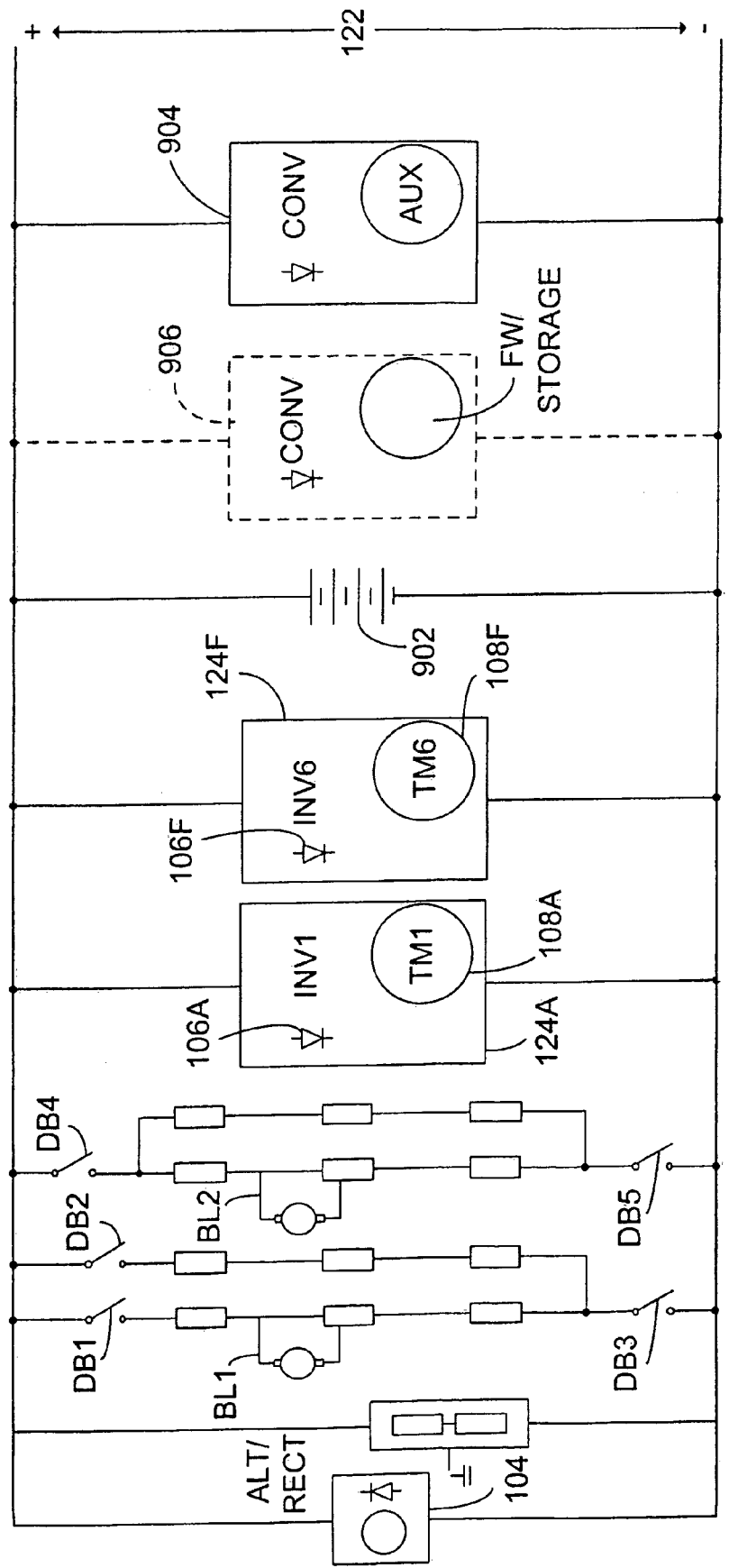
FIGS. 9A-9G are electrical schematics illustrating several embodiments of an electrical system suitable for use in connection with a hybrid energy off-highway vehicle, such as a diesel-electric locomotive.

FIG. 9A illustrates an electrical schematic of a locomotive electrical system having a energy capture and storage medium suitable for use in connection with aspects of the systems and methods disclosed herein. The particular energy storage element illustrated in FIG. 9A comprises a battery storage 902. The battery storage 902 is preferably connected directly across the traction bus (DC bus 122). In this exemplary embodiment, an auxiliary power drive 904 is also connected directly across DC bus 122. The power for the auxiliaries is derived from DC bus 122, rather than a separate bus.

It should be appreciated that more than one type of energy storage element may be employed in addition to battery storage 902. For example, an optional flywheel storage element 906 can also be connected in parallel with battery storage 902. The flywheel storage 906 shown in FIG. 9A is preferably powered by an AC motor or generator connected to DC bus 122 via an inverter or converter. Other storage elements such as, for example, capacitor storage devices (including ultracapacitors) and additional battery storages (not shown) can also be connected across the DC bus and controlled using choppers and/or converters and the like. It should be understood that although battery storage 902 is schematically illustrated as a single battery, multiple batteries or battery banks may likewise be employed.

In operation, the energy storage elements (e.g., battery storage 902 and/or any optional energy storage elements such as flywheel 906) are charged directly during dynamic braking operations. Recall that, during dynamic braking, one or more of the traction motor subsystems (e.g., 124A-124F) operate as generators and supply dynamic braking electric power that is carried on DC bus 122. Thus, all or a portion of the dynamic braking electric power carried on DC bus 122 may be stored in the energy storage element because the power available on the bus exceeds demand. When the engine is motoring, the battery (and any other optional storage element) is permitted to discharge and provide energy to DC bus 122 that can be used to assist in driving the traction motors. This energy provided by the storage element may be referred to as secondary electric power. Advantageously, because the auxiliaries are also driven by the same bus in this configuration the ability to take power directly from DC bus 122 (or put power back into bus 122) is provided. This helps to minimize the number of power conversion stages and associated inefficiencies due to conversion losses. It also reduces costs and complexities.

It should be appreciated that the braking grids may still be used to dissipate all or a portion of the dynamic braking electric power generated during dynamic braking operations. For example, an energy management system is preferably used in connection with the system illustrated in FIG. 9A. Such an energy management system is configured to control one or more of the following functions: energy storage; stored energy usage; and energy dissipation using the braking grids. It should further be appreciated that the battery storage (and/or any other optional storage element) may optionally be configured to store excess prime mover electric power that is available on the traction bus.

As noted in the Field of Invention section, the hybrid system of the instant inventions are adapted for use on various off-highway vehicles, including so-called road locomotives, and large mining dump trucks capable of moving large loads. Road locomotives have engines that supply 4000-6000 hp and move trains carrying loads (including the weight of the railcars) of up to 40,000 to 60,000 tons. Mining dump trucks have engines providing 1500 hp or more, and carry loads (including the weight of the truck itself) of up to 1500 tons. The hybrid systems are also used in switcher locomotives used for moving one or more railcars for relatively short distances, such as in railyards and have reduced horsepower capacity of 1000 to 1200 hp. So-called road switchers move portions of trains for short distances such as in a plant, a port or through a railroad siding. The power regeneration of the traction motors of road locomotives and road switchers is in the range of 5000 to 8000 hp.

The energy storage capacity of the energy storage devices of the hybrid systems of the instant inventions is in the range of 750 to 5000 hphr. Thus for road locomotives, the time to fully recharge the energy storage devices from a state of complete discharge is less than an one hour (or a energy storage capacity to power generation capacity ratio of less than one). The time for recharge of a 500 hphr energy storage device using the 4000 hp primary power is more than one hour (or a charging ratio of greater than one), and somewhat more than that if only a portion of the primary power is then available because of the demands of auxiliary equipment. For switchers and road switchers having hybrid systems of the instant inventions, the recharging is in the range of 2 to 4 hours (and thus a charging ratio of 2 to 4), when 1000-1200 hp of primary power is available to charge the energy storage device. The capacity of the energy storage devices enable a corresponding period of operation of the vehicle, without the operation of the primary power generation equipment, such as for limp home operation upon the loss of the primary power generation equipment. As descried above the electrical energy storage devices enable prolonged periods of vehicle standby operation when only the vehicle auxiliary equipment needs to be powered as well as the operation of air compressors, and the operation of engine heating devices in cold weather.

It should be appreciated that the principles of the instant inventions may apply to any suitable computer equipment, such as other mainframes, minicomputers, network servers, supercomputers, personal computers, or workstations, as well as other electronics applications. Therefore, while the specification herein focuses on particular applications, it should be understood that the instant inventions are not limited to the particular hardware designs, software designs, and communications protocols disclosed herein.

The inventions can also be embodied, in part, as computer readable code on a computer readable medium. The computer readable medium is any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

Based on the foregoing specification, the inventions may be implemented using computer programming or engineering techniques including computer software, firmware, hardware or any combination of subset thereof. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the inventions may be one or more processing systems including, but not limited to, a central processing unit (CPU), memory, storage devices, communications links and devices, servers, I/O devices, or any sub-components of one or more processing systems, including software, firmware, hardware or any combination of subset thereof, which embody the invention as set forth in the claims.

Vehicle input may be received from a keyboard, mouse, pen, voice, touch screen, or any other means by which a human can input data to a computer, including through other programs such as application programs.

One skilled in the art of computer science will be able to combine the software created as described with appropriate general purpose or special purpose computer hardware to create a computer system or computer sub-system embodying the method of the invention.

Those skilled in the art should appreciate that certain circumstances preclude the operation of a diesel engine when the locomotive and/or train need to be moved. For example, the engine may not be operable. As another example, various rules and concerns may prevent the operation of the engine inside buildings, yards, maintenance facilities, or tunnels. In such situations, the train is moved using stored battery power. Advantageously, various hybrid energy locomotive configurations disclosed herein permit the use of stored power for battery jog operations directly. For example, the battery storage 902 of FIG. 9A can be used for battery jog operations. Further, the prior concept of battery jog operations suggests a relatively short time period over a short distance. The various configurations disclosed herein permit jog operations for much longer time periods and over much longer distances.

Figure 9B:
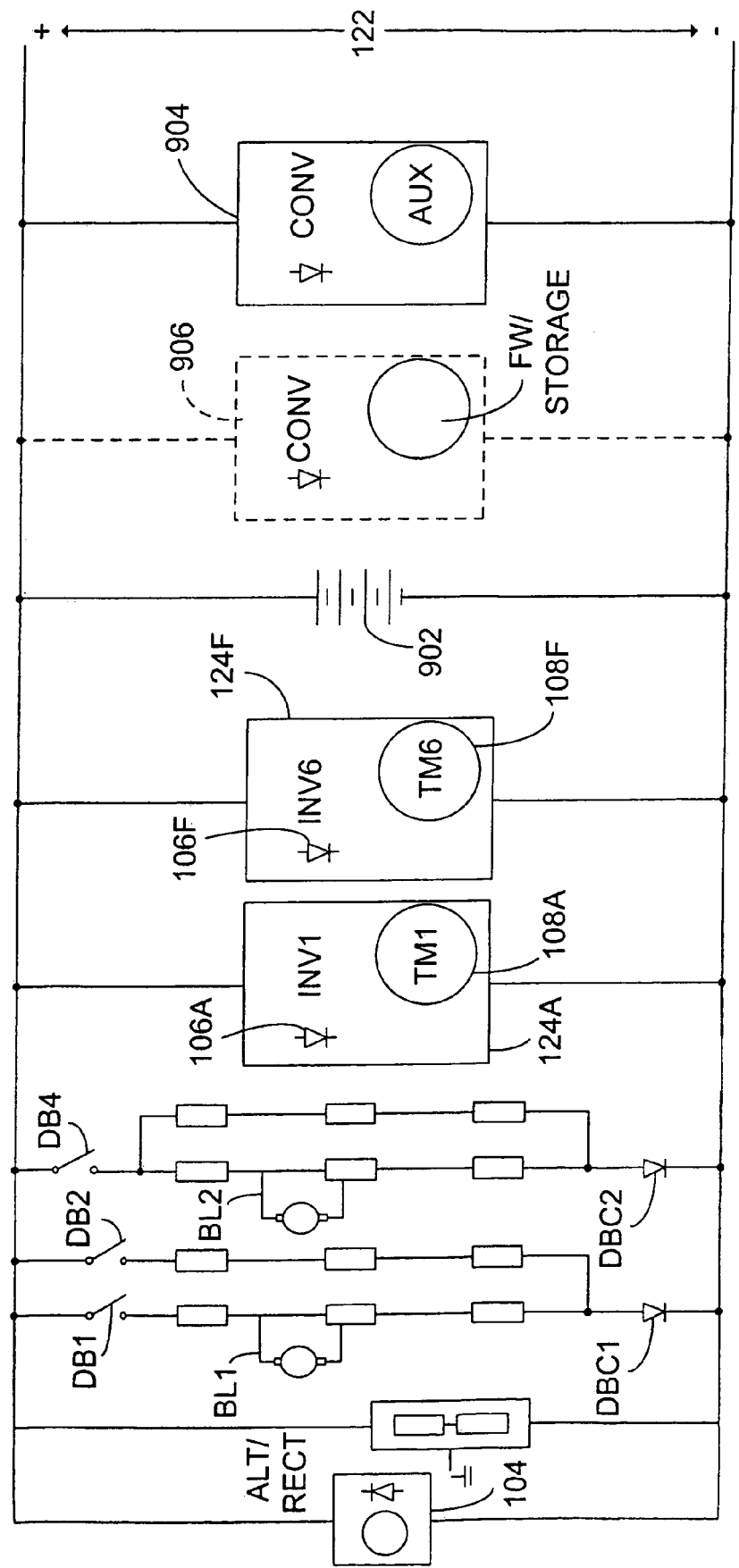

FIG. 9B illustrates a variation of the system of FIG. 9A. A primary difference between FIGS. 9A and 9B is that the system shown in FIG. 9B includes chopper circuits DBC1 and DBC2 connected in series with the braking grids. The chopper circuits DBC1 and DBC2 allow fine control of power dissipation through the grids that, therefore, provides greater control over the storage elements such as, for example, battery storage 902. In one embodiment, chopper circuits DBC1 and DBC2 are controlled by an energy management system (see FIG. 5). It should also be appreciated that chopper circuits DBC1 and DBC2, as well as any optional storage devices added to the circuit (e.g., flywheel storage 906), could also be used to control transient power.

In the configuration of FIG. 9A, the dynamic braking contactors (e.g., DB1, DB2) normally only control the dynamic braking grids in discrete increments. Thus, the power flowing into the grids is also in discrete increments (assuming a fixed DC voltage). For example, if each discrete increment is 1000 h.p. the battery storage capability is 2000 h.p. and the braking energy returned is 2500 h.p. the battery cannot accept all of the braking energy. As such, one string of grids is used to dissipate 1000 h.p. leaving 1500 h.p. for storage in the battery. By adding choppers DBC1, DBC2, the power dissipated in each grid string can be more closely controlled, thereby storing more energy in the battery and improving efficiency. In the foregoing example, choppers DBC1 and DBC2 can be operated at complementary 50% duty cycles so that only 500 h.p. of the braking energy is dissipated in the grids and 2000 h.p. is stored in the battery.

Figure 9C:
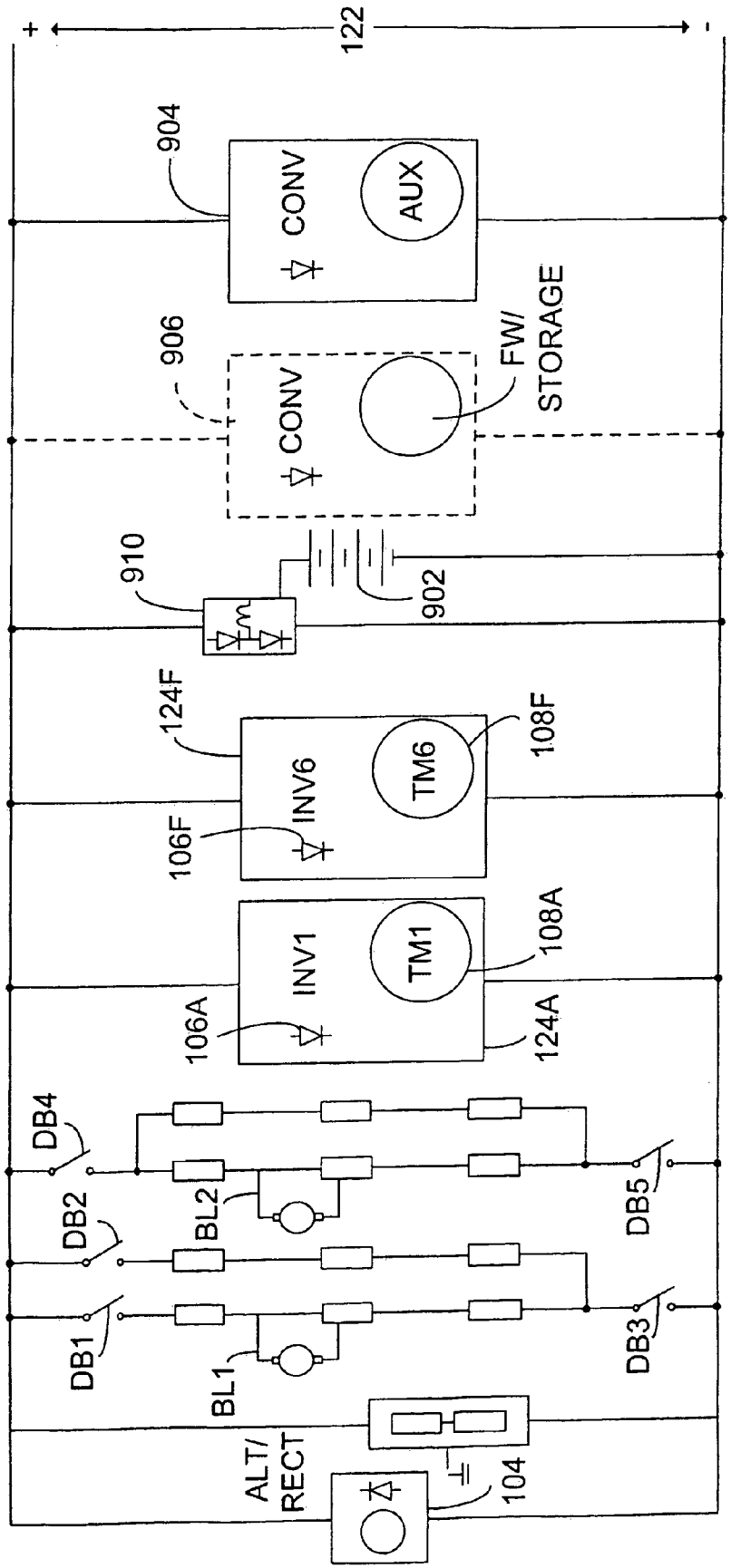

FIG. 9C is an electrical schematic of a locomotive electrical system illustrating still another configuration for implementing an energy storage medium. In contrast to the systems illustrated in FIGS. 9A and 9B. The battery storage 902 of FIG. 9C is connected to DC bus 122 by way of a DC-to-DC converter 910. Such a configuration accommodates a greater degree of variation between DC bus 122 voltage and the voltage rating of battery storage 902. Multiple batteries and/or DC storage elements (e.g., capacitors) could be connected in a similar manner. Likewise, chopper control, such as that illustrated in FIG. 9B could be implemented as part of the configuration of FIG. 9C. It should be further understood that the DC-to-DC converter 910 may be controlled via an energy management processor (see FIG. 5) as part of an energy management system and process that controls the storage and regeneration of energy in the energy storage medium.

In operation, the electric power carried on DC bus 122 is provided at a first power level (e.g., a first voltage level). The DC-to-DC converter 910 is electrically coupled to DC bus 122. The DC-to-DC converter 910 receives the electric power at the first power level and converts it to a second power level (e.g., a second voltage level). In this way, the electric power stored in battery storage 902 is supplied at the second power level. It should be appreciated that the voltage level on DC bus 122 and the voltage supplied to battery storage 902 via DC-to-DC converter 910 may also be at the same power level. The provision of DC-to-DC converter 910, however, accommodates variations between these respective power levels.

Figure 9D:
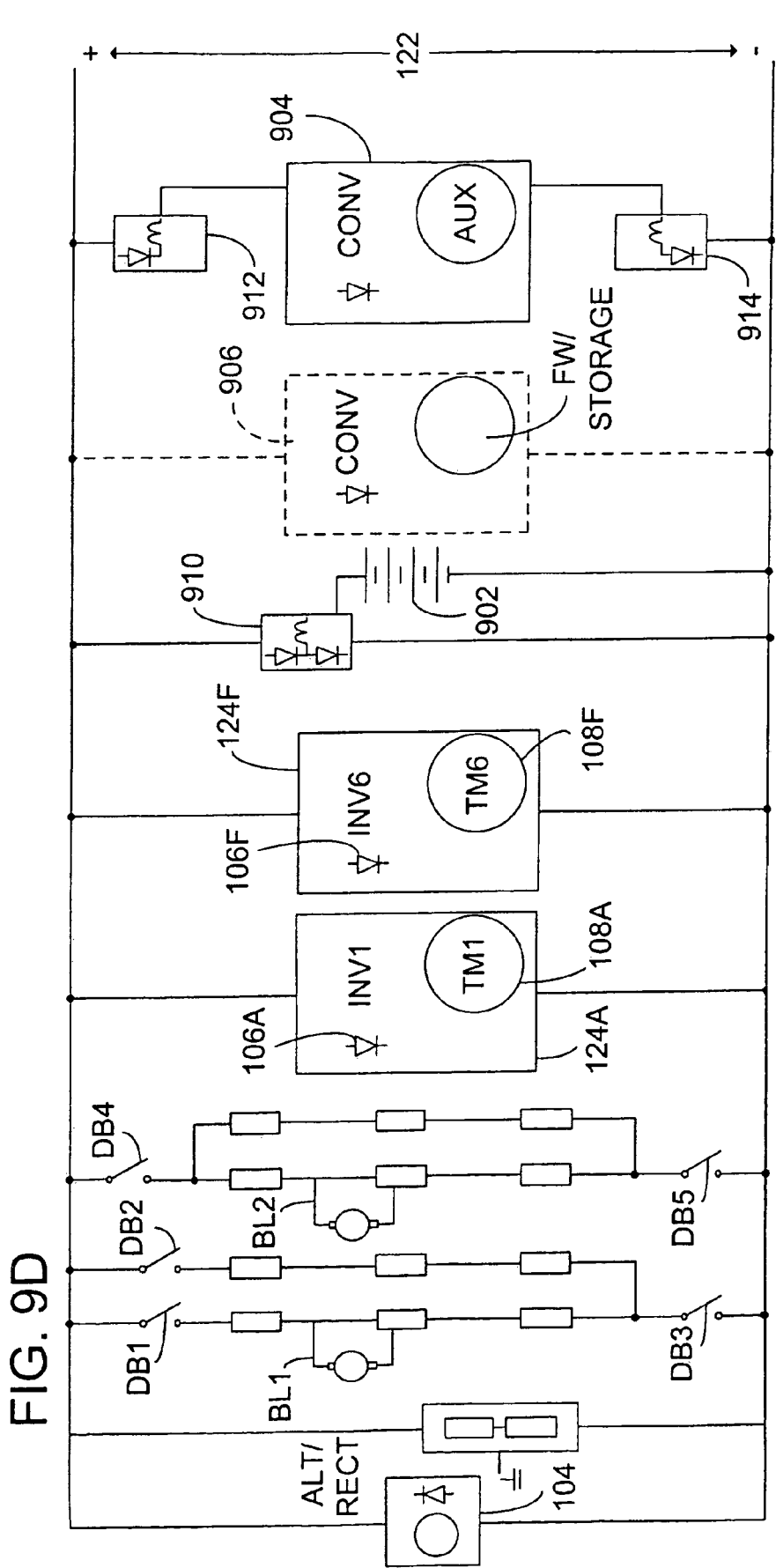

FIG. 9D is an electrical schematic of a locomotive electrical system that is similar to the system shown in FIG. 9C. One difference between these systems is that the auxiliary power subsystem 904 reflected in FIG. 9D is connected to DC bus 122 via a pair of DC-to-DC converters 912 and 914. Such a configuration provides the advantage of allowing the use of existing, lower voltage auxiliary drives and/or motor drives having low insulation. On the other hand, in this configuration, the auxiliary power traverses two power conversion stages. It should be understood that although FIG. 9D illustrates the auxiliaries as consuming power all of the time—not regenerating—bi-directional DC-to-DC converters can also be used in configurations in which it is desirable to have the auxiliaries regenerate power (see, for example, FIG. 9G). These DC-to-DC converters 912 and 914 are preferably controlled via an energy management system that controls the storage and regeneration of energy in the energy storage medium.

Figure 9E:
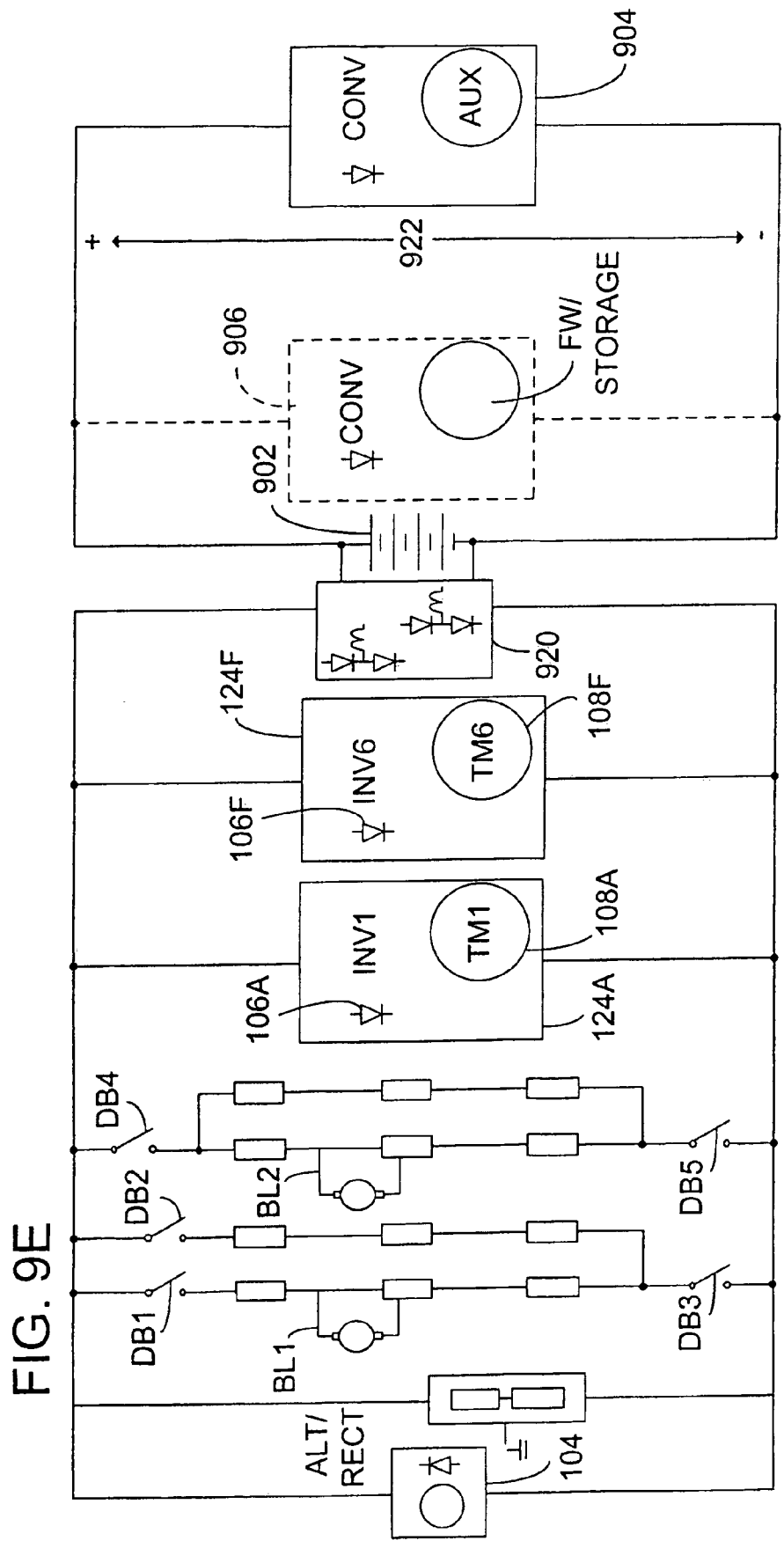

FIG. 9E illustrates, in electrical schematic form, still another configuration of an energy storage medium. Unlike the examples illustrated in FIGS. 9A-9D, however, the configuration of FIG. 9E includes a separate DC battery bus 922. The separate battery bus 922 is electrically isolated from main DC bus 122 (the traction bus) by a DC-to-DC converter 920 (also referred to as a two-stage converter). Accordingly, the power flow between the traction bus (DC bus 122), the energy storage elements, and the auxiliaries preferably passes through the bi-directional DC-to-DC converter 920. In the configuration of FIG. 9E, any additional storage elements (e.g., flywheels, capacitors, and the like) are preferably connected across the DC battery bus 922, rather than across the main DC bus 122. The DC-to-DC converter 920 may be controlled via an energy management system that controls the storage and regeneration of energy in the energy storage medium.

Figure 9F:
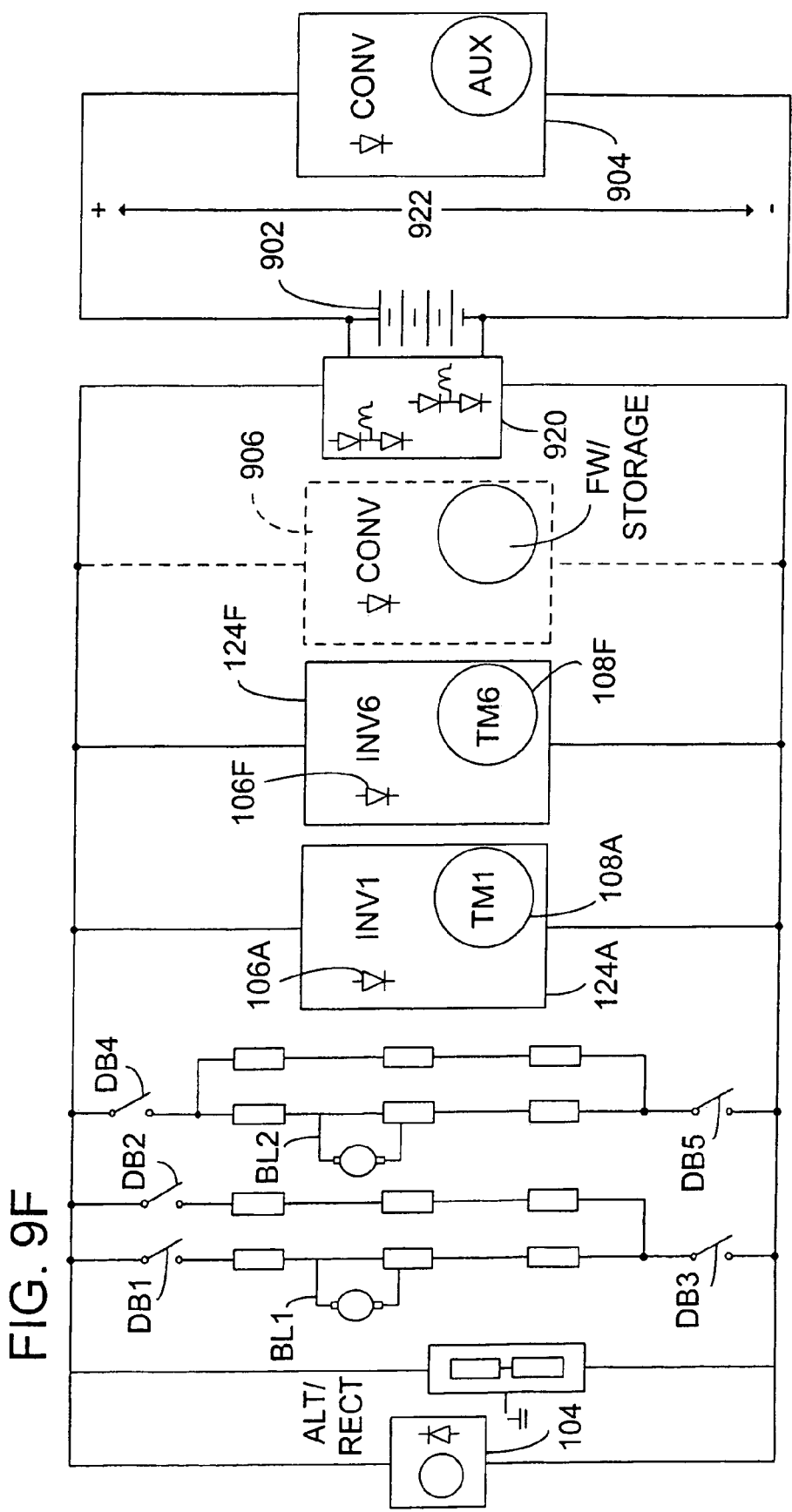

FIG. 9F reflects a variation of the configuration of FIG. 9E. In the configuration of FIG. 9F, any variable voltage storage elements (e.g., capacitors, flywheels, and the like) that are used in addition to battery storage 902 are connected directly across main DC bus 122 (the traction bus). However, battery storage 902 remains connected across the isolated DC battery bus 922. Advantageously, in this configuration DC-to-DC converter 920 matches the voltage level of battery storage 902 but avoids two conversions of large amounts of power for the variable voltage storage elements. Like the other configurations, the configuration of FIG. 9F may be implemented in connection with an energy management system that oversees and controls the storage and regeneration of energy in the energy storage medium.

Figure 9G:
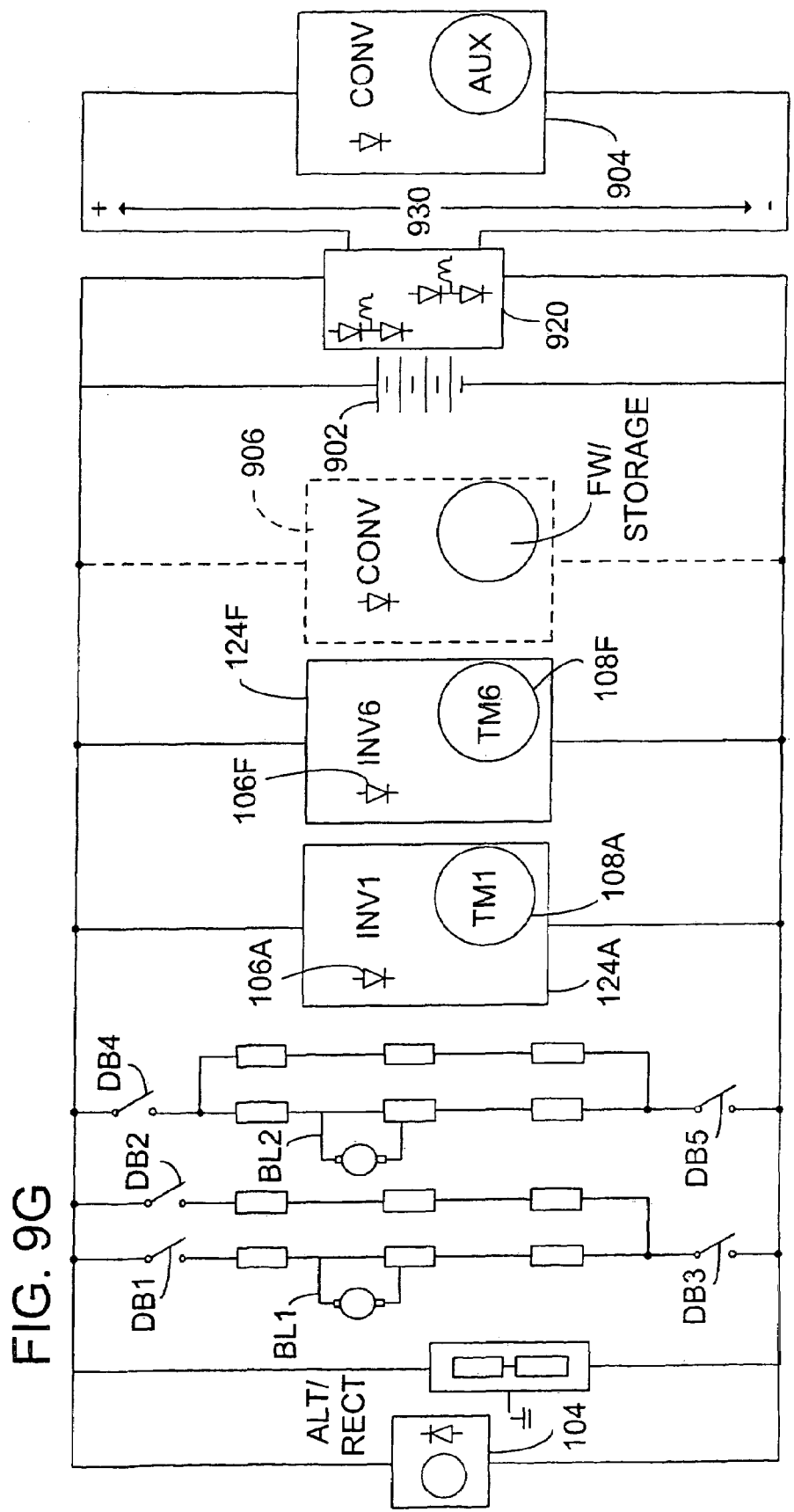

FIG. 9G reflects a variation of the configuration of FIG. 9F in which only the auxiliaries are connected to a separate auxiliary bus 930 through two-stage converter 920. Accordingly, electric power carried on DC bus 122 is provided at a first power level and power carried on the auxiliary bus 930 is provided at a second power level. The first and second power levels may or may not be the same.

Figure 10A:
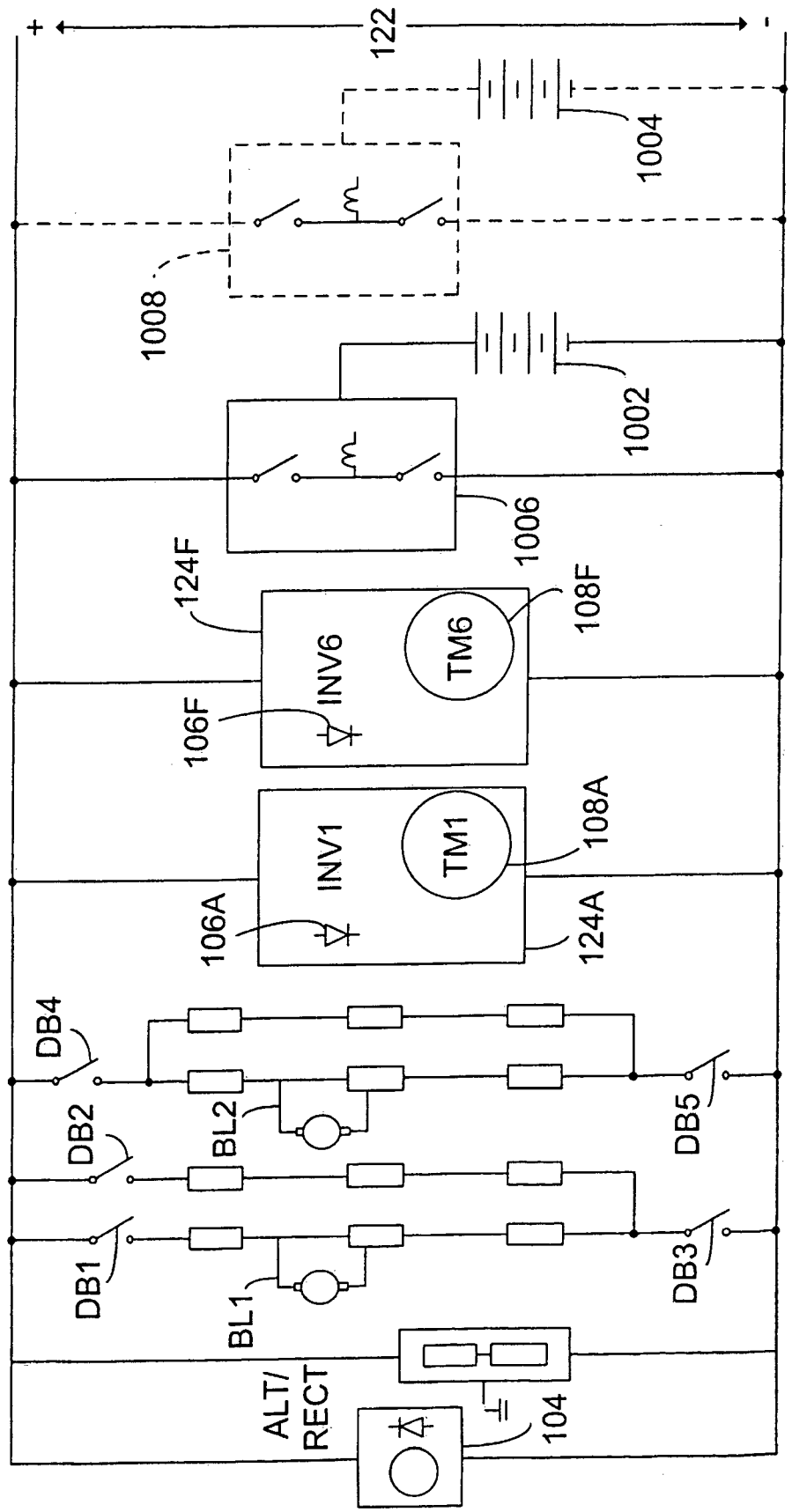
FIGS. 10A-10C are electrical schematics illustrating additional embodiments of an electrical system suitable for use in connection with a hybrid energy off-highway vehicle, such as a diesel-electric locomotive.
Figure 10B:
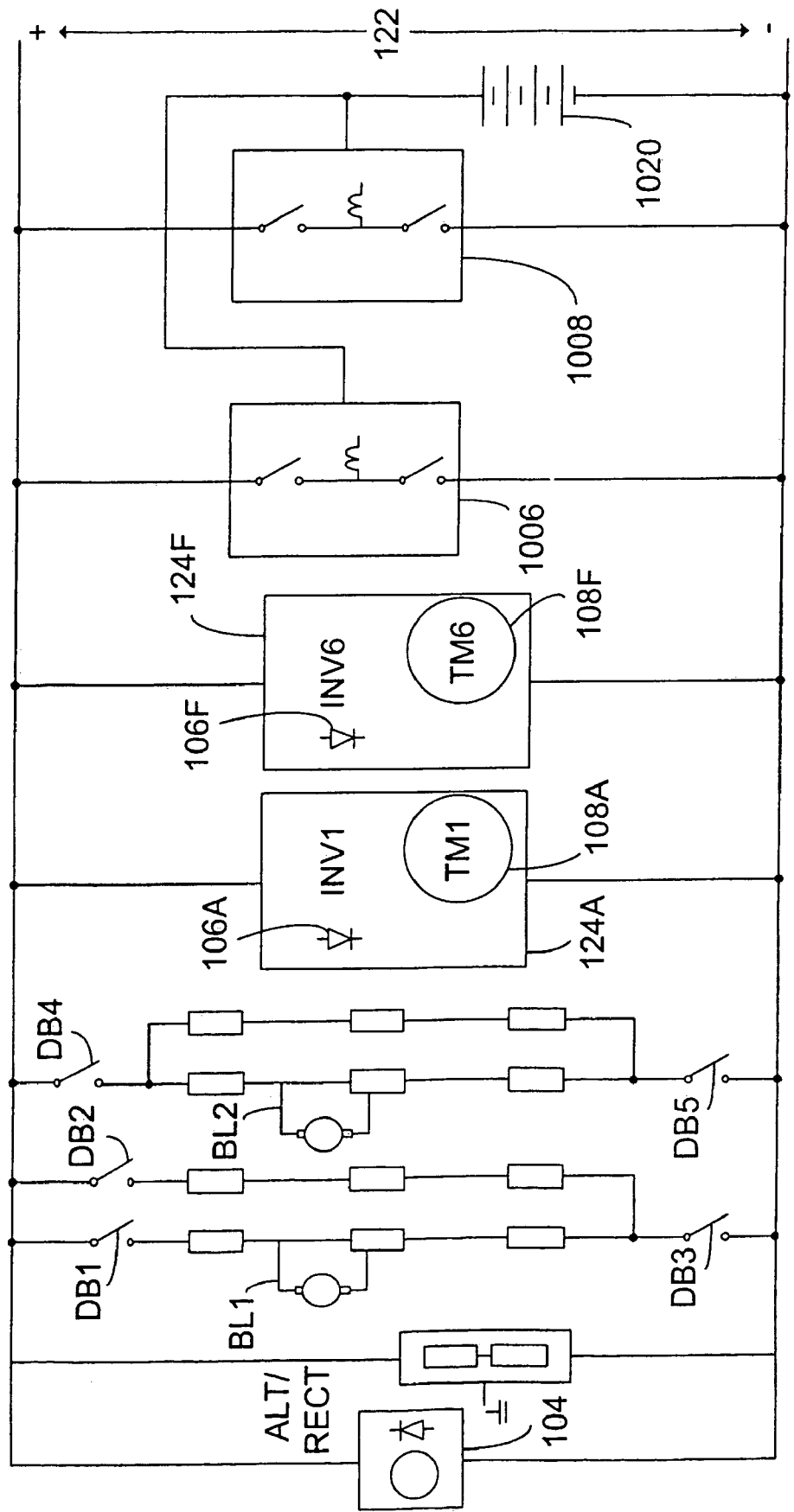
Figure 10C:
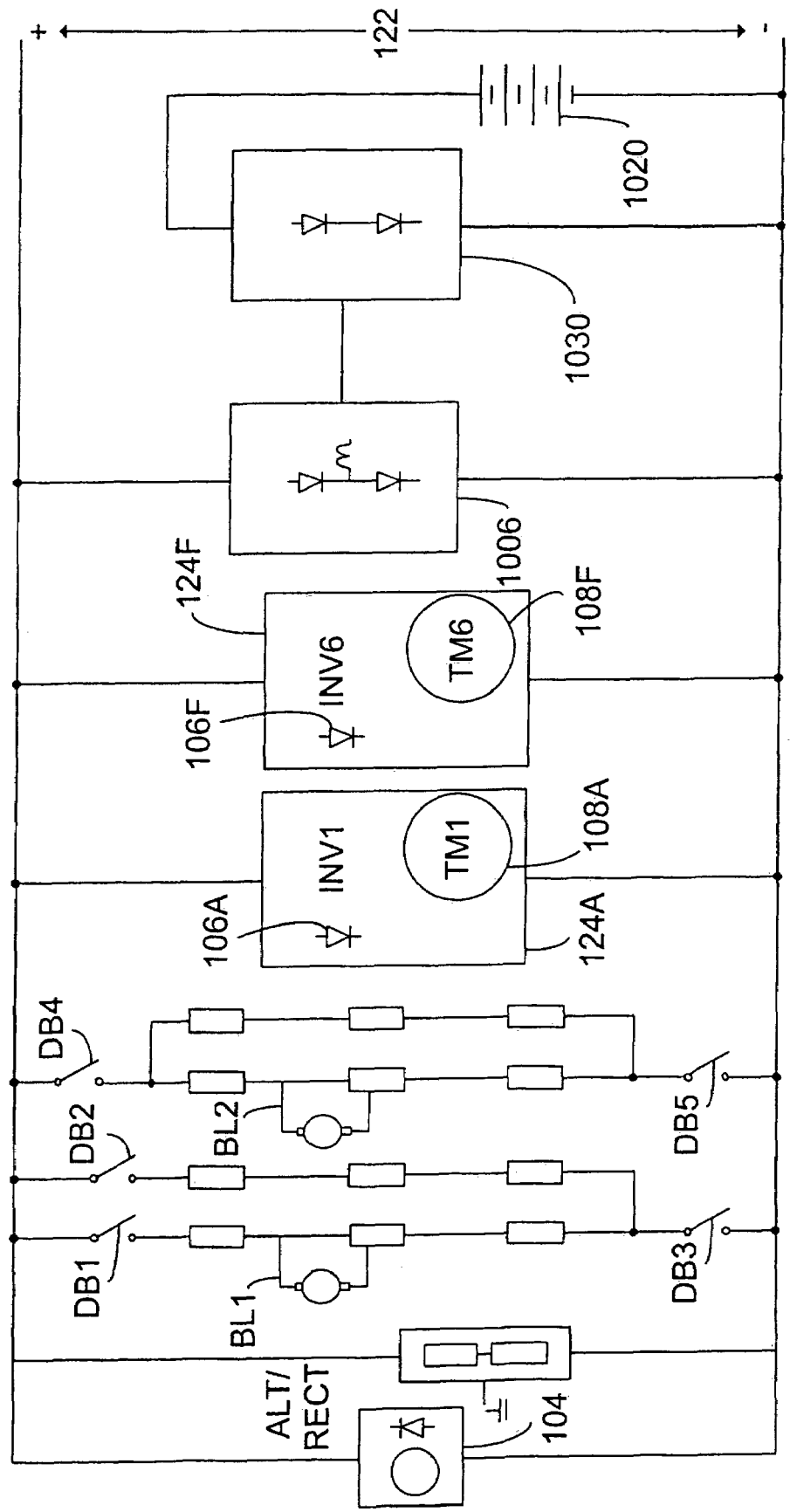

FIGS. 10A-10C are electrical schematics that illustrate additional embodiments, including embodiments particularly suited for modifying existing AC diesel-electric locomotives to operate in accordance with aspects of the present disclosure. It should be understood, however, that the configurations illustrated and described with respect to FIGS. 10A-10C are not limited to retrofitting existing diesel-electric locomotives.

FIG. 10A illustrates a variation of the embodiment illustrated in FIG. 9C. The embodiment of FIG. 10A uses only battery storage devices and does not include a non-battery storage, such as optional flywheel storage 906. In particular, FIG. 10A illustrates an embodiment having a converter 1006 (e.g., a DC-to-DC converter) connected across DC bus 122. A battery storage element 1002 is connected to the converter 1006. Additional converters and battery storage elements may be added to this configuration in parallel. For example, another converter 1008 may be connected across DC bus 122 to charge another battery storage element 1004. One of the advantages of the configuration of FIG. 10A is that it facilitates the use of multiple batteries (or battery banks) having different voltages and/or charging rates.

In certain embodiments, power transfer between energy storage devices is facilitated. The configuration of FIG. 10A, for instance, allows for energy transfer between batteries 1002 and 1004 via the DC bus 122. For example, if, during motoring operations, the engine (prime mover) supplies 2000 h.p. of power to the DC traction bus, the traction motors consume 2000 h.p., and battery 1002 supplies 100 h.p. to the traction bus (via converter 1006), the excess 100 h.p. is effectively transferred from battery 1002 to battery 1004 (less any normal losses).

The configuration illustrated in FIG. 10B is similar to that of FIG. 10A, except that it uses a plurality of converters (e.g., converters 1006, 1008) connected to the DC bus 122 to supply a common battery 1020 (or a common battery bank). One of the advantages of the configuration of FIG. 10B is that it allows the use of relatively smaller converters. This may be particularly advantageous when retrofitting an existing locomotive that already has one converter. A similar advantage of this configuration is that it allows the use of higher capacity batteries. Still another advantage of the configuration of FIG. 10B is that it permits certain phase shifting operations, thereby reducing the ripple current in the battery and allowing the use of smaller inductors (not shown). For example, if converters 1006 and 1008 are operated at 1000 Hz, 50% duty cycles, and the duty cycles are selected such that converter 1006 is on while converter 1008 is off, the converter effect is as if a single converter is operating at 2000 Hz, which allows the use of smaller inductors.

FIG. 10C an electrical schematic illustrating another embodiment that is particularly well suited for retrofitting an existing diesel-electric locomotive to operate as a hybrid energy locomotive. The configuration of FIG. 10C uses a double set of converters 1006, 1030 and one or more batteries 1020 (of the same or different voltage levels). An advantage of the system depicted in FIG. 10C is that the battery 1020 can be at a higher voltage level than the DC bus 122. For example, if the converters 1006, 1008 illustrated in FIGS. 10A and 10B are typical two quadrant converters, they will also have freewheeling diodes associated therewith (not illustrated). If the voltage of battery 1002, 1004 (FIG. 10A), or 1020 (FIG. 10B) exceeds the DC bus voltage, the battery will discharge through the freewheeling diode. A double converter, such as that illustrated in FIG. 10C, avoids this situation. One advantage of this capability is that the voltage level on the DC bus can be modulated to control power to the dynamic braking grids independently.

Figure 11:
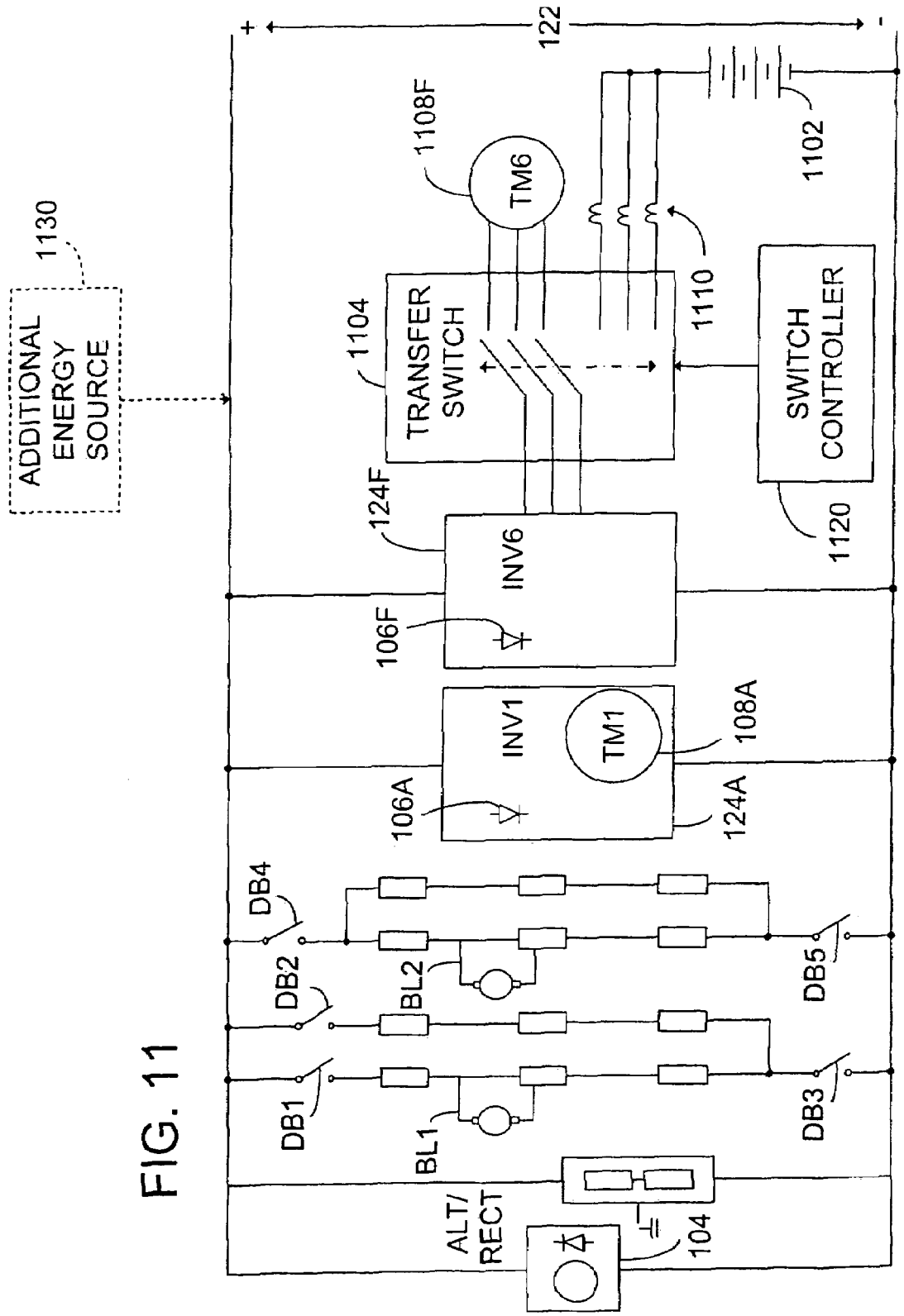
FIG. 11 is an electrical schematic that illustrates one preferred way of connecting electrical storage elements.

FIG. 11 is an electrical schematic that illustrates one preferred way of connecting electrical storage elements. In particular, FIG. 11 illustrates an electrical schematic of a system that may be used for retrofitting a prior art diesel-electric locomotive to operate as a hybrid energy locomotive, or for installing a hybrid energy system as part of the original equipment during the manufacturing process. The embodiment illustrated assumes an AC diesel-electric locomotive with six axles. Each axle is driven by an individual traction motor subsystem. One such AC locomotive is the AC4400, available from the assignee of the present invention.

Typically, the converter/motor system has extra capability (e.g., power capacity) available in the majority of operating conditions. Such extra capability may be due to lower actual ambient conditions, as compared with the design criteria. For example, some locomotives are designed to operate in ambient temperatures of up to 60 degrees Celsius, which is well above typical operating conditions. Considerations other than thermal conditions may also result in extra capacity during significant operating periods. In a typical diesel-electric locomotive, for instance, the use of all of the traction motors may only be required for low speed and when the locomotive operates in an adhesion limited situation (poor rail conditions). In such case, the weight on the driven axles determines the pulling power/tractive effort. Hence, all axles/motors need to be driven to obtain maximum tractive effort. This can be especially true if the train is heavily loaded during poor rail conditions (snowy or slippery). Such conditions are normally present for only a fraction of the locomotive operating time. During the majority of the operating time, all of the traction motors/inverters are not fully utilized to supply tractive effort. Thus, for example, when retrofitting an existing prior art locomotive, or manufacturing a new locomotive, it is possible to take advantage of this partial underutilization of the traction motors/inverters.

By way of a specific example, the embodiment of FIG. 11 is configured such that one of the six traction motor subsystems is connected to the energy storage element 1102, through a transfer switch 1104 and a plurality of windings 1110. More particularly, the traction motor subsystem 1124F includes an inverter 106F and a traction motor 1108F. Such a configuration is suited for retrofitting a single axle of an existing prior art diesel-electric locomotive. It should be understood that retrofitting a typical prior art diesel-electric locomotive requires the addition of power conversion equipment and associated cooling devices. The space available for installing the retrofit equipment, however, is generally limited. Therefore, one of the advantages of the "single-axle" configuration of FIG. 11 is that it tends to minimize impacts and makes retrofitting a more viable option. Similar advantages, however, may also be enjoyed when the hybrid energy system is installed as original equipment during manufacturing.

The transfer switch 1104 preferably comprises a three-phase set of contactors or a set of motorized contacts (e.g., bus bars) that connect inverter 106F to traction motor 1108F when all of the axles are needed, and connects inverter 1106F to inductors 1110 and battery 1102 when battery charging or discharging is desired. Thus, transfer switch 1104 has a first connection state and a second connection state. In the first connection state, transfer switch 1104 connects inverter 106F to traction motor 1108F. In the second connection state, transfer switch connects inverter 106F to battery 1102.

Transfer switch 1104 is preferably controlled by a switch controller 1120. In one form, the switch controller 1120 is a manual operator-controlled switch that places transfer switch 1104 into the first or the second connection state. In another form, the switch controller reflects control logic that controls the connection state of transfer switch 1104 in accordance with a preferred operating scheme. Table I (below) is indicative of one such preferred operating scheme. Other schemes are possible.

Although FIG. 11 illustrates a three-phase connection between battery 1102 and transfer switch 1104, it is not necessary that all three phases be used. For example, if the power requirement is relatively low, only one or two phases may be used. Similarly, three separate batteries could be independently connected (one to each phase), or one large battery could be connected to two phases, with a relatively smaller battery connected to the third phase. Further, power transfer between multiple batteries having different voltage potentials and/or capacities is also possible.

The configuration of FIG. 11 is especially advantageous in the context of retrofitting existing locomotives because transfer switch 1104 is believed to be much less expensive than adding additional inverters and/or DC-to-DC converters. Such advantage, however, is not limited to the retrofit context. Also, it should be understood that the configuration of FIG. 11 is not limited to a single inverter per transfer switch configuration.

FIG. 11 further illustrates an optional charging source 1130 that may be electrically connected to DC traction bus 122. The charging source 1130 may be, for example, another charging engine (see FIG. 3) or an external charger, such as that discussed in connection with FIG. 5.

The general operation of the configuration of FIG. 11 will be described by reference to the connection states of transfer switch 1104. When transfer switch 1104 is in the first switch state, the sixth axle is selectively used to provide additional motoring or braking power. In this switch state, battery 1102 is effectively disconnected and, therefore, neither charges nor discharges.

When the sixth axle is not needed, switch controller 1120 preferably places transfer switch 1104 in the second connection state—battery 1102 is connected to inverter 106F. If, at this time, the other traction motors (e.g., traction motor 108A) are operating in a dynamic braking mode, electrical energy is generated and carried on DC traction bus 122, as described in greater detail elsewhere herein. Inverter 106F transfers a portion of this dynamic braking electrical energy to battery 1102 for storage. If, on the other hand, the other traction motors are operating in a motoring mode, inverter 106F preferably transfers any electrical energy stored in battery 1102 onto DC traction bus 122 to supplement the primary electric power supplied by prime mover power source 104. Such electrical energy transferred from battery 1102 to DC traction bus 122 may be referred to as secondary electric power. In one preferred embodiment, inverter 106F comprises a chopper circuit (not shown) for controlling the provision of secondary electric power to DC traction bus 122 from battery 1102.

It should be understood, however, that battery 1102 can also be charged when the other traction motors are not operating in a dynamic braking mode. For example, the battery can be charged when transfer switch 1104 is in the second connection state (battery 1102 is connected to inverter 106F) and the other traction motors are motoring or idling if the amount of power drawn by the other traction motors is less than the amount of primary electric power carried on DC traction bus 122.

Advantageously, battery 1102 can also be charged using charging electric power from optional energy source 1130. As illustrated in FIG. 11, optional energy source 1130 is preferably connected such that it provides charging electric power to be carried on DC traction bus 122. When optional energy source 1130 is connected and providing charging electric power, switch controller 1120 preferably places transfer switch 1104 in the second connection state. In this configuration, inverter 106F transfers a portion of the electric power carried on DC traction bus 122 to battery 1102 for storage. As such, battery 1102 may be charged from optional energy source 1130.

In summary, in the embodiment of FIG. 11, when transfer switch is in the second connection state, battery 1102 may be charged from dynamic braking energy, from excess locomotive energy (e.g., when the other traction motors draw less power than the amount of primary electric power carried on DC traction bus 122), and/or from charging electric power from optional charging source 1130. When transfer switch 1104 is in the second connection state and the other traction motors draw more power than the amount of primary electric power carried on DC traction bus 122, inverter 1106 transfers secondary electric power from battery 1102 to DC traction bus 122 to supplement the primary electric power. When transfer switch 1104 is in the first connection state, battery 1102 is disconnected and traction motor 1108F is operable to assist in motoring and/or dynamic braking. Table I summarizes one set of operating modes of the embodiment of FIG. 11.

TABLE I

| Five Axles | Six Axles |
|---|---|
| Low Speed and Low Tractive Effort Settings | Battery Fully Charged & Dynamic Braking |
| High Speed Motoring | No Battery Charging & Motoring<br>Battery Discharged & Motoring<br>Very High Speed Dynamic Braking |

While FIG. 11 illustrates an energy storage device in the form of a battery, other energy storage devices, such as flywheel systems or ultracapacitors, may also be employed instead of or in addition to battery 1102. Further, it should be understood that the configuration of FIG. 11 may be scaled. In other words, the configuration can be applied to more than one axle.

Figure 12:
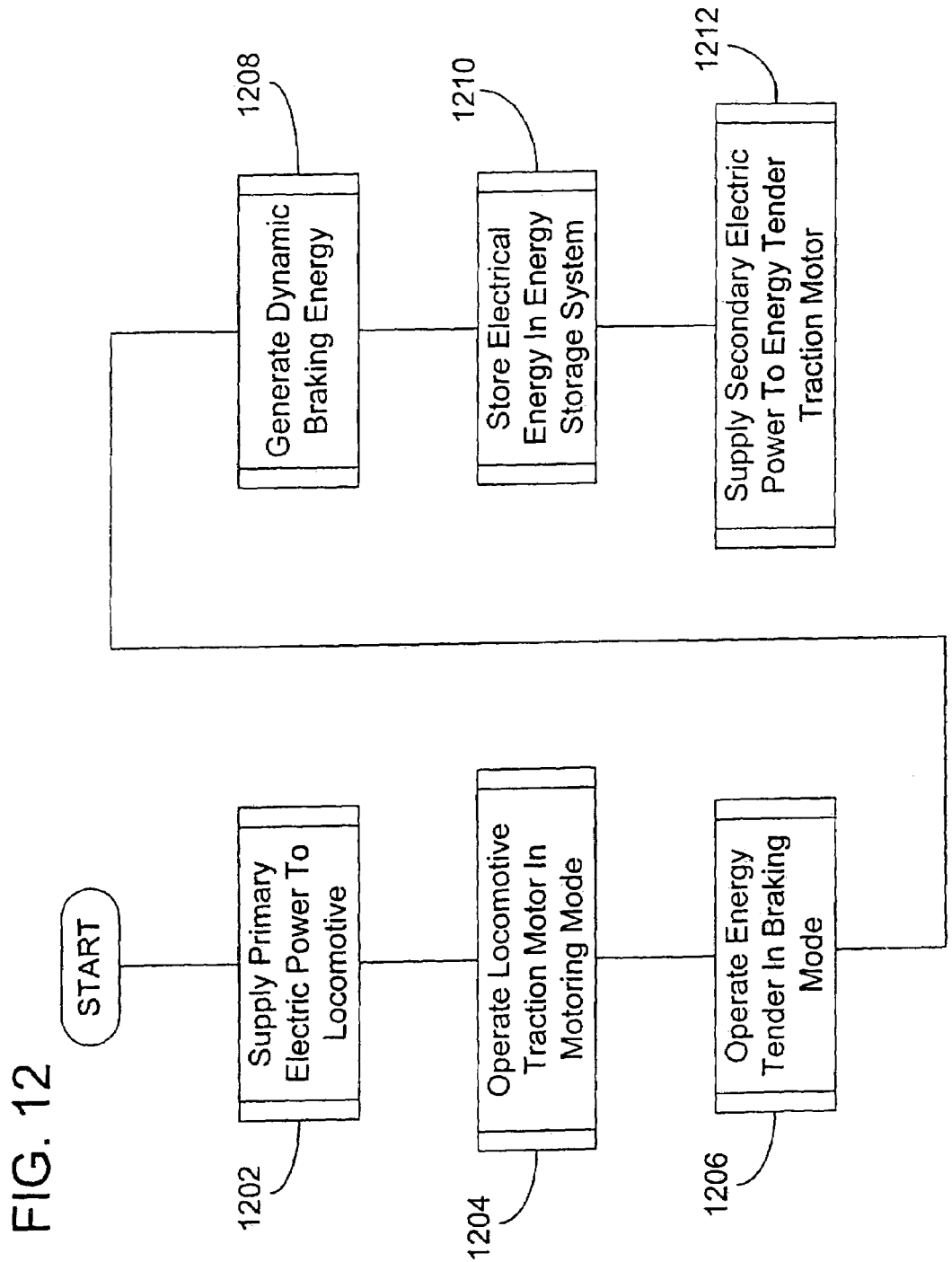
FIG. 12 is a flow chart that illustrates one method of operating a hybrid energy locomotive system.

FIG. 12 is a flow chart that illustrates one method of operating a hybrid energy locomotive system. The particular method illustrated relates to a system including a locomotive vehicle and an energy tender vehicle. The locomotive includes a diesel-electric prime mover power source that supplies primary electric power to a plurality of traction motor systems associated with the locomotive. As explained elsewhere herein, the traction motor systems operate the locomotive in a motoring mode in response to the primary electric power. In this particular example, the energy tender also includes a plurality of traction motor systems (see FIG. 2). The energy tender traction motor systems are operable in both a motoring mode and a dynamic braking mode. The energy tender vehicle also includes an energy storage system for capturing at least a portion of the electrical energy generated when the energy tender traction motors operate in the dynamic braking mode.

At blocks 1202 and 1204, primary electric power is supplied to one or more of the locomotive traction motor systems, thereby causing the locomotive to operate in a motoring mode. When the locomotive traction motor systems operate in the motoring mode, it is possible to operate one or more of the energy tender traction motor systems in a dynamic braking mode, as shown by block 1206. Of course, the energy tender traction motor systems can be operated in the dynamic braking mode at other times such as, for example, when the locomotive traction motor systems operate in the dynamic braking mode. As shown at blocks 1208 and 1210, when one or more of the energy tender traction motor systems operate in the dynamic braking mode, electrical energy is generated. Some of the dynamic braking energy is preferably stored in the energy storage system for later use. For example, such stored power may be converted and supplied as secondary electric power for use by the energy tender traction motor systems to assist in motoring, as shown by block 1212.

Advantageously, the method of FIG. 12 permits locating the energy tender vehicle anywhere in the train because the energy tender vehicle can capture dynamic braking energy from its own traction motor systems. In other words, the energy capture system need not be electrically connected to the locomotive in order to store energy for later use.

Although the foregoing descriptions have often referred to AC diesel-electric locomotive systems to describe several pertinent aspects of the disclosure, the present invention should not be interpreted as being limited to such locomotive systems. For example, aspects of the present disclosure may be employed with "all electric" locomotives powered by electric "third rails" or overhead power systems. Further, aspects of the hybrid energy locomotive systems and methods described herein can be used with diesel-electric locomotives using a DC generator rather than an AC alternator and combinations thereof. Also, the hybrid energy locomotive systems and methods described herein are not limited to use with AC traction motors. As explained elsewhere herein, the energy management system disclosed herein may be used in connection with non-locomotive off-highway vehicles such as, for example, large excavators.

As can now be appreciated, the hybrid energy systems and methods herein described provide substantial advantages over the prior art. Such advantages include improved fuel efficiency, increased fuel range, and reduced emissions such as transient smoke. Other advantages include improved speed by the provision of an on-demand source of power for a horsepower burst. Such a system also provides improved tunnel performance such as, for example, improved immunity to oxygen and/or temperature derations in tunnels. Also among the advantages are reduced noise and vibration conditions, which may be particularly beneficial to personnel who work on the train. Significantly, the hybrid energy locomotive system herein described may also be adapted for use with existing locomotive systems.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several objects of the invention are achieved and other advantageous results attained.

As various changes could be made in the above exemplary constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

The invention claimed is:

1. In a computerized system for controlling the operation of a hybrid energy railway vehicle, said railway vehical comprising:
 a hybrid energy railway vehicle having a plurality of wheels;
 a traction motor coupled to at least one of the wheels, said traction motor having a motoring mode of operation for driving the coupled wheel and a dynamic braking mode of operation for braking the coupled wheel, and said traction motor generating dynamic braking electrical energy when operating in the dynamic braking mode;
 an electrical energy source for supplying charging electrical energy; and
 an electrical energy storage system in electrical communication with the energy source and the traction motor for storing electrical energy, said energy storage system storing charging electrical energy supplied by the energy source to the energy storage system and storing dynamic braking electrical energy generated by the traction motor during braking, said energy storage system selectively supplying stored electrical energy to the traction motor for driving the coupled wheel, and said computerized system comprising a processor executing computer executable instructions, the improvement comprising computer executable instructions including:

defining instructions for defining a plurality of hybrid energy railway vehicle operating modes, each of said operating modes defining a set of operational parameters; and operating instructions for controlling the operation of the hybrid energy railway vehicle as a function of at least one of the operating modes.

2. The computerized system of claim 1, wherein the operating modes include one or more of the following: a switcher mode, an energy tender mode, a pusher mode, and a roadmate mode.

3. The computerized system of claim 1, wherein the set of operational parameters includes one or more of the following: defining a configuration of the energy storage system, operating the traction motor in the dynamic braking mode to generate dynamic braking electrical energy, dissipating dynamic braking electrical energy, receiving external electrical energy, supplying stored electrical energy, generating charging electrical energy, operating the traction motor in the motoring mode, storing charging electrical energy, storing dynamic braking electrical energy, storing received external electrical energy, and receiving a control command from an external control system.

4. The computerized system of claim 1, wherein the railway vehicle further comprises a communication link in communication with the processor, and wherein the operating instructions select an operating mode for controlling the operation of the railway vehicle in response to a control command received via the communication link.

5. The computerized system of claim 4, wherein the control command is received from an external control system.

6. The computerized system of claim 1, wherein operating instructions control the operation of another railway vehicle as a function of at least one of the operating modes.

7. In a computerized system for controlling the operation of a hybrid energy railway vehicle, said railway vehicle comprising:

a hybrid energy railway vehicle;

an electrical energy source for supplying charging electrical energy;

an electrical energy storage system for storing the charging electrical energy supplied by the energy source;

a converter electrically coupled to the energy storage system, said energy storage system selectively transferring stored electrical energy to the converter and said converter being responsive to the transferred stored electrical energy to provide hybrid energy railway vehicle drive energy;

a traction motor, said traction motor being electrically coupled to the converter and adapted to propel the hybrid energy railway vehicle in response to the railway vehicle drive energy;

a resistive grid electrically connected to the energy storage system, said resistive grid dissipating electrical energy selectively supplied thereto by the energy source; and said computerized system comprising a processor executing computer executable instructions, the improvement comprising computer executable instructions including:

defining instructions for defining a plurality of hybrid energy railway vehicle operating modes, each of said operating modes defining a set of operational parameters; and operating instructions for controlling the operation of the hybrid energy railway vehicle as a function of at least one of the operating modes.

8. In a computerized system for controlling the operation of a hybrid energy railway vehicle system comprising:

a hybrid energy railway vehicle having a plurality of wheels;

a traction motor having a motoring mode of operation for driving one of the wheels in response to electrical input energy, said traction motor also having a dynamic braking mode of operation for dynamically braking the traction motor, said traction motor generating dynamic braking electrical energy when operating in the dynamic braking mode;

an electrical energy storage system in electrical communication with the traction motor for selectively storing dynamic braking electrical energy generated by the traction motor during braking;

a converter selectively providing stored electrical energy from the energy storage system to the traction motor as electrical input energy for driving one or more of the wheels; and said computerized system comprising a processor executing computer executable instructions, the improvement comprising executing computer executable instructions including:

defining instructions for defining a plurality of hybrid energy railway vehicle operating modes, each of said operating modes defining a set of operational parameters; and operating instructions for controlling the operation of the hybrid energy railway vehicle as a function of at least one of the operating modes.

9. The hybrid energy railway vehicle system of claim 8 wherein the plurality of operating modes includes one or more of the following: a switcher mode, an energy tender mode, a pusher mode, and a roadmate mode.

10. The hybrid energy railway vehicle system of claim 9 wherein the set of operational parameters includes one or more of the following: defining a configuration of the energy storage system, operating the traction motor in the dynamic braking mode to generate dynamic braking electrical energy, dissipating dynamic braking electrical energy, receiving external electrical energy, supplying stored electrical energy, generating charging electrical energy, operating the traction motor in the motoring mode, storing charging electrical energy, storing dynamic braking electrical energy, storing received external electrical energy, and receiving a control command from an external control system.

11. The hybrid energy railway vehicle system of claim 8, wherein the control system is configured to control operation of another railway vehicle.

12. The hybrid energy railway vehicle system of claim 8 further comprising a communication link in communication with the control system, said communication link being configured to receive a control command from an external control system and to provide the control command to the control system, and wherein the control system is responsive to the control command for selecting an operating mode for controlling operation of the railway vehicle.

13. The hybrid energy railway vehicle system of claim 12, wherein the communication link is a wireless communication facility.

14. In a computerized system for controlling the operation of a hybrid energy off-highway vehicle, said off-highway vehicle comprising:
- a hybrid energy off-highway (OHV) vehicle having a plurality of wheels;
- a traction motor coupled to at least one of the wheels, said traction motor having a motoring mode of operation for driving the coupled wheel and a dynamic braking mode of operation for braking the coupled wheel, and said traction motor generating dynamic braking electrical energy when operating in the dynamic braking mode;
- an electrical energy source for supplying charging electrical energy; and
- an electrical energy storage system in electrical communication with the energy source and the traction motor for storing electrical energy, said energy storage system storing charging electrical energy supplied by the energy source to the energy storage system and storing dynamic braking electrical energy generated by the traction motor during braking, said energy storage system selectively supplying stored electrical energy to the traction motor for driving the coupled wheel, and
- said computerized system comprising a processor executing computer executable instructions, the improvement comprising computer executable instructions including:
- defining instructions for defining a plurality of OHV operating modes, each of said operating modes defining a set of operational parameters; and
- operating instructions for controlling the operation of the OHV as a function of at least one of the operating modes.

15. The computerized system of claim 14, wherein the operating modes include one or more of the following: a switcher mode, an energy tender mode, a pusher mode, and a roadmate mode.

16. The computerized system of claim 14, wherein the set of operational parameters includes one or more of the following: defining a configuration of the energy storage system, operating the traction motor in the dynamic braking mode to generate dynamic braking electrical energy, dissipating dynamic braking electrical energy, receiving external electrical energy, supplying stored electrical energy, generating charging electrical energy, operating the traction motor in the motoring mode, storing charging electrical energy, storing dynamic braking electrical energy, storing received external electrical energy, and receiving a control command from an external control system.

17. The computerized system of claim 14, wherein the OHV further comprises a communication link in communication with the processor, and wherein the operating instructions select an operating mode for controlling the operation of the OHV in response to a control command received via the communication link.

18. The computerized system of claim 17, wherein the control command is received from an external control system.

19. The computerized system of claim 14, wherein operating instructions control the operation of another OHV as a function of at least one of the operating modes.

20. The computerized system of claim 14, wherein the OHV is a road locomotive, a switcher locomotive or a mining dump truck.

* * * * *